US006381403B1

(12) United States Patent
Tanaka et al.

(10) Patent No.: US 6,381,403 B1
(45) Date of Patent: Apr. 30, 2002

(54) AUDIO DISK OF IMPROVED DATA STRUCTURE AND REPRODUCTION APPARATUS THEREOF

(75) Inventors: Yoshiaki Tanaka; Shoji Ueno, both of Fujisawa; Norihiko Fuchigami, Yamato, all of (JP)

(73) Assignee: Victor Company of Japan, Ltd., Kanagawa-ken (JP)

( * ) Notice: Subject to any disclaimer, the term of this patent is extended or adjusted under 35 U.S.C. 154(b) by 0 days.

(21) Appl. No.: 09/015,706

(22) Filed: Jan. 30, 1998

(30) Foreign Application Priority Data

| Jan. 31, 1997 | (JP) | ............................................. 9-032629 |
| Apr. 30, 1997 | (JP) | ............................................. 9-126441 |
| Oct. 15, 1997 | (JP) | ............................................. 9-279878 |
| Nov. 25, 1997 | (JP) | ............................................. 9-339418 |

(51) Int. Cl.$^7$ .......................... H04N 5/781; H04N 5/90; H04N 5/928
(52) U.S. Cl. .......................... 386/106; 386/125; 386/96
(58) Field of Search .......................... 386/96, 99, 104, 386/105, 106, 109, 111, 112, 125, 126, 45, 124, 39, 27, 33; H04N 5/781, 5/90, 5/928

(56) References Cited

U.S. PATENT DOCUMENTS 5,835,671 A * 11/1998 Kitamura et al. ............. 386/97
5,960,152 A * 9/1999 Sawabe et al. ................ 386/98

FOREIGN PATENT DOCUMENTS

JP 8-273304/96 10/1996

OTHER PUBLICATIONS

National Technical Report, "Outline of DVD Standard" M. Moriya and T. Tokura, Jun. 1997.

* cited by examiner

Primary Examiner—Robert Chevalier
(74) Attorney, Agent, or Firm—Anderson Kill & Olick; Eugene Lieberstein; Michael Meller

(57) ABSTRACT

An optical audio disc comprises the first pack (A Pack), the second pack (A-CONT Pack), the third pack (V Pack), and the fourth pack (CONT Pack) in which the A-CONT Pack is placed at the head of a data array and a plurality of the A and V Packs follow the A-CONT Pack in each audio contents block unit (ACBU). Information contained in an A-CONT Pack manages audio data contained in the A Pack. The A Pack contains audio data and the V Pack contains other data than the audio data such as closed caption (CC) data as well as video data. A reproduction apparatus for an optical audio disc (DVD-Audio disc) comprises the CONT Pack detector section 1103, the A-CONT Pack detector section 1109, the parameter sections 1108 and 1114, the V Pack buffer section 1104, and the A Pack buffer section 1110. The CONT Pack detector section 1103 and the A-CONT Pack detector section 1109 detect reproduced CONT and A-CONT Packs contained in the DVD-Audio disc 1101 respectively. Control parameters of reproduced data are arranged in the parameter sections 1108 and 1114, and at the same time V Packs controlled by the information in the CONT Pack and A Packs controlled by the information in the A-CONT Pack are sequentially written in the V Pack buffer section 1104 and the A Pack buffer section 1110 respectively.

21 Claims, 46 Drawing Sheets

| AMGI-MAT |
|---|
| T-SRPT |
| AMGM-PGCI-UT |
| PTL-MAIT |
| ATS-ATRT |
| TXTDT-MG |
| AMGM-C-ADT |
| AMGM-ACBU-ADMAP |

*Fig. 5(a)*

| AMGI-MAT |
|---|
| T-SRPT |
| AMGM-PGCI-UT |
| PTL-MAIT |
| ATS-ATRT |
| TXTDT-MG |
| AMGM-C-ADT |
| AMGM-ACBU-ADMAP |
| TOC |

*Fig. 5(b)*

| ATSI-MAT |
|---|
| ATS-PTT-SRPT |
| ATS-PGCIT |
| ATSM-PGCI-UT |
| ATS-TMAPT |
| ATSM-C-ADT |
| ATSM-ACBU-ADMAP |
| ATS-C-ADT |
| ATS-ACBU-ADMAP |

*Fig. 8(a)*

| |
|---|
| ATSI-MAT |
| ATS-PTT-SRPT |
| ATS-PGCIT |
| ATSM-PGCI-UT |
| ATS-TMAPT |
| ATSM-C-ADT |
| ATSM-ACBU-ADMAP |
| ATS-C-ADT |
| ATS-ACBU-ADMAP |
| TOC |

*Fig. 8(b)*

| ATS-ID |
|---|
| ATS-EA |
| ATSI-EA |
| VERN |
| ATS-CAT |
| ATSI-MAT-EA |
| ATSM-ACBS-SA |
| ATSA-ACBS-SA |
| ATS-PTT-SRPT-SA |
| ATS-PGCIT-SA |
| ATSM-PGCI-UT-SA |
| ATS-TMAP-SA |
| ATSM-C-ADT-SA |
| ATSM-ACBU-ADMAP-SA |
| Reserved |
| ATSM-AST-ATR |
| ATS-AST-Ns |
| ATS-AST-ATRT |

*Fig. 9*

| AST#0 | ATS-AST-ATR | 8 bytes |
|-------|-------------|---------|
| AST#1 | ATS-AST-ATR | 8 bytes |
| AST#2 | ATS-AST-ATR | 8 bytes |
| AST#3 | ATS-AST-ATR | 8 bytes |
| AST#4 | ATS-AST-ATR | 8 bytes |
| AST#5 | ATS-AST-ATR | 8 bytes |
| AST#6 | ATS-AST-ATR | 8 bytes |
| AST#7 | ATS-AST-ATR | 8 bytes |

*Fig. 11*

| General information | 48 bytes | |
|---|---|---|
| | [1] | [2] |
| Name space | 93 bytes | 93 bytes |
| Free space "1" | 93 bytes | 93 bytes |
| Free space "2" | 93 bytes | 93 bytes |
| Data pointer | 15 bytes | 15 bytes |
| Total | (294 bytes) | (294 bytes) |
636 bytes
*Fig. 16(a)*
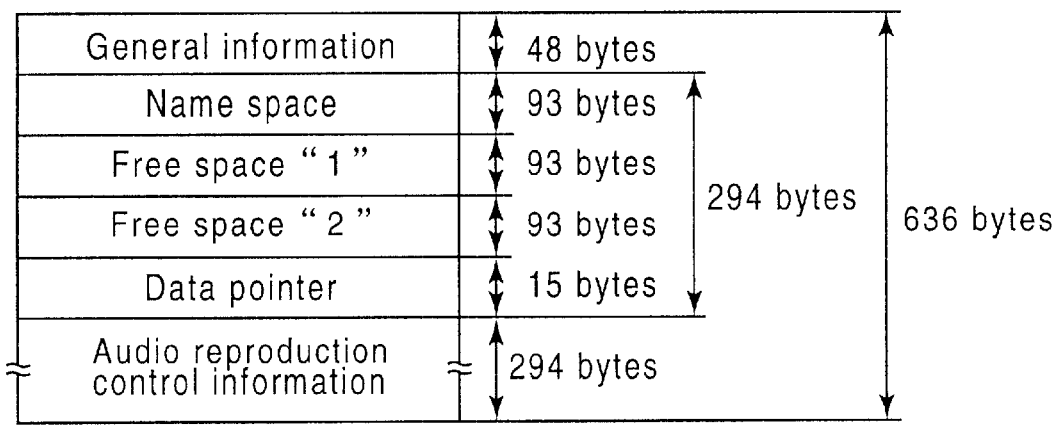
*Fig. 16(b)*
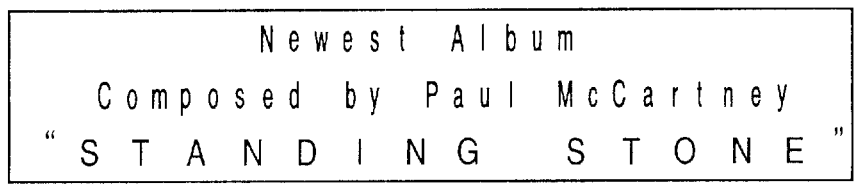
*Fig. 17*

| | | |
|---|---|---|
| General information | 16 bytes | |
| Current number information | 8 bytes | |
| Current time information | 16 bytes | |
| Title set search information | 8 bytes | |
| Title search information | 8 bytes | 1000 bytes |
| Track search information | 404 bytes | |
| Index search information | 408 bytes | |
| Highlight search information | 80 bytes | |
| Reserved area | 52 bytes | |

*Fig. 18(a)*

| | | |
|---|---|---|
| General information | 16 bytes | |
| Title set search information | 8 bytes | |
| Title search information | 8 bytes | |
| Track search information | 404 bytes | 1000 bytes |
| Index search information | 408 bytes | |
| Highlight search information | 80 bytes | |
| Reserved area | 76 bytes | |

*Fig. 18(b)*

| Frame No. | Point | PMIN, | PSEC, | PFRAME |
|---|---|---|---|---|
| n | 01 | 00, | 02, | 32 |
| n+1 | 01 | 00, | 02, | 32 |
| n+2 | 01 | 00, | 02, | 32 |
| n+3 | 02 | 10, | 15, | 12 |
| n+4 | 02 | 10, | 15, | 12 |
| n+5 | 02 | 10, | 15, | 12 |
| n+6 | 03 | 16, | 28, | 63 |
| n+7 | 03 | 16, | 28, | 63 |
| n+8 | 03 | 16, | 28, | 63 |
| n+9 | 04 | . | . | . |
| n+10 | 04 | . | . | . |
| n+11 | 04 | . | . | . |
| n+12 | 05 | . | . | . |
| n+13 | 05 | . | . | . |
| n+14 | 05 | . | . | . |
| n+15 | 06 | 49, | 10, | 03 |
| n+16 | 06 | 49, | 10, | 03 |
| n+17 | 06 | 49, | 10, | 03 |
| n+18 | A0 | 01, | 00, | 00 |
| n+19 | A0 | 01, | 00, | 00 |
| n+20 | A0 | 01, | 00, | 00 |
| n+21 | A1 | 06, | 00, | 00 |
| n+22 | A1 | 06, | 00, | 00 |
| n+23 | A1 | 06, | 00, | 00 |
| n+24 | A2 | 52, | 48, | 41 |
| n+25 | A2 | 52, | 48, | 41 |
| n+26 | A2 | 52, | 48, | 41 |
| n+27 | 01 | 00, | 02, | 32 |
| n+28 | 01 | 00, | 02, | 32 |

From frame n through n+26: 1 unit

*Fig. 19*

| | |
|---|---|
| (1) NV PCK LBN | 4 bytes |
| (2) VOBU CAT | 2 bytes |
| Reserved | 2 bytes |
| (3) VOBU UOP CTL | 4 bytes |
| (4) VOBU S PTM | 4 bytes |
| (5) VOBU E PTM | 4 bytes |
| (6) VOBU SE E PTM | 4 bytes |
| (7) C ELTM | 4 bytes |
| Reserved | 32 bytes |

Total: 60 bytes

*Fig. 22*

| | |
|---|---|
| ISRC V | 10 bytes |
| ISRC A0 | 10 bytes |
| ISRC A1 | 10 bytes |
| ISRC A2 | 10 bytes |
| ISRC A3 | 10 bytes |
| ISRC A4 | 10 bytes |
| ISRC A5 | 10 bytes |
| ISRC A6 | 10 bytes |
| ISRC A7 | 10 bytes |
| ISRC SP0 | 10 bytes |
| ISRC SP1 | 10 bytes |
| ISRC SP2 | 10 bytes |
| ISRC SP3 | 10 bytes |
| ISRC SP4 | 10 bytes |
| ISRC SP5 | 10 bytes |
| ISRC SP6 | 10 bytes |
| ISRC SP7 | 10 bytes |
| ISRC SP SEL | 1 byte |
| Reserved | 18 bytes |

Total: 189 bytes

*Fig. 23*

| | | |
|---|---|---|
| DSI GI | 32 bytes | |
| SML PBI | 148 bytes | |
| SML AGLI | 54 bytes | 1017 bytes |
| VOBU SRI | 168 bytes | |
| SYNCI | 144 bytes | |
| Reserved | 471 bytes | |

*Fig. 24*

| | | |
|---|---|---|
| (1) NV PCK SCR | 4 bytes | |
| (2) NV PCK LBN | 4 bytes | |
| (3) VOBU EA | 4 bytes | |
| (4) VOBU 1STREF EA | 4 bytes | |
| (5) VOBU 2NDREF EA | 4 bytes | 32 bytes |
| (6) VOBU 3RDREF EA | 4 bytes | |
| (7) VOBU VOB IDN | 2 bytes | |
| Reserved | 1 byte | |
| (8) VOBU C IDN | 1 byte | |
| (9) C ELTM | 4 bytes | |

*Fig. 25*

| | | |
|---|---|---|
| (1) VOBU SML CAT | 2 bytes | |
| (2) ILVU EA | 4 bytes | |
| (3) NXT ILVU SA | 4 bytes | |
| (4) NXT ILVU SZ | 2 bytes | 148 bytes |
| (5) VOB V S PTM | 4 bytes | |
| (6) VOB V E PTM | 4 bytes | |
| (7) VOB A STP PTM | 8×8 bytes | |
| (8) VOB A GAP LEN | 8×8 bytes | |

*Fig. 26*

| | | |
|---|---|---|
| FWDI | Video | 4 bytes |
| FWDI | 240 | 4 bytes |
| FWDI | 120 | 4 bytes |
| FWDI | 60 | 4 bytes |
| FWDI | 20 | 4 bytes |
| FWDI | 15 | 4 bytes |
| FWDI | 14 | 4 bytes |
| FWDI | 13 | 4 bytes |
| FWDI | 12 | 4 bytes |
| FWDI | 11 | 4 bytes |
| FWDI | 10 | 4 bytes |
| FWDI | 9 | 4 bytes |
| FWDI | 8 | 4 bytes |
| FWDI | 7 | 4 bytes |
| FWDI | 6 | 4 bytes |
| FWDI | 5 | 4 bytes |
| FWDI | 4 | 4 bytes |
| FWDI | 3 | 4 bytes |
| FWDI | 2 | 4 bytes |
| FWDI | 1 | 4 bytes |
| FWDI | Next | 4 bytes |
| BWDI | Prev | 4 bytes |
| BWDI | 1 | 4 bytes |
| BWDI | 2 | 4 bytes |
| BWDI | 3 | 4 bytes |
| BWDI | 4 | 4 bytes |
| BWDI | 5 | 4 bytes |
| BWDI | 6 | 4 bytes |
| BWDI | 7 | 4 bytes |
| BWDI | 8 | 4 bytes |
| BWDI | 9 | 4 bytes |
| BWDI | 10 | 4 bytes |
| BWDI | 11 | 4 bytes |
| BWDI | 12 | 4 bytes |
| BWDI | 13 | 4 bytes |
| BWDI | 14 | 4 bytes |
| BWDI | 15 | 4 bytes |
| BWDI | 20 | 4 bytes |
| BWDI | 60 | 4 bytes |
| BWDI | 120 | 4 bytes |
| BWDI | 240 | 4 bytes |
| BWDI | Video | 4 bytes |

Total: 168 bytes

*Fig. 29*

| Byte | Area | Number of bytes |
|---|---|---|
| 0 | Book type & part version | 1 byte |
| 1 | Disc size & minimum lead-out rate | 1 byte |
| 2 | Disc structure | 1 byte |
| 3 | Recording density | 1 byte |
| 4 to 15 | Data area allocation<br>(Start adress: 030000h<br>End adress : xxxxxx) | 12 bytes |
| 16 to 2047 | Reserved | 2032 bytes |

*Fig. 33*

AUDIO DISK OF IMPROVED DATA STRUCTURE AND REPRODUCTION APPARATUS THEREOF

BACKGROUND OF THE INVENTION

1. Field of the invention

The present invention relates to an audio disc of improved data structure, particularly relates to an audio disc having a higher packing density than a regular CD's (Compact Disc), of which the data format of DVD (Digital Video Disc) system is utilized, and relates to a reproduction apparatus for the audio disc.

2. Description of the Related Art

A CD is well known as an optical disc for reproduction of audio signal such as music, and a DVD disc is also known as an optical disc of higher packing density than CD's. A DVD disc is widely used for recording video information, and this kind of DVD disc is hereinafter called a DVD-Video disc. A video signal is recorded on a DVD-Video disc as a main information and an audio signal is recorded as a sub-information thereon. Therefore, many problems are associated with an audio part of the DVD disc such as; less recording capacity for the audio signal due to a composite signal scheme of audio and video signals, no time management of audio signal, not retrievable character information even a simple word like a title of music.

Furthermore, for users of audio apparatus who, in comparison with users of video apparatus, prefer to a simpler reproduction method, a TOC (Table Of Contents) area is provided on a DVD-Video disc like a CD. However, a DVD-Video disc comprises video contents block units including a control pack (CONT Pack), plural video packs (V Pack) and audio packs (A Pack). Since the CONT Pack controls the reproduction of V and A Packs, it is rather hard to record audio signals mainly, when the audio signals are reproduced simply.

Moreover, in the DVD-Video disc, the timing of audio signal is controlled only by a video frame. On the other hand, time management of audio signal is controlled on a sampling frequency basis, so that audio signals are hardly arranged in video frames without having extra spaces or bytes. In some cases, a discontinuity of audio signal requires to fill extra spaces with blank data. Therefore, it is hard to manage actual playback timing of audio signal, when recording audio signals mainly is intended.

In addition thereto, although DVD-Video discs and reproduction apparatuses of DVD-Video disc are currently available in a market and the reproduction apparatus can reproduce music CDs and video CDs as well as DVD-Video discs, a reproduction apparatus which can reproduce a variety of DVD discs as well as DVD-Audio disc being recorded with audio signals mainly is desirable for users.

SUMMARY OF THE INVENTION

Accordingly, an object of the present invention is to provide an audio disc and a reproduction apparatus suitable for easy reproduction of audio signals and for easy management of an actual playback timing of audio signals when audio signals are prerecorded mainly.

Further, an object of the present invention is to provide an audio disc reproduction apparatus which can reproduce various kinds of audio discs being recorded with audio signals mainly. In more specific aspect of the present invention, there provided an audio disc reproduction apparatus which can reproduce DVD-Video discs and audio discs being recorded with audio signals mainly.

In order to achieve the above object, the present invention provides, according to an aspect thereof, an audio disc having a control pack which includes information for managing audio data.

According to the aspect of the present invention, there provided an audio disc which comprises a first pack (A Pack) including audio data, a second pack (A-CONT Pack) which manages an audio data included in the first pack, a third pack (V Pack) including data other than audio data, a fourth pack (CONT Pack) which includes information for managing the data included in the third pack, and the audio disc is recorded in a data structure arranging the second pack at the head of a data array and more than one pack of the first, third, and fourth packs following the second pack, or a data structure arranging the fourth pack at the head of a data array and more than one pack of first, second, and third packs following the fourth pack. In addition thereto, there provided a reproduction apparatus which reproduces above mentioned audio discs, comprising a first reproduction device which reproduces the audio data contained in the first pack in accordance with the information included in the second pack and a second reproduction device which reproduces the data contained in the third pack in accordance with the information included in the fourth pack.

According to another aspect of the present invention, there provided an audio disc having a navigation pack (NV Pack) which reproduces audio packs, wherein the NV pack is defined by the DVD-Video Specifications which is an international industry standard. The audio disc comprises a first pack (A Pack) including audio data, a second pack (V Pack) including data other than audio data, a navigation pack (NV Pack) which contains reproduction control information for controlling reproduction of the data included in the A and V Packs, wherein the NV pack is defined by the DVD-Video Specifications, a first management information managing data included in the A and V Packs, and a management area which contains a second management information for managing the data included in the A and V Packs, wherein the management area is defined by the DVD Specifications. In addition thereto, there provided a reproduction apparatus which reproduces the above mentioned audio disc comprises a reproduction device which reproduces the audio data included in the A Packs and the data included in the V Packs.

In more specific aspect of the present invention, there provided an audio disc having a control and management information which manage audio packs included in a pack and a navigation pack (NV Pack), wherein the NV pack is defined by the DVD-Video Specifications. The audio disc has two variation of types; a first audio disc, and a second audio disc. The first audio disc comprises a first pack (A Pack) including audio data, a second pack (V Pack) including data other than the audio data, a navigation pack (NV Pack) including a reproduction control information which controls reproduction of the data contained in the A and V Packs, a first management information which manages data contained in the A and V Packs, and a management area which contains a second management information for managing the data included in the A and V Packs, wherein the NV Pack and the management area is defined by the DVD-Video Specifications. The second audio disc comprises a first pack (A Pack) including audio data, a second pack (V Pack) including data other than the audio data, a control pack or a management information including a reproduction control information which control reproduction of the data contained in the A and V Packs. In addition thereto, there provided a reproduction apparatus which reproduces the above mentioned first and second audio discs and comprises a first reproduction device which reproduces the audio data included in the A Pack and the data included in the V Pack in accordance with the NV Pack and the first management information of the first audio disc, wherein the NV Pack is defined by the DVD Specifications, and a second reproduction device which reproduces the audio data included in the A Pack and the data included in the V Pack in accordance with the reproduction control information included in the control pack of the second audio disc.

According to another aspect of the present invention, there provided an audio disc which comprises a first pack (A Pack) including an audio data, a second pack (V Pack) including data other than the audio data, a navigation pack (NV Pack) including a reproduction control information which controls reproduction of the data included in the A and V Packs, a first management information which manages the data included in the A and V Packs, and a management area which includes a second management information for managing the data contained in the A and V Packs, wherein the NV Pack and the management area are defined by the DVD Specification. In addition thereto, there provided a reproduction apparatus which reproduces the above mentioned audio disc and a DVD-Video disc, either disc comprises a first pack (A Pack) including audio data, a second pack (V Pack) including video data, and a navigation pack (NV Pack) which includes a reproduction control information for controlling reproduction of the data contained in the A and V Packs. The reproduction apparatus comprises an audio disc reproduction device which reproduces the audio data included in the A Pack and the data included in the V Pack in accordance with the reproduction control information of the NV Pack and the first management information wherein the NV Pack is defined by the DVD Specifications, and comprises a DVD-Video disc reproduction device which reproduces the audio data included in the A Pack and the data included in the V Pack in accordance with the reproduction control information of the NV Pack in the DVD-Video disc, wherein the NV Pack is defined by the DVD Specifications.

Other objects and further features of the present invention will be apparent from the following detailed description with respect to preferred embodiments of the invention when read in conjunction with the accompanying drawings.

BRIEF DESCRIPTION OF DRAWINGS

FIG. 5(a) shows a detailed format of an audio manager information (AMGI) shown in FIG. 3.

FIG. 5(b) shows a detailed format of an AMGI according to a third embodiment of the present invention.

FIG. 8(a) shows a detailed format of an audio title set information (ATSI) shown in FIG. 4.

FIG. 8(b) shows another detailed format of an ATSI according to the third embodiment of the present invention.

FIG. 9 shows a detailed format of an audio title set information management table (ATSI-MAT) shown in FIG. 8(a) and FIG. 8(b).

FIG. 11 shows a detailed format of an audio title set audio stream attribute table (ATS-AST-ATRT) shown in FIG. 9.

FIG. 16(a) shows a detailed format of an audio character display (ACD) area shown in FIG. 15.

FIG. 16(b) shows another format of the ACD according to the fourth embodiment of the present invention.

FIG. 17 shows an example of an indication on a display which is controlled by a name space information shown in FIG. 16(a) and FIG. 16(b).

FIG. 18(a) shows a format of detailed audio search data (ASD) shown in FIG.15.

FIG. 18(b) shows a format of an ASD area according to the fourth embodiment of the present invention.

FIG. 19 shows a detail of a TOC (Table Of Contents) information shown in FIG. 5(b) and FIG. 8(b).

FIG. 22 shows a detail of a PCI general information (PCI GI) shown in FIG. 21.

FIG. 23 shows a detail of a recording information (RECI) shown in FIG. 21.

FIG. 24 shows a detail of a data search information (DSI) data shown in FIG. 20.

FIG. 25 shows a detail of a DSI general information (DSI GI) shown in FIG. 24.

FIG. 26 shows a detail of a seamless playback information (SML PBI) shown in FIG. 24.

FIG. 29 shows a detail of the VOBU SRI shown in FIG. 24.

FIG. 33 shows a detail of a physical format information area shown in FIG. 32.

DETAILED DESCRIPTION OF THE PREFERRED EMBODIMENTS

[First Embodiment]

Figure 2:
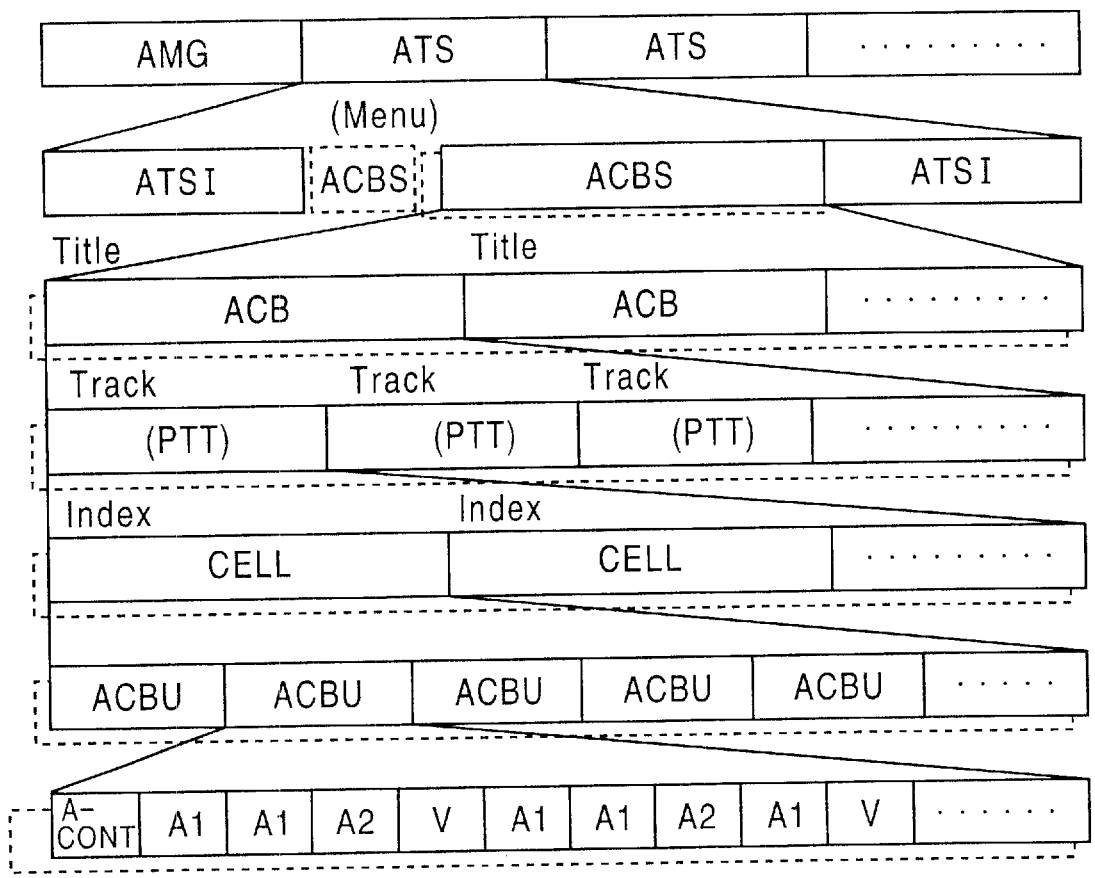
FIG. 2 shows a data format of a DVD-Audio disc according to a first embodiment of the present invention.

FIG. 2 is a data format of an audio disc (DVD-Audio disc) according to the first embodiment of the present invention.

Figure 3:
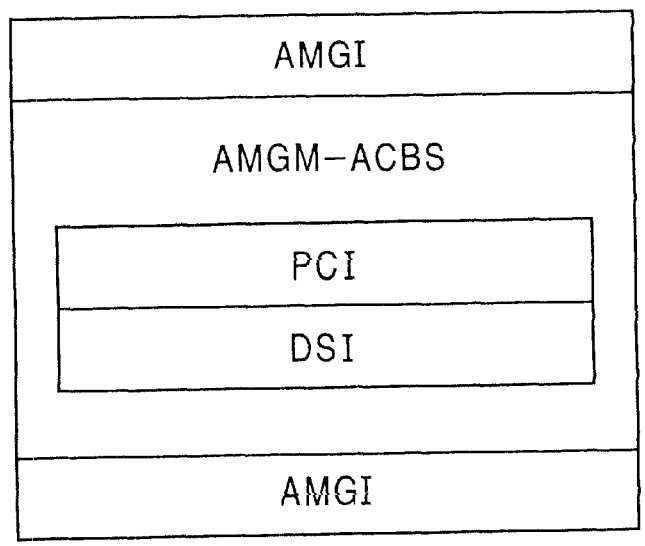
FIG. 3 shows a detailed format of an audio manager (AMG) shown in FIG. 2.

FIG. 3 is a detailed format of an audio manager (AMG) shown in FIG. 2.

Figure 4:
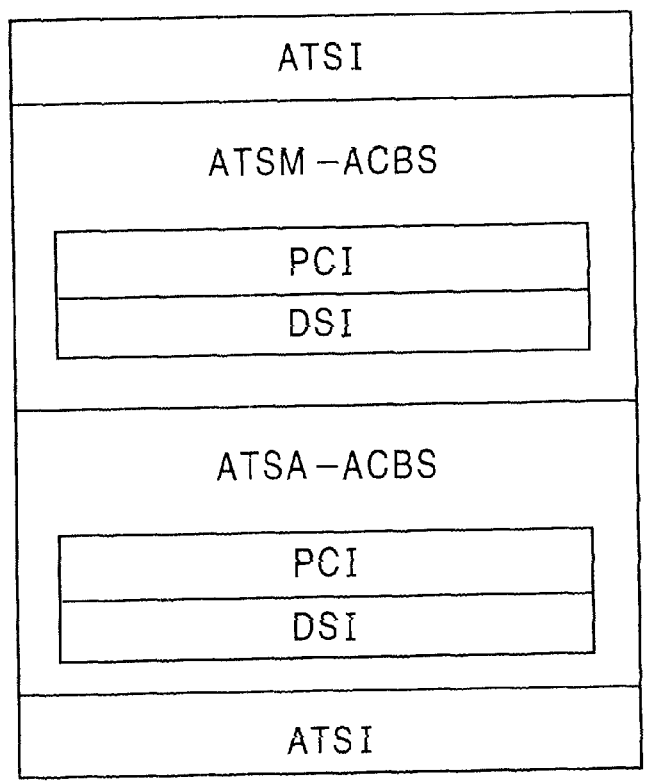
FIG. 4 shows a detailed format of an audio title set (ATS) shown in FIG. 2.

FIG. 4 is a detailed format of an audio title set (ATS) shown in FIG. 2.

FIG. 5($a$) is a detailed format of an audio manager information (AMGI) shown in FIG. 3.

Figure 5C:
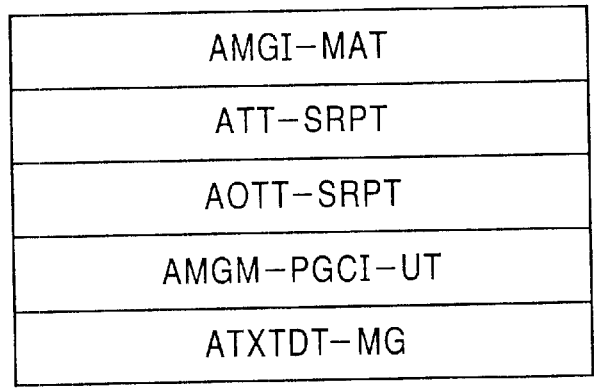
FIG. 5(c) shows a detailed format of an AMGI according to the fourth embodiment of the present invention.
Figure 6:
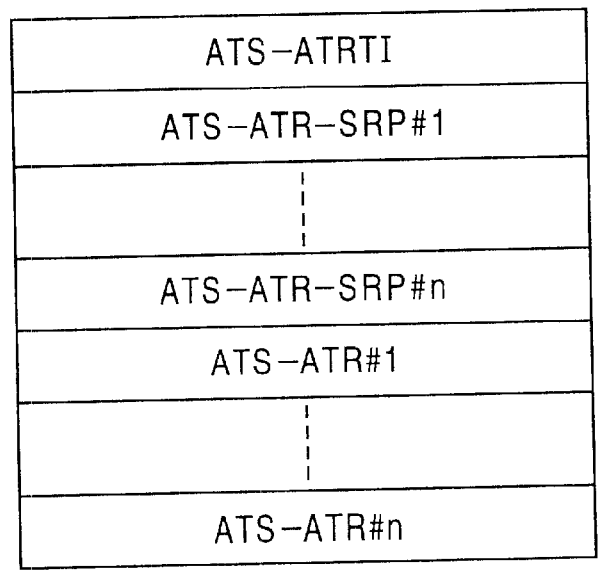
FIG. 6 shows a detailed format of an audio title set attribute table (ATS-ATRT) shown in FIG. 5(a) and FIG. 5(b).

FIG. 6 is a detailed format of an audio title set attribute table (ATS-ATRT) shown in FIG. 5($a$).

Figure 7:
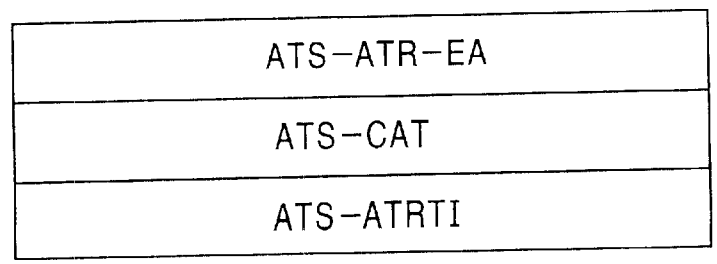
FIG. 7 shows a detailed format of an audio title set attribute data (ATS-ATR) shown in FIG. 6.

FIG. 7 is a detailed format of an audio title set attribute data (ATS-ASTR) shown in FIG. 6.

FIG. 8($a$) is a detailed format of an audio title set information (ATSI) shown in FIG. 4.

FIG. 9 is a detailed format of an audio title set information management table (ATSI-MAT) shown in FIG. 8($a$).

Figure 10:
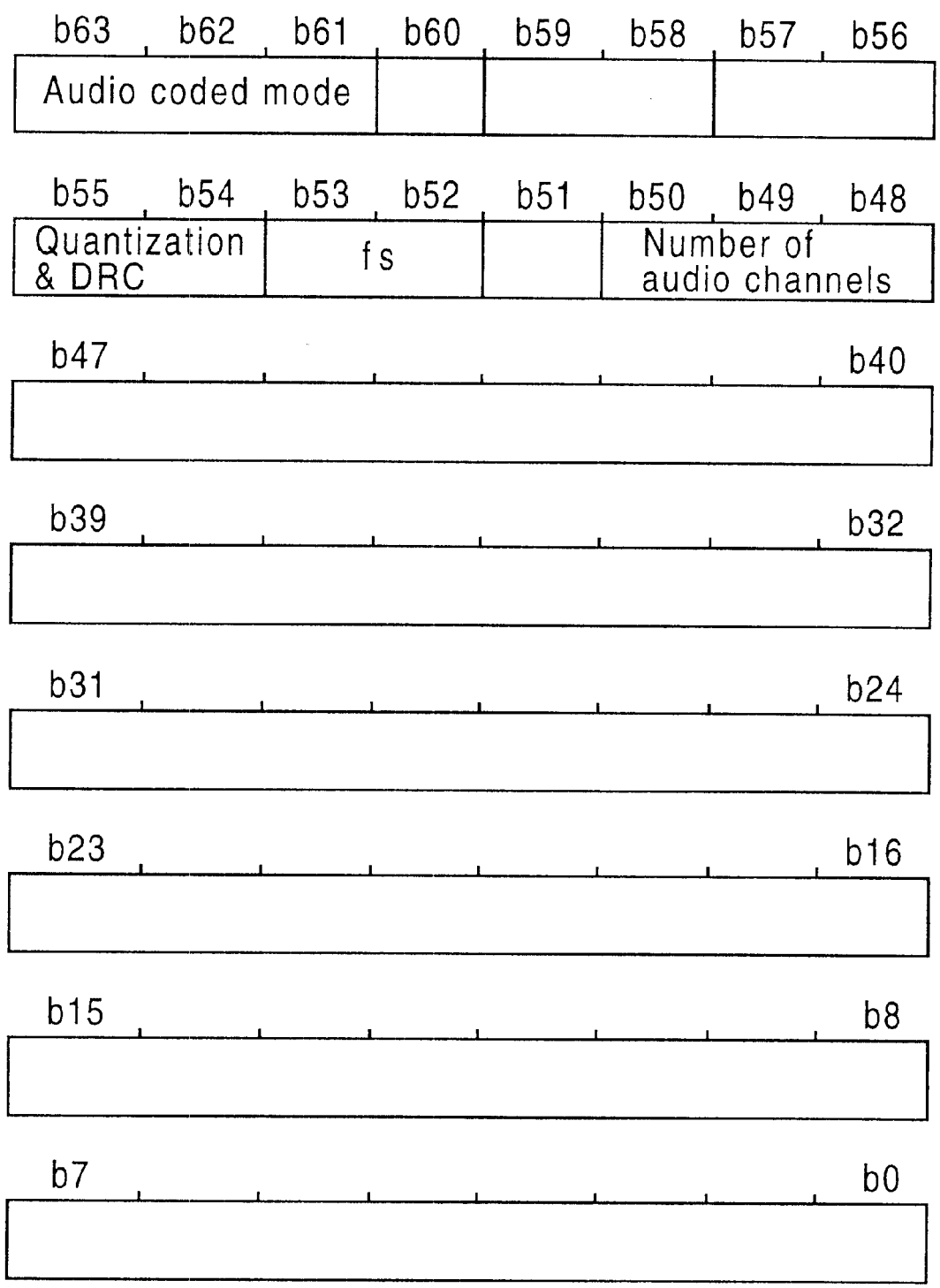
FIG. 10 shows a detailed format of an audio title set menu audio stream attribute data (ATSM-AST-ATR) shown in FIG. 9.

FIG. 10 is a detailed format of an audio title set menu audio stream attribute data (ATSM-AST-ATR) shown in FIG. 9.

FIG. 11 is a detailed format of an audio title set audio stream attribute table (ATS-AST-ATRT) shown in FIG. 9.

Figure 12:
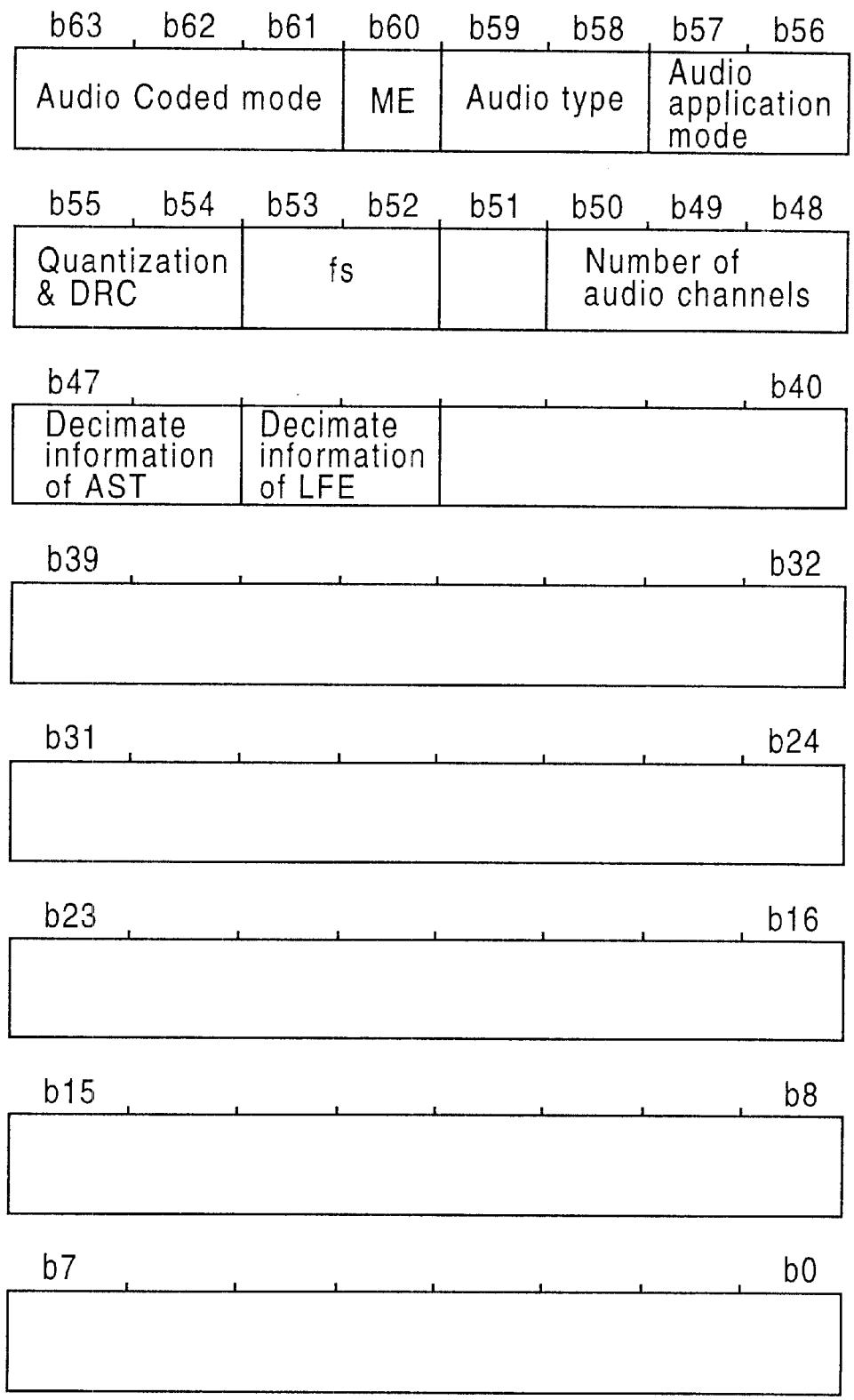
FIG. 12 shows a detailed format of an audio title set audio stream attribute data (ATS-AST-ATR) of each audio stream shown in FIG. 11.

FIG. 12 is a detailed format of an audio title set audio stream attribute data (ATS-AST-ATR) of each audio stream shown in FIG. 11.

FIG. 13($a$) is a data structure of an audio contents block unit (ACBU) shown in FIG. 2 according to the first embodiment of an audio disc according to the present invention.

Figure 13A:
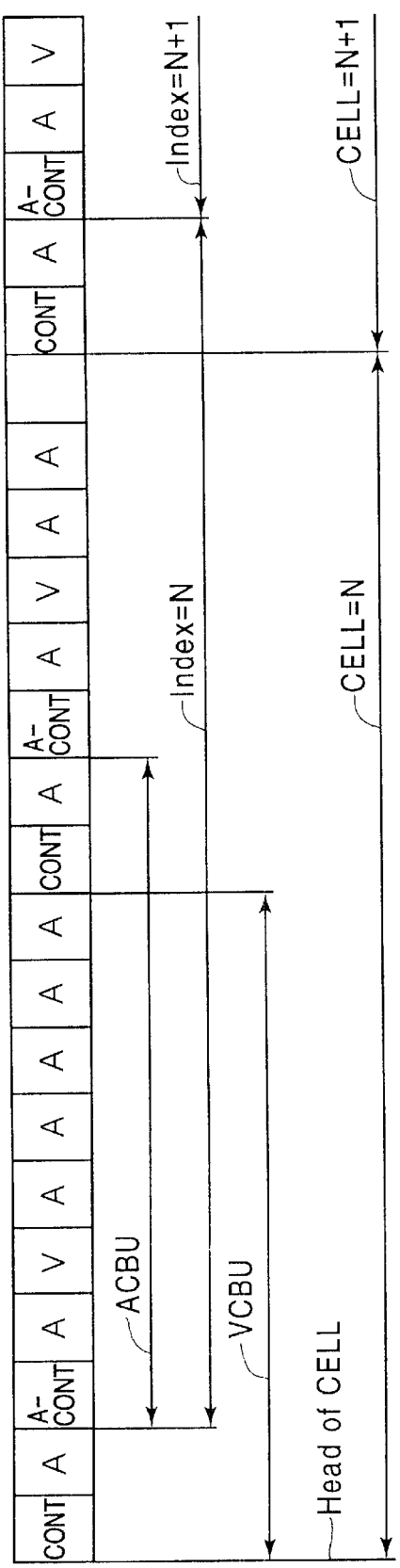
FIG. 13(a) shows a data structure of an audio contents block unit (ACBU) shown in FIG. 2.
Figure 13B:
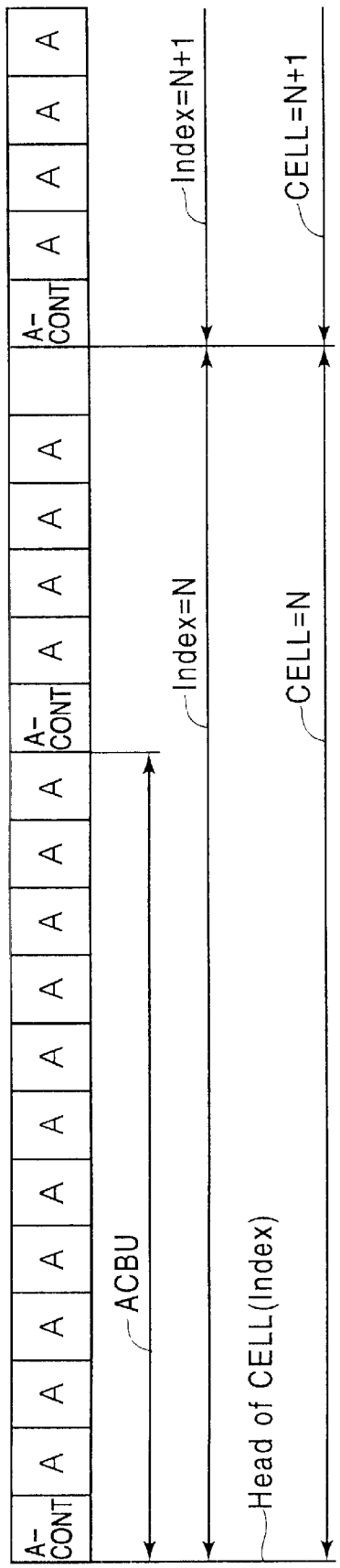
FIG. 13(b) shows a data structure of the ACBU according to a second embodiment of the present invention.
Figure 13C:
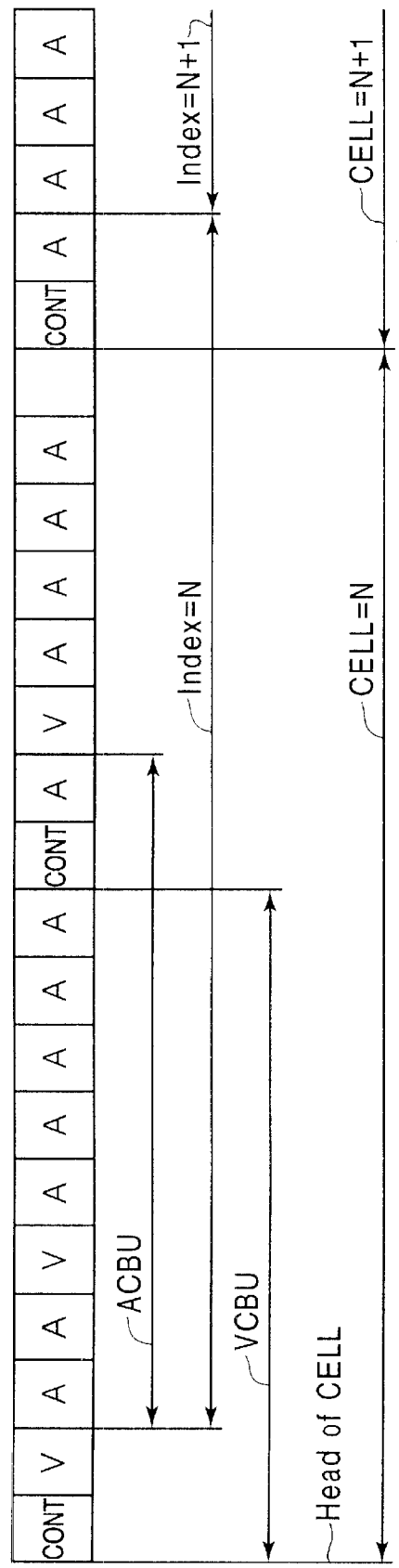
FIG. 13(c) shows a data structure of an ACBU according to the fourth embodiment of the present invention.
Figure 14:
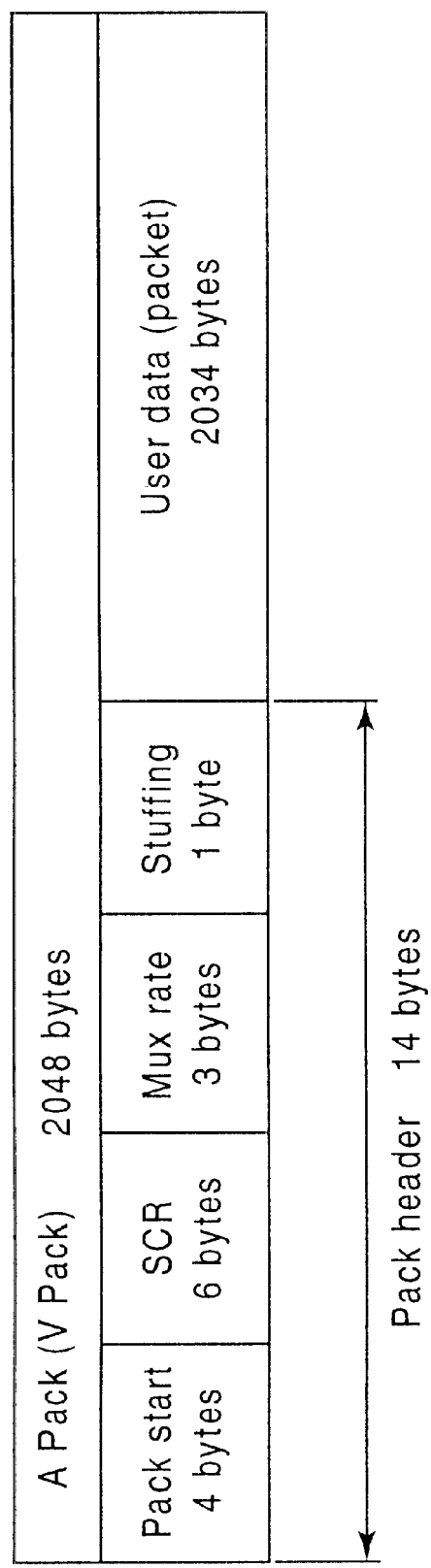
FIG. 14 shows a detailed format of an audio pack (A Pack) and a video pack (V Pack) shown in FIGS. 13(a), 13(b), and 13(c).

FIG. 14 is a detailed format of an audio pack (A Pack) and a video pack (V Pack) shown in FIG. 13($a$).

Figure 15:
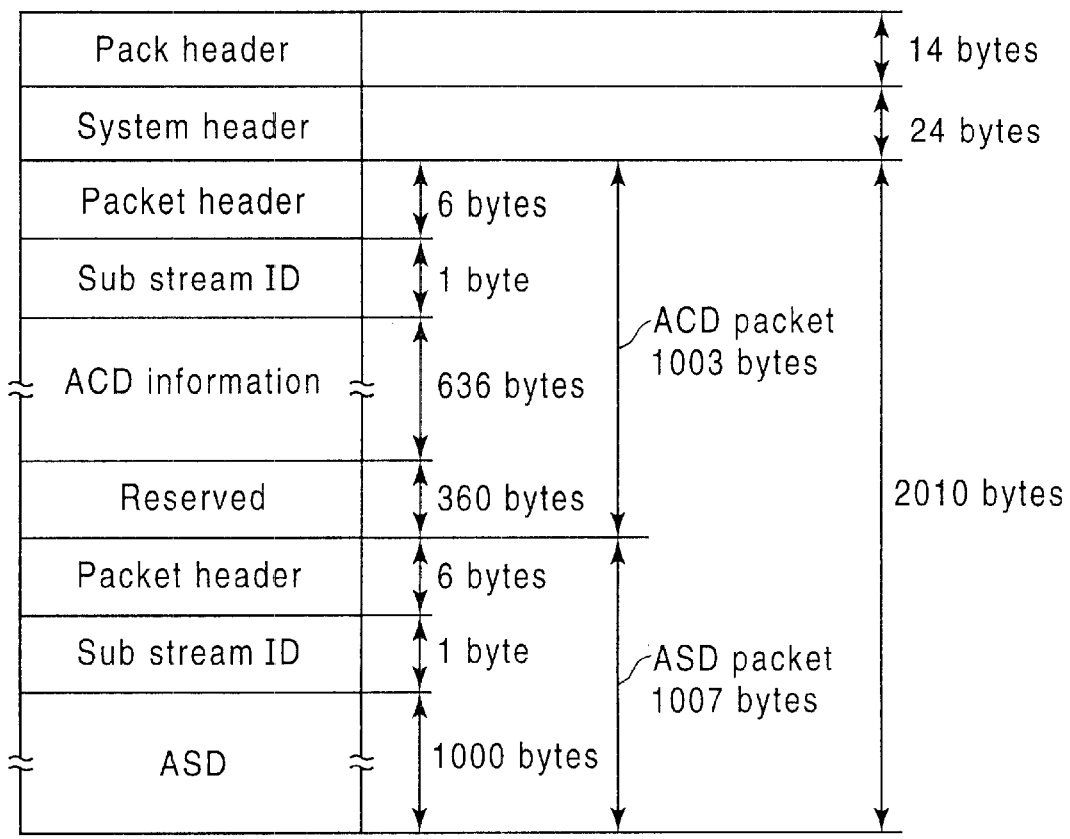
FIG. 15 shows a detailed format of an audio control pack (A-CONT Pack) shown in FIG. 13(a) and FIG. 13(b).

FIG. 15 is a detailed format of an audio control pack (AtCONT Pack) shown in FIG. 13($a$).

FIG. 16($a$) is a detailed format of an audio character display (ACD) area of FIG. 15.

FIG. 17 is an example of an indication on a display processed by information of a name space area shown in FIG. 16($a$).

FIG. 18($a$) is a detailed format of an audio search data (ASD) area of FIG. 15.

Figure 31:
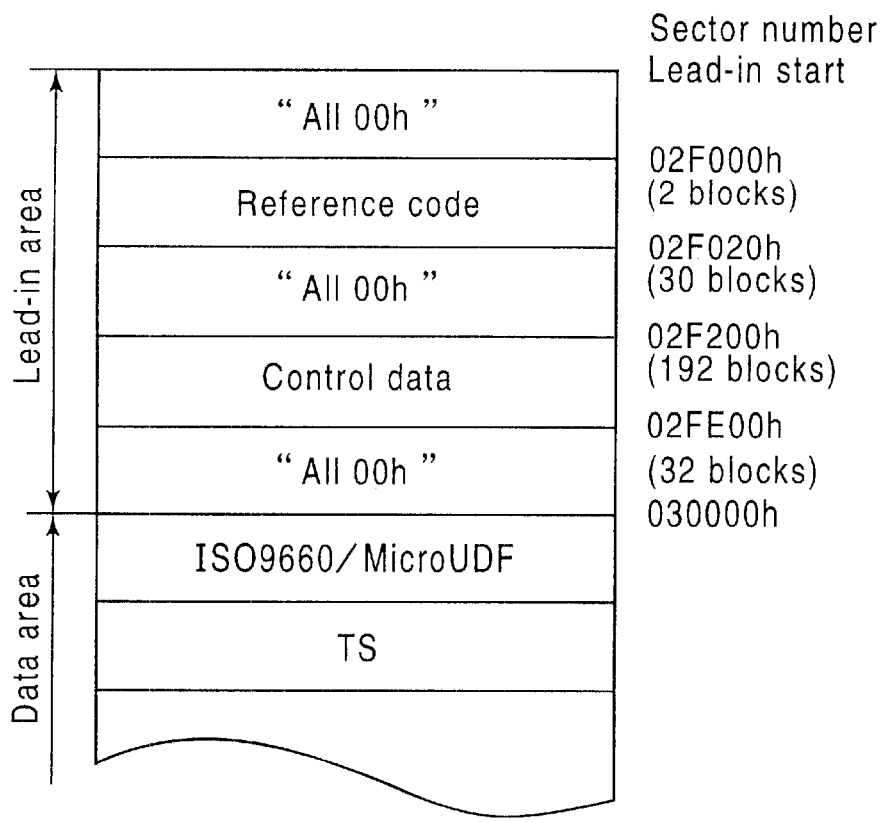
FIG. 31 shows a data structure of a lead-in area of an audio disc according to the first embodiment of the present invention.

FIG. 31 is a structure of a lead-in area of an audio disc according to the first embodiment of the present invention.

Figure 32:
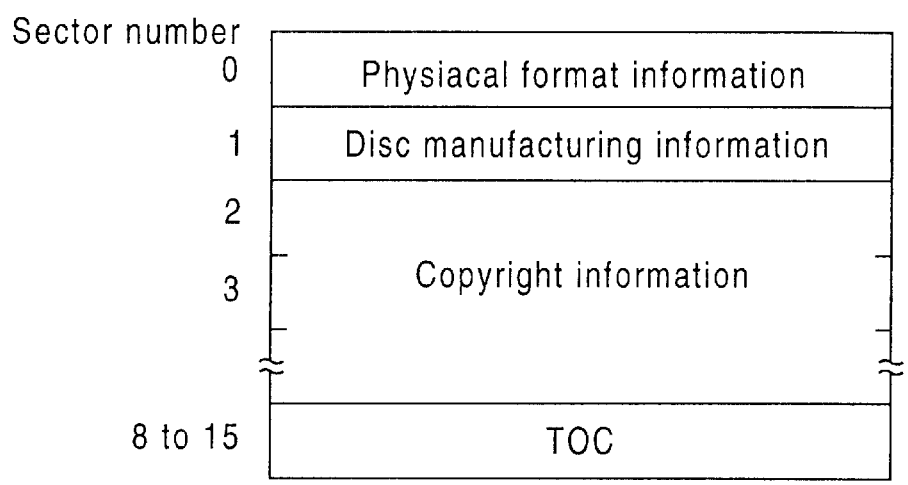
FIG. 32 shows a detail of a control data block shown in FIG. 31.

FIG. 32 is a detail of a control data block shown in FIG. 31.

FIG. 33 is a detail of a physical format information area shown in FIG. 32.

Figure 34:
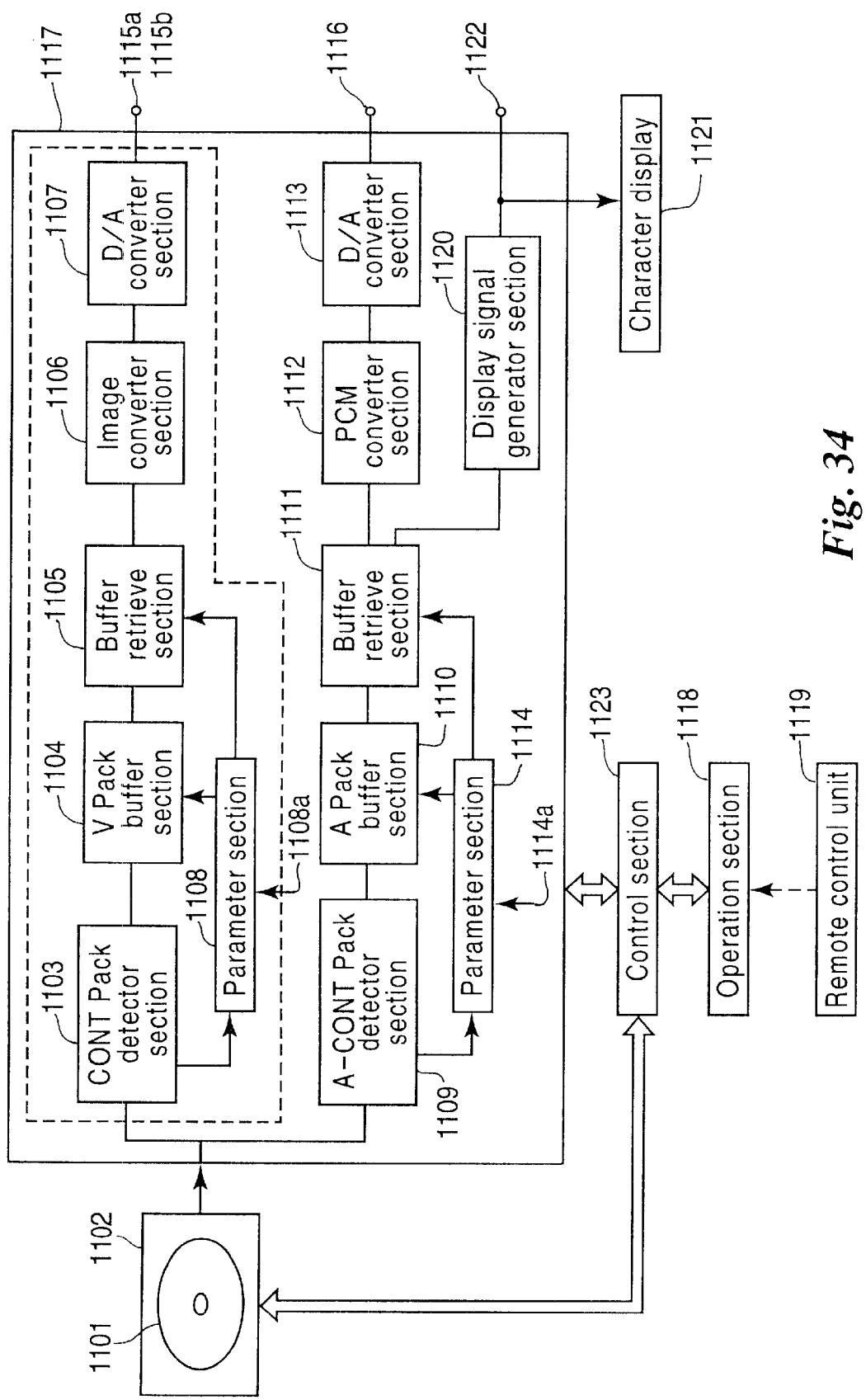
FIG. 34 shows a block diagram of a reproduction apparatus for a DVD-Audio disc.

FIG. 34 is a block diagram of a DVD-Audio disc reproduction apparatus.

Figure 35:
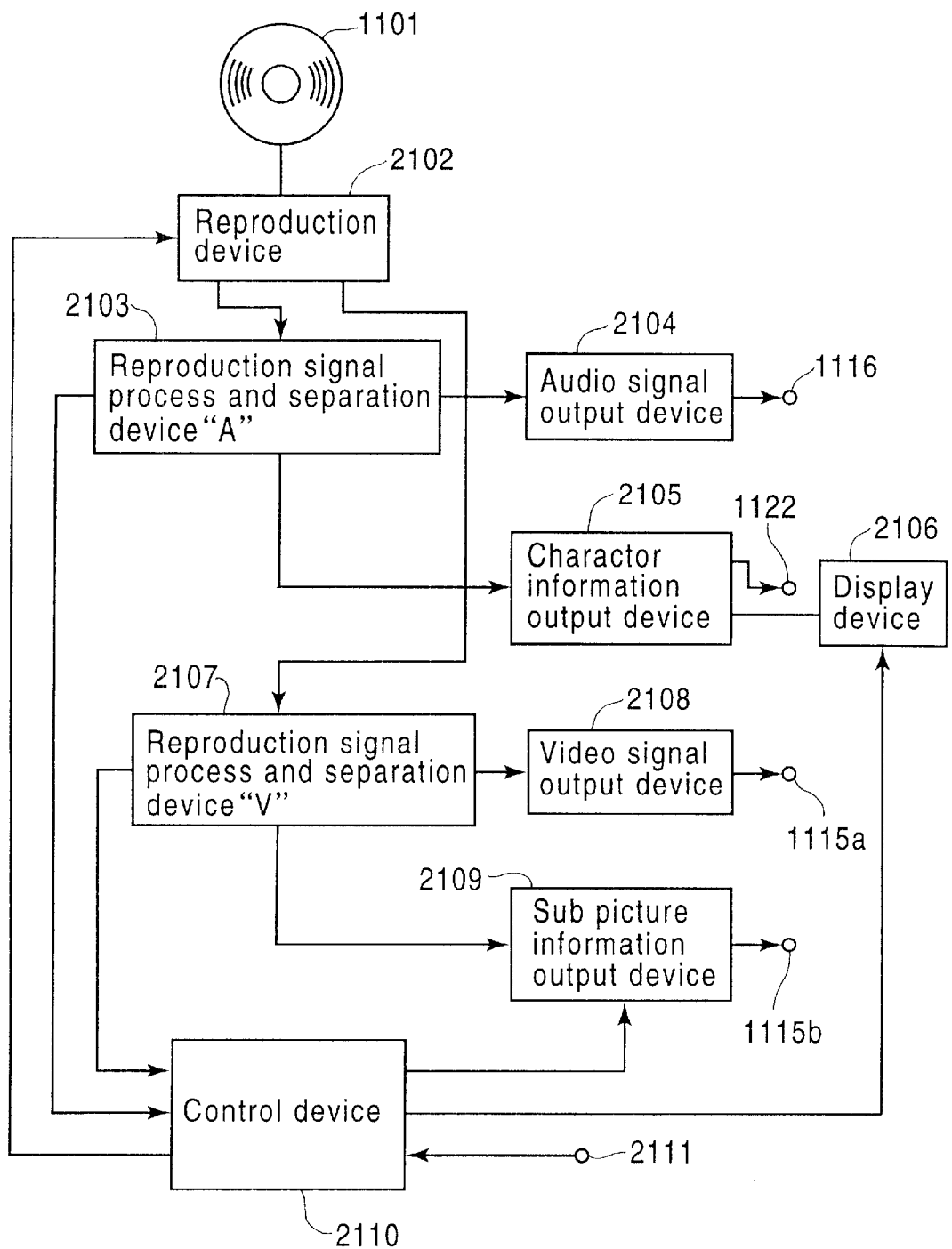
FIG. 35 shows a functional block diagram of a reproduction apparatus shown in FIG. 34.

FIG. 35 is a functional block diagram of a reproduction apparatus shown in FIG. 34.

Accordingly, a DVD-Audio disc is anticipated to be recorded with both 2 channel stereo and 5/6/8 channel multichannel signals to bridge from the CD era to the DVD-Audio disc era, and after such a transient period, an only 5/6/8 channel multichannel signal is supposed to be recorded on a DVD-Audio disc.

As shown in FIG. 1($a$) and FIG. 2, a data format of the DVD-Audio disc is the same as that of DVD-Video disc except for names of some areas so that a DVD-Audio disc is compatible with a DVD-Video disc. Therefore, it is possible to reproduce a DVD-Audio disc by a DVD-Video player (reproduction apparatus).

The data format of a DVD-Video disc comprises a video manager (VMG) area at a head of the data format and plural areas of video title set (VTS) following the VMG. On the other hand, a data format of a DVD-Audio disc comprises an audio manager (AMG) area which is detailed in FIG. 2 placed at a head of a data format and plural areas of audio title set (ATS) which is detailed in FIG. 4 following the AMG area. The data format of a DVD-Audio disc is equivalent to that of a DVD-Video disc.

Each VTS comprises a first VTS information (VTSI) placed at a head of a data array, more than one including one unit of video contents block set (VCBS) following respectively the first VTSI, and a last VTSI at an end of the data array. On the other hand, the ATS comprises a first ATS information (ATSI) placed at a head of a data array, more than one including one unit of audio contents block set (ACBS) following respectively the first ATSI, and a last ATSI at an end of the data array. The ATS is equivalent to the VTS. In the ATSI, a playing time of each music of ACBS is set in an actual playback timing.

One VCBS comprises plural video contents blocks (VCB), on the other hand, one ACBS comprises plural audio contents blocks (ACB). One VCB is equal to one video title (Title), and one ACB is equal to one audio Title. Each VCB (one Title) contains plural Chapters, on the other hand, each ACB (one Title) contains plural Tracks. A Chapter contains a part of title (PTT) and a Track contains a part of title (PTT).

One Chapter contains plural cells (CELL), on the other hand, one Track contains plural indexes (INDEX). Each CELL comprises plural VCB units (VCBU) and each INDEX comprises plural ACB units (ACBU). Each of VCBU and ACBU includes plural packs. One pack contains 2048 bytes.

One VCBU comprises a control pack (CONT Pack) at a head of a data array, plural video (V), audio(A), and sub-picture (SP) packs which follow in succession the CONT Pack. On the other hand, one ACBU comprises an audio control pack (A-CONT Pack) at a head of a data array and plural A and V Packs which follow in succession the A-CONT Pack.

The CONT Pack is arranged by information which controls the succeeding V Pack. In the A-CONT Pack, information which is similar to the TOC (Table Of Contents) information of a CD is arranged to manage an audio signal of the succeeding A Packs. Audio data is arranged in the A Pack, on the other hand, in the V Pack, video data and other data than audio data such as closed caption (CC) data are contained.

As shown in FIG. 3, one AMG area comprises an AMG information (AMGI) area which is detailed in FIG. 5(a), an audio contents block set for AMG menu (AMGM-ACBS) area, and one AMGI area for backup. Further, the AMGM-ACBS area contains a presentation control information (PCI) area and a data search information (DSI) area as control information.

As shown in FIG. 4, one ATS area comprises an ATS information (ATSI) area which is detailed in FIG. 8(a), an audio contents block set for ATS menu (ATSM-ACBS) area, an audio contents block set for ATS album (ATSA-ACBS) area, and one ATSI area for backup. Further, the ATSM-ACBS area and each of the ATSA-ACBS area contains above mentioned PCI and DSI areas.

As shown in FIG. 5(a), one AMGI area comprises a management table of AMGI (AMGI-MAT) area, a title search pointer table (T-SRPT) area, an audio manager menu program chain information unit table (AMGM-PGCI-UT) area, a parental management information table (PTL-MAIT) area, an audio title set attribute table (ATS-ATRT) area which is detailed in FIG. 6, a text data manager (TXTDT-MG) area, an audio manager menu cell (INDEX) address table (AMGM-C-ADT) area, and an audio manager menu audio contents block unit address map (AMGM-ACBU-ADMAP) area.

As shown in FIG. 6, one ATS-ATRT area comprises an audio title set attribute table information (ATS-ATRTI) area, plural (n) units of audio title set attribute search pointer of ATS (ATS-ATR-SRP#1 through ATS-ATR-SRP#n) areas, and plural (n) units of audio title set attribute data of ATS (ATS-ATR#1 through ATS-ATR#n) areas which are detailed in FIG. 7.

As shown in FIG. 7, each audio title set attribute data (ATS-ATR#1 through ATS-ATR#n) area comprises an audio title set attribute end address (ATS-ATR-EA) area in 4 bytes, an audio title set category (ATS-CAT) in 4 bytes, and an audio title set attribute information (ATS-ATRI) area in 768 bytes.

As shown in FIG. 8(a), one ATSI area shown in FIG. 4 comprises an audio title set information management table (ATSI-MAT) area which is detailed in FIG.9, an audio title set part of title search pointer table (ATS-PTT-SRPT) area, an audio title set program chain information table (ATS-PGCIT) area, an audio title set menu program chain information unit table (ATSM-PGCI-UT) area, an audio title set time map table (ATS-TMAPT) area, an audio title set menu cell address table (ATSM-C-ADT) area, an audio title set menu audio contents block unit address map (ATSM-ACBU-ADMAP) area, an audio title set cell address table (ATS-C-ADT) area, and an audio title set audio contents block unit address map (ATS-ACBU-ADMAP) area.

As shown in FIG. 9, one ATSI-MAT area shown in FIG.8(a) comprises an audio title set identifier (ATS-ID) area, an audio title set end address (ATS-EA) area, an audio title set information end address (ATSI-EA) area, a version number of DVD-Audio Specifications (VERN) area, an ATS category (ATS-CAT) area, an ATS information management table end address (ATSI-MAT-EA) area, an audio title set menu ACBS start address (ATSM-ACBS-SA) area, an ATSA-ACBS start address (ATSA-ACBS-SA) area, an ATS-PTT-SRPT start address (ATS-PTT-SRPT-SA) area, an ATS-PGCIT start address (ATS-PGCIT-SA) area, an ATSM-PGCI-UT start address (ATSM-PGCI-UT-SA) area, an ATS time map start address (ATS-TMAP-SA) area, an ATSM-C-ADT start address (ATSM-C-ADT-SA) area, an ATSM-ACBU-ADMAP start address (ATSM-ACBU-ADMAP-SA) area, a reserved area, an ATSM audio stream attribute (ATSM-AST-ATR) area detailed in FIG. 10, numbers of ATS audio stream (ATS-AST-Ns) area, and an ATS audio stream attribute table (ATS-AST-ATRT) area detailed in FIG. 11.

As shown in FIG. 10, one ATSM-AST-ATR area comprises 8 bytes (from bit b63 to bit b0) and following data (1) through (4) are arranged in the area as an attribute of coded audio signal which is recorded on a DVD-Audio disc. However, other bits than specified below are reserved for other use. The attribute data are arranged as follows:

(1) Audio coded mode (3 bits: b63, b62, and b61);
  000b: Dolby AC-3,
  010b: MPEG-1 or MPEG-2 (without extended bit stream),
  011b: MPEG-2 (with extended bit stream),
  100b: Linear PCM audio, or
  100b: Linear PCM audio (including 2+5 channels, 2+6 channels, and 2+8 channels).
(2) Quantization and DRC (dynamic range control) information (2 bits: b55 and b54);
  When an audio coded mode is "000b", it is "11b".
  When an audio coded mode is "010b" or "011b";
    00b: A dynamic range control data is not present in a MPEG audio stream.
    01b: A dynamic range control data is present in a MPEG audio stream.
    10b and 11b: Reserved
  When a audio coded mode is "100b" and "101b", it is defined for 2 channel stereo;
    00b: 16 bits,
    01b: 20 bits,
    10b: 24 bits, or
    11b: Reserved.

(3) Sampling frequency fs (2 bits: b53 and b52) for 2 channel stereo;
   00b: 48 kHz,
   01b: 96 kHz, or
   01b: 192 kHz.
(4) Number of audio channels (3 bits: b50, b49, and b48);
   000b: 1 channel (monaural),
   001b: 2 channels (stereo),
   010b: 3 channels,
   011b: 4 channels,
   010b: (2 channel stereo+5 channels,
   100b: (2 channel stereo+6 channels),
   101b: 7 channels, or
   111b: (2 channel stereo +8 channels).

As shown in FIG. 11, an ATS-AST-ATRT contains 8 units of ATS-AST-ATR for audio streams from #0 to #7 (AST#0 ATS-AST-ATR through AST#7 ATS-AST-ATR) which are detailed in FIG. 12 and each ATS-AST-ATR comprises 8 bytes (64 bytes in L total for one ATS-AST-ATRT).

As shown in FIG. 12, an ATS-AST-ATR area of one audio stream comprises 8 bytes (from bit b63 to b0) which is similar to the ATSM-AST-ATR area shown in FIG. 10 and following data (5) through (9) are arranged in conjunction with above mentioned attribute data (1) through (4);
(5) Multichannel extension (ME) (1 bit: b60),
(6) Audio type (2 bits: b59 and b58),
(7) Audio application mode (2 bits: b57 and b56),
(8) Decimate information of the audio stream (AST) (2 bits: b47 and b46), and
(9) Decimating information of only 1 channel of low frequency effect (LFE) (2 bits: b45 and b44).

Further, in the above mentioned (7) audio application mode of a DVD-Audio disc, following mode is recorded;
   11b: 2 channels+surround mode.
Furthermore, in the above mentioned decimating information of (8) AST and (9) only 1 channel of LFE, following range information is recorded;
   00b: Full(1/1),
   01b: Half (1/2), or
   01b: Quarter (1/4).

In addition thereto, the number of audio channels (4) in an ATSM-AST-ATR area affirmatively becomes 2 channels at the audio stream #0. The audio stream #1 includes 3 channels of front signal, that is, when recording audio signals of one title in 2+6 channels, 2 channel stereo signals are arranged to the audio stream #0, and 3 channel front signals out of 6 channels are arranged to the audio stream #1, and 2 channel rear signals and 1 channel LFE signals are arranged to the audio stream #2. Both the AMGI-MAT area shown in FIG. 5(a) and the ATSI-MAT area shown in FIG. 8(a) are recorded with the numeral "3", for instance, as utilization data of audio stream #0 through #2, three audio streams in total.

In the case of recording digitized 2+6 channel analog audio signals by following combination of sampling frequency and quantization bit;
   2 channel stereo: 48 kHz, 20 bits,
   3 channel front: 96 kHz, 16 bits, and
   2 channel rear and 1 channel LFE: 48 kHz, 16 bits (without decimating)

Following attribute data of 2 channel stereo signal are recorded in the ATSM-AST-ATR area shown in FIG. 10,
(1) Audio coded mode;
   01b: Linear PCM audio (including 2+5 channels, 2+6 channels, and 2+8 channels),
(2) Quantization and DRC;
   01b: 20 bits,
(3) Sampling frequency fs;
   00b: 48 kHz, and
(4) number of audio channels;
   100b: (stereo 2 channels+6 channels).

Following data are recorded in the ATS-AST-ATR area of the audio stream #0,
(1) Audio coded mode;
   100b: Linear PCM audio (including 2+5 channels, 2+6 channels, and 2+8 channels),
(2) Quantization and DRC;
   01b: 20 bits,
(3) sampling frequency fs;
   00b: 48 kHz,
(4) Number of audio channels;
   001b: 2 channel stereo,
(7) Audio application mode;
   11b: 2 channels+surround mode,
(8) decimating information of the stream;
   00b: Full (1/1), and
(9) decimating information of only 1 channel LFE
   00b: Full (1/1).

Following data are recorded in the ATS-AST-ATR area of the audio stream #1,
(1) Audio coded mode;
   01b: Linear PCM audio (including 2+5 channels, 2+6 channels, and 2+8 channels),
(2) Quantization and DRC;
   00b: 16 bits,
(3) sampling frequency fs;
   01b: 96 kHz,
(4) Number of audio channels;
   00b: 3 channels,
(7) Audio application mode;
   11b: 2 channels+surround mode,
(8) decimating information of the stream;
   00b: Full (1/1), and
(9) decimating information of only 1 channel LFE
   0b: Full (1/1).

Following data are recorded in the ATS-AST-ATR area of the audio stream #2,
(1) Audio coded mode;
   101b: Linear PCM audio (including 2+5 channels, 2+8 channels),
(2) Quantization and DRC;
   10b: 16 bits,
(3) sampling frequency fs;
   00b: 48 kHz,
(4) Number of audio channels;
   010b: 3 channels,
(7) Audio application mode;
   11b: 2 channels+surround mode,
(8) decimating information of the stream;
   00b: Full (1/1), and
(9) decimating information of only 1 channel LFE
   00b: Full (1/1).

As shown in FIG. 13(a), a VCBU and an ACBU comprise arbitrary quantity of packs; A Packs, A-CONT Pack, V Pack, and CONT Pack. A CONT Pack is arranged at a head of a VCBU data array and an A-CONT Pack is arranged at a head of an ACBU data array. One VCBU is equal to a period of 0.4 to 1.0 second, wherein the time period of 0.4 to 1.0 second represents an actual reproduction time of one VCBU, and one ACBU is equal to a period of 0.5 to 1.0 second, wherein the time period represents an actual reproduction time of one ACBU. Furthermore, an A-CONT Pack of an ACBU in a DVD-Audio disc is arranged at a third pack of a VCBU in a DVD-Video disc. Moreover, two units of VCBU and two units of ACBU are equal to one CELL and one INDEX respectively.

The A-CONT Pack is basically arranged in every 0.5 second of audio time period and it is arranged to complete within the period of 0.5 to 1.0 second at a space between a head and a end of an INDEX.

The audio time period, which is a period between an A-CONT Pack and a subsequent A-CONT Pack and is defined as a group of audio frames (GOF), is indicated by an A-CONT Pack and its data location is determined by an audio frame number, a fast access unit pointer, and numbers of frame headers.

An A Pack which is located immediately before an A-CONT Pack is regularly arranged in every 0.5 second of audio time period. However, in some cases, it is arranged in less than 0.5 second in accordance with a total length of one Title. In this case, a time difference is adjusted at an A Pack immediately preceding the first A-CONT Pack of such Title.

In the neighborhood of A Packs, audio signals are arranged so that they are program-related to each other. For example, in the case of stereophonic signals, a left channel pack and a right channel pack are arranged neighbouring A Packs, in the case of 5 channel, 6 channel, and 8 channel multichannel signals, they are also arranged neighbouring A Packs. A "V" Pack is arranged to neighbour an A Pack, when displaying a video image while reproducing audio signals.

As shown in FIG. 14, A Pack or V Pack comprises 2034 bytes of user data (A data or V data) and 14 bytes of pack header. The 14 byte pack header contains 4 bytes of pack start information, 6 bytes of system clock reference (SCR) information, 3 bytes of Mux (Multiplex) rate information of a program stream, and one byte of stuffing, therefore one pack contains 2048 bytes in total.

It is possible to manage the time period of A Packs in the same Title, by setting the SCR information of the first A Pack of the first ACBU within one Title being "1", for example, since an SCR information acts as a time stamp. In this case, the SCR information of every A Pack of all ACBUs except the first A Pack of the first ACBU in one Title are optional.

An A-CONT Pack, as shown in FIG. 15, comprises 14 bytes of Pack header, 24 bytes of system header, 1003 bytes of audio character display (ACD) packet, and 1007 bytes of audio search data (ASD) packet. One ACD packet contains 6 bytes of packet header, one byte of sub stream ID, 636 bytes of ACD information, and 360 bytes of reserved area, wherein details of the ACD information is shown in FIG. 16(a). Furthermore, one ASD packet contains 6 bytes of packet header, one byte of sub stream ID, and 1000 bytes of ASD, details of the ASD is shown in FIG. 18(a).

As shown in FIG. 16(a), the 636-byte ACD information area comprises 48 bytes of general information area and 294 bytes each of two areas; one is for a character [1] of first language and the other is a character [2] of second language. Each 294 byte area contains 93 bytes of name space area, 93 bytes each of two free space areas, and 15 bytes of data pointer area. In the name space area, data which indicate a music title such as shown in FIG. 17 are arranged. The character [1] and [2] stand for display characters of certain languages including English, and the further details are explained as "The 12 byte language code information" which will follow. Furthermore a display language can be determined by a disc manufacturer.

The 48-byte general information area comprises, for example, 16 bytes of service level information, 12 bytes of language code information, 6 bytes of character set code information, 6 bytes of indication item information, 2 bytes of "difference from previous ACD information" information, and 6 bytes of reserved information. The 16 byte service level information indicates indication size, category of indication, -discrimination of audio, video, or SP (Sub Picture), and a number of audio stream (AST#0 through AST#7) etc. Characters are mandatory and bit maps are option in the service level information area.

The 12 byte language code information indicates a type of language. Two different languages are selected from 8 languages; the one language is English which is mandatory and the other is an arbitrary language. The type of languages is defined as character [1] or [2] in accordance with selected two languages in 2 bytes each as same as video contents block (VCB) of a DVD-Video disc.

The 6-byte character set code information can possess a maximum of 15 character codes wherein the character code is equivalent to the language code, and indicates whether the language character [1] or [2] is present or not and its category in one byte. Exemplary codes include: IS0646, IS08859-1, and MS-JIS.

The 6 bytes of indication item information indicates, as shown in FIG. 16(a), free space "1" and "2", whether a data pointer is present or not, and sub stream ID. The name space is mandatory and a title name, a music title, and an artist name must be described.

In FIG. 17, a total of 93 characters (93 bytes) can be indicated on a display device: 31 characters in the first line and 62 characters in the second and third lines. Further, the second and third lines accept 31 double byte (2 bytes per character) characters as well as 62 single byte (one byte per character) characters.

In FIG. 18(a), the 1000-byte ASD is depicted in detail. It comprises 16 bytes of general information area, 8 bytes of current number information area, 16 bytes of current time information area, 8 bytes of title set search information area, 8 bytes of title search information area, 404 bytes of track search information area, 408 bytes of index search information area, 80 bytes of highlight search information area, and 52 bytes of reserved area.

The 8-byte current number information area comprises current title number of a title set in 2 bytes BCD, a current track number of a title set in 2 bytes BCD, a current index number of a Track in 2 bytes BCD, and 2 bytes of reserved area. The 16-byte current time information comprises playback time of a Track in 4 bytes BCD, a remaining playback time of a Track in 4 bytes BCD, an absolute time of a Title in 4 bytes BCD, and a remaining absolute time of a Title in 4 bytes BCD.

The 8 bytes of title set search information area comprises 4 bytes of first sector number of a title set and 4 bytes of last sector number of the title set. The 8-byte title search information area comprises a first sector number of a Title in 4 bytes and a last sector number of the Title in 4 bytes.

The 404-byte track search information area comprises 99 track and sector numbers of a Title in 4 bytes (99×4 bytes), a first track number of a Title in 4 bytes, and a last track number of the Title in 4 bytes.

The 408-byte index search information area comprises 100 index and sector numbers of a Track in 4 bytes (010×4 bytes), a first index number of a Track in 4 bytes, and a last index number of the Track in 4 bytes. The 80-byte highlight search information area comprises 10 in-sector numbers of a Track in 4 bytes (01×4 bytes) and 10 out-sector numbers of the Track in 4 bytes (01×4 bytes).

According to the aforementioned format, an A-CONT Pack is arranged at a head of plural A Packs to manage audio signals of subsequent A Packs such as TOC information of a CD. Therefore, audio data are not combined with other data such as video data, thus recording capacity of the audio data increases. Further, an audio timing can be managed by the A-CONT Pack. Moreover, simple character information of audio data such as music title can be retrieved from A-CONT Packs.

Furthermore, A-CONT Packs contain TOC information such as title, start address, and playing time. Therefore, reproduction may be started after retrieving some information commanded by a user from A-CONT Packs even during reproduction without any interruption. In the case of retrieving other reproduction function such as jump or search, the original reproduction is interrupted.

By providing TOC information into audio manager information (AMGI) and audio title set information (ATSI) and storing necessary TOC information into a memory device of a reproduction apparatus, reproduction is started after promptly reading out the information demanded by a user from the memory device. It is not necessary to store a large capacity of information like a program chain information (PGCI) of a DVD-Video disc. Therefore, discs are managed efficiently.

Accordingly, following functions are assured.

1. When no video (V) data are present in contents: (1) search and random access functions are available for 3 layers of Title, program, and INDEX, (2) cuing, time search, and random access per audio frame (GOF) functions are available, (3) timing control of Title, program, and INDEX are managed on the basis of actual timing.

2. When V data are present in contents: (4) current time and remaining time of Title and program are indicated in actual timing and are managed, in addition to the above mentioned items (1) through (3) for audio data.

Furthermore, in the case of video data, (1) search and random access functions are available for 3 layers of Title, PTT, and CELL, (2) time search and random access per video frame unit functions are available, (3) timing of Title, PTT, and CELL are managed in real time, (4) current time and remaining time of PTT or Title are indicated in video frame unit time and are managed.

As shown in FIG. 31, a recording area of a DVD disc including DVD-Audio disc is composed of a lead-in area and a data area in general. The lead-in area comprises;

An "all 00h" block which starts from a sector number of "lead-in start" and ends at a sector before a sector number "02F000h", 2 blocks of reference code block which starts from the sector number "02F000h" and ends at a sector before a sector number "02F020h", 30 blocks of "all 00h" block which starts from the sector number "02F020h" and ends at a sector before a sector number "02F200h", 192 blocks of control data block which starts from the sector number "02F200h" and ends at a sector before a sector number "02FE00h", and 32 blocks of "all 00h" block which starts from the sector number "02FE00h" and ends at a sector before a sector number "030000h".

In the data area, data of ISO9660 and micro UDF (Universal Disc Format) are recorded at a head of the data area (at the sector number "03000h) and a title set (TS) such as audio TS, video TS, and computer TS is recorded in a following block of the data of ISO9660 and micro UDF.

In FIG. 32, the control data block in the lead-in area is depicted in detail. The data control block comprises a sector of physical format information, a sector of disc manufacturing information, and a sector of copyright information.

As shown in FIG. 33, the physical format information sector in 2048 bytes comprises;

one byte of "area of book type and part version", one byte of "area of disc size and minimum lead-out rate", one byte of "disc structure area", one byte of "recording density area", 12 bytes of "area of data area allocation" wherein a start address is allocated as "03000h", and 2032 bytes of reserved area.

The area of book type and part version is provided as a disc identifier. An upper bit of the disc identifier identifies a DVD disc as a "DVD-ROM disc", "DVD-RAM disc", or DVD-Write Once disc". Further, in the case of DVD-ROM disc, a lower bit of the disc identifier identifies "computer program disc", "pure video disc" (V-Disc), "video disc plus audio navigation disc" (Van-Disc), or "audio disc" (DVD-Audio disc).

Accordingly, a disc in accordance with the first embodiment is described with a disc identifier which designates "DVD-ROM-audio disc" (DVD-Audio disc) and is contained in the area of book type and part version. On the other hand, a disc in accordance with a fourth embodiment is described with a disc identifier designating "DVD-ROM-Van disc" (Van-Disc). The TOC (Table Of Contents) information such as cuing information of program or movement of music is not provided in a lead-in area or a managing are of "DVD-ROM-pure video disc" (V-Disc). However, the TOC information is provided in a lead-in area or a managing area of the "DVD-ROM-audio disc" (DVD-Audio disc) and the "DVD-ROM-Van disc" (Van-Disc). The TOC information of a DVD-Audio disc and a Van-disc is arranged similar to a TOC information as shown in FIG. 19. However, it contains extra simplified reproduction information, so that it is called a SAPP (Simple Audio Play Pointer) to distinguish from regular TOC information, wherein FIG. 19 will be explained in the third embodiment.

FIG. 34 is a block diagram of a reproduction apparatus for a DVD-Audio disc. Above mentioned structured data is modulated in the EFM (Eight to Fourteen Modulation) modulation system and recorded on a DVD-Audio disc 1101 as a pit formation. When a certain function or operation such as program selection, reproduction, fast forwarding, or stop is commanded by a operation section 1118 or a remote control unit 1119, a control section 1123 controls a driving device 1102 and a reproduction device 1117 in accordance with the commanded operation or function. In a reproduction mode, the driving device 1102 reads out a pit data recorded on the DVD-Audio disc 1101 and then the pit data are demodulated according to the EFM modulation system.

In the reproduction device 1117, the readout signal is supplied to a CONT Pack detector section 1103 and an A-CONT Pack detector section 1109. The CONT Pack detector section 1103 detects a CONT Pack contained in the reproduced data and sets control parameters included in the CONT Pack in a parameter section 1108, and at the same time, the CONT Pack detector section 1103 transmits V Packs which are managed by a CONT Pack to a V Pack buffer section 1104 so as to write V Packs in sequential order.

A buffer retrieve section 1105 retrieves a user data, including video signal and sub-picture information , of a V Pack from the V Pack buffer section 1104 in pack sequence in accordance with an SCR information (explained before referring to FIG. 14) of the V Pack and also retrieves a user data in output timing sequence in accordance with a presentation time stamp (PTS) information of the CONT Pack. Then the user data is output from a video signal output terminal 1115a and a sub-picture information output terminal 1115b as an analog video signal through a image converter section 1106 and a D/A (Digital to Analog) converter section 1107.

The A-CONT Pack detector section 1109 detects an A-CONT Pack in the reproduced data and sets control parameters in a parameter section 1114, and at the same time, the A-CONT Pack detector section 1109 transmits A Packs which are managed by an A-CONT Pack to an A Pack buffer section 1110 so as to write A Packs in sequential order.

A buffer retrieve section 1111 retrieves a user data, including audio signals, of an A Pack from the A Pack buffer section 1110 in pack sequence in accordance with an SCR information of the A Pack and also retrieves a user data in output timing sequence in accordance with a current time information of an audio search data (ASD) which is shown in FIG. 18(a). The user data is outputted from an audio signal output terminal 1116 as an analog audio signal through a PCM converter section 1112 and a D/A converter section 1113.

Furthermore, a data in an A-CONT Pack, which is to be displayed as an ACD with reference to FIGS. 14 and 15 and an example of displayed character is shown in FIG. 17, is transmitted to a display signal generator section 1120 and a display signal is generated therein. The display signal is outputted from a display signal output terminal 1122 and also transmitted to a character display device 1121.

In addition thereto, TOC information 1108a and 1114a of a DVD-Audio disc are stored in the parameter section 1108 and 1114 respectively.

FIG. 35 is a functional block diagram of a reproduction apparatus shown in FIG. 34. A reproduction device 2102 corresponds to the driving device 1102 in FIG. 34. A reproduction signal process and separation device "A" 2103 corresponds to the A-CONT Pack detector 1109, the A Pack buffer section 1110, the buffer retrieve section 1111, and the parameter section 1114 in FIG. 34. An audio signal output device 2104 corresponds to the PCM converter section 1112 and the D/A converter section 1113 in FIG. 34. A character information output device 2105 corresponds to the display signal generator section 1120 in FIG. 34. A display device 2106 corresponds to the character display device 1121 in FIG. 34.

A reproduction signal process and separation device "V" 2107 corresponds to the CONT Pack detector section 1103, the V Pack buffer section 1104, the buffer retrieve section 1105, and the parameter section 1108 in FIG. 34. A video signal output device 2108 and a sub-picture information output device 2109 corresponds to the image converter section 1106 and the D/A converter section 1107 in FIG. 34 respectively. A control device 2110 corresponds to the control section 1123 in FIG. 34.

In FIG. 35, the control device 2110 transmits an address control information signal, responsive to a reproduction command which is transmitted by the operation section 1118 or the remote control unit 1119 as a command signal 2111 for reproducing an objective program, to the reproduction device 2102 and the objective program of a DVD-Audio disc 1101 is reproduced. By the reproduction signal process and separation device "A" 2103, reproduced data are separated into and transmitted respectively as such as an A-CONT information is separated and transmitted to the control device 2110, audio signals to the audio signal output device 2104, and character information to the character information output device 2105. Similarly by the reproduction signal process and separation device "V" 2107, a CONT information is separated and transmitted to the control device 2110, video signals to the video signal output device 2108, and a sub-picture information to the sub-picture information output device 2109.

[SECOND EMBODIMENT]

FIG. 13(b) is a data structure of the ACBU shown in FIG. 2 according to the second embodiment of the audio disc according to the present invention.

Other data structure than that of the ACBU and data format of the audio disc and a reproduction apparatus is the same as the first embodiment of the present invention.

In FIG. 13(a), an ACBU comprises both A-CONT and CONT Packs. However, it is possible to arrange a data array which excludes either V Packs or CONT Packs therein as shown in FIG. 13(b). In this case, a recording capacity of audio signal increases although no video signal is recorded. Therefore, a disc size is reduced for a given volume of audio signal in comparison with a regular DVD-Audio disc described in the first embodiment of the present invention.

Furthermore, reproduction function is simplified, therefore, the second embodiment of the present invention is suitable for a portable reproduction apparatus.

[THIRD EMBODIMENT]

A reproduction apparatus which reproduces DVD-Audio discs in accordance with the first embodiment is provided in conjunction with TOC (Table Of Contents) information.

FIG. 5(b) is a data format of the audio manager information (AMGI) shown in FIG. 3 according to the third embodiment of the present invention.

FIG. 8(b) is a detailed format of of an audio title set information (ATSI) according to the third embodiment of the present invention.

FIG. 19 is a detail of a TOC information shown in FIG. 5(b) and FIG. 8(b).

Figure 36:
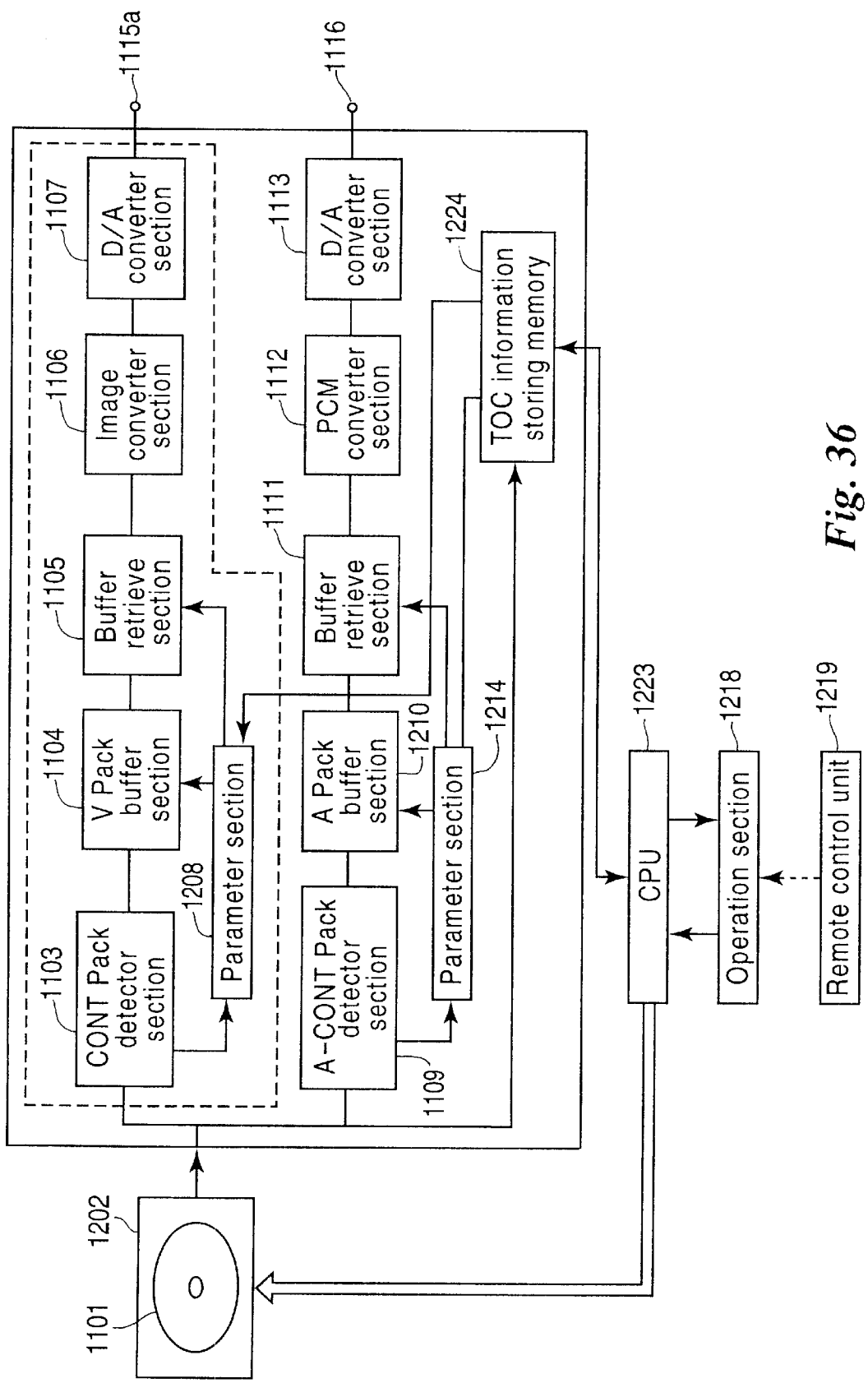
FIG. 36 shows a block diagram of a reproduction apparatus for a DVD-Audio disc according to the third embodiment of the present invention.

FIG. 36 is a block diagram of a reproduction apparatus of a DVD-Audio disc according to the third embodiment of the present invention.

Figure 37:
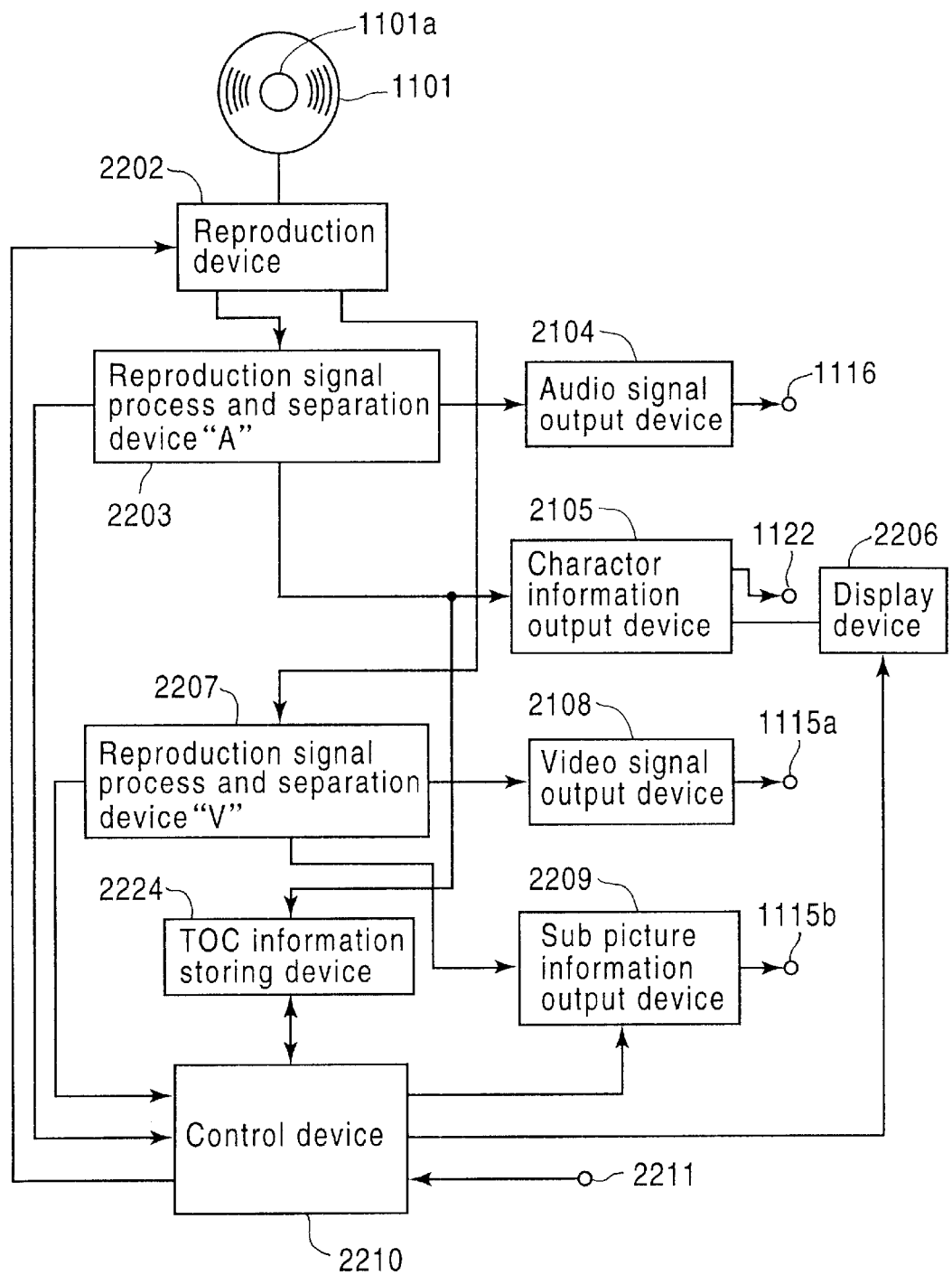
FIG. 37 shows a functional block diagram of a reproduction apparatus shown in FIG. 36.

FIG. 37 is a functional block diagram of a reproduction apparatus shown in FIG. 36.

Figure 38:
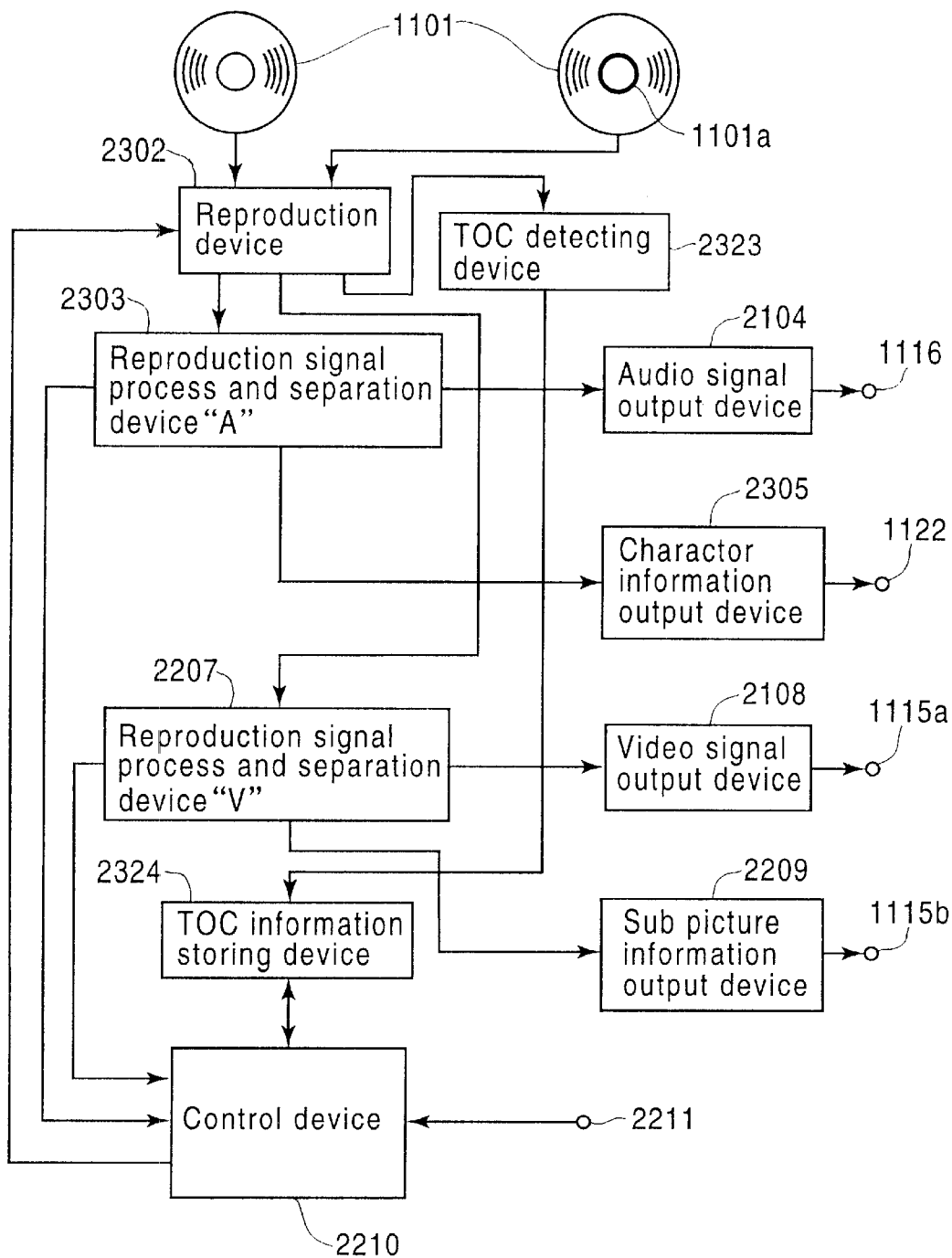
FIG. 38 is a functional block diagram of another reproduction apparatus according to the third embodiment of the present invention.

FIG. 38 is a functional block diagram of another reproduction apparatus according to the third embodiment of the present invention.

Figure 39:
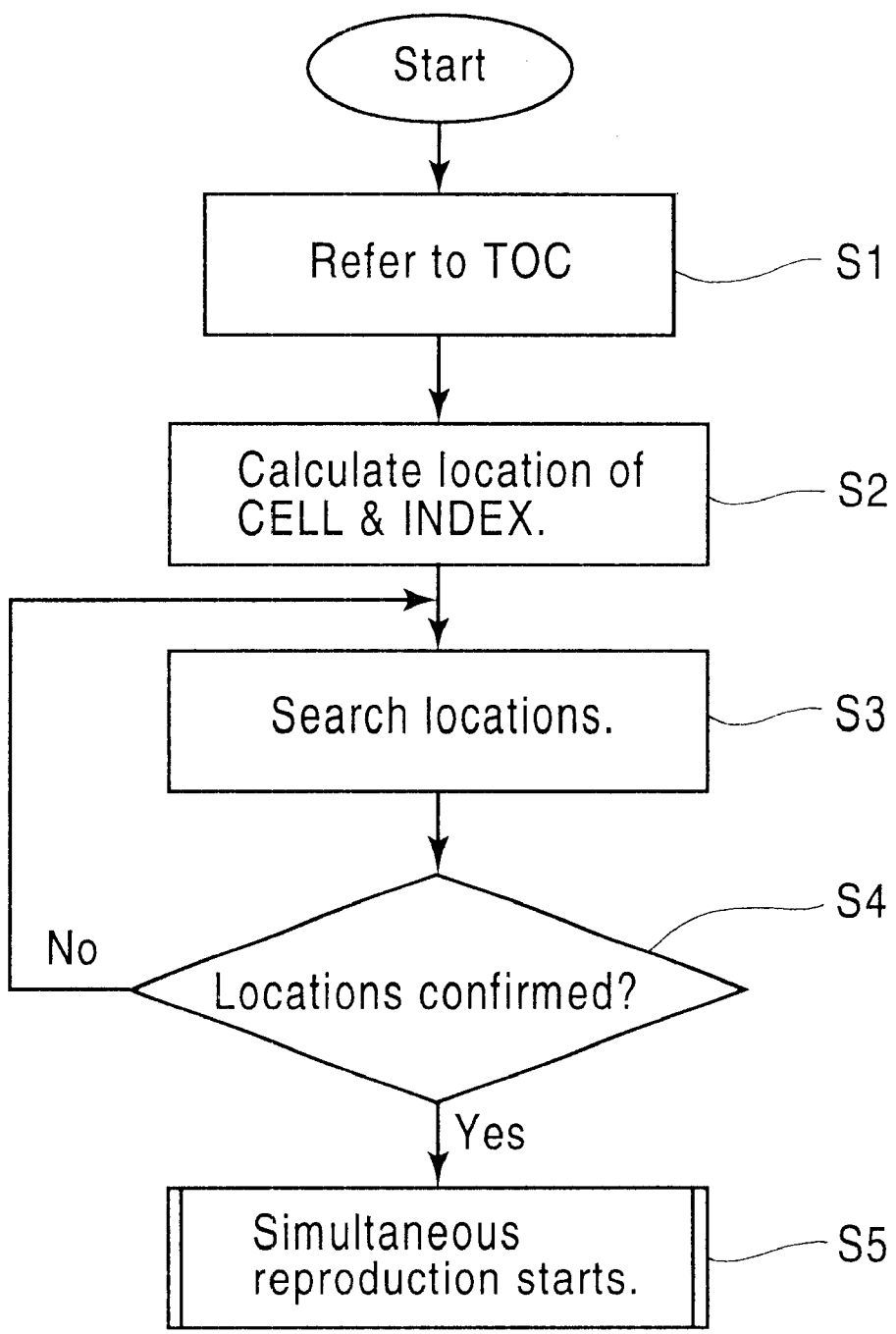
FIG. 39 shows a flow chart of simultaneous reproduction process of audio and video packs, and the flow chart is continued to FIG. 40.
Figure 40:
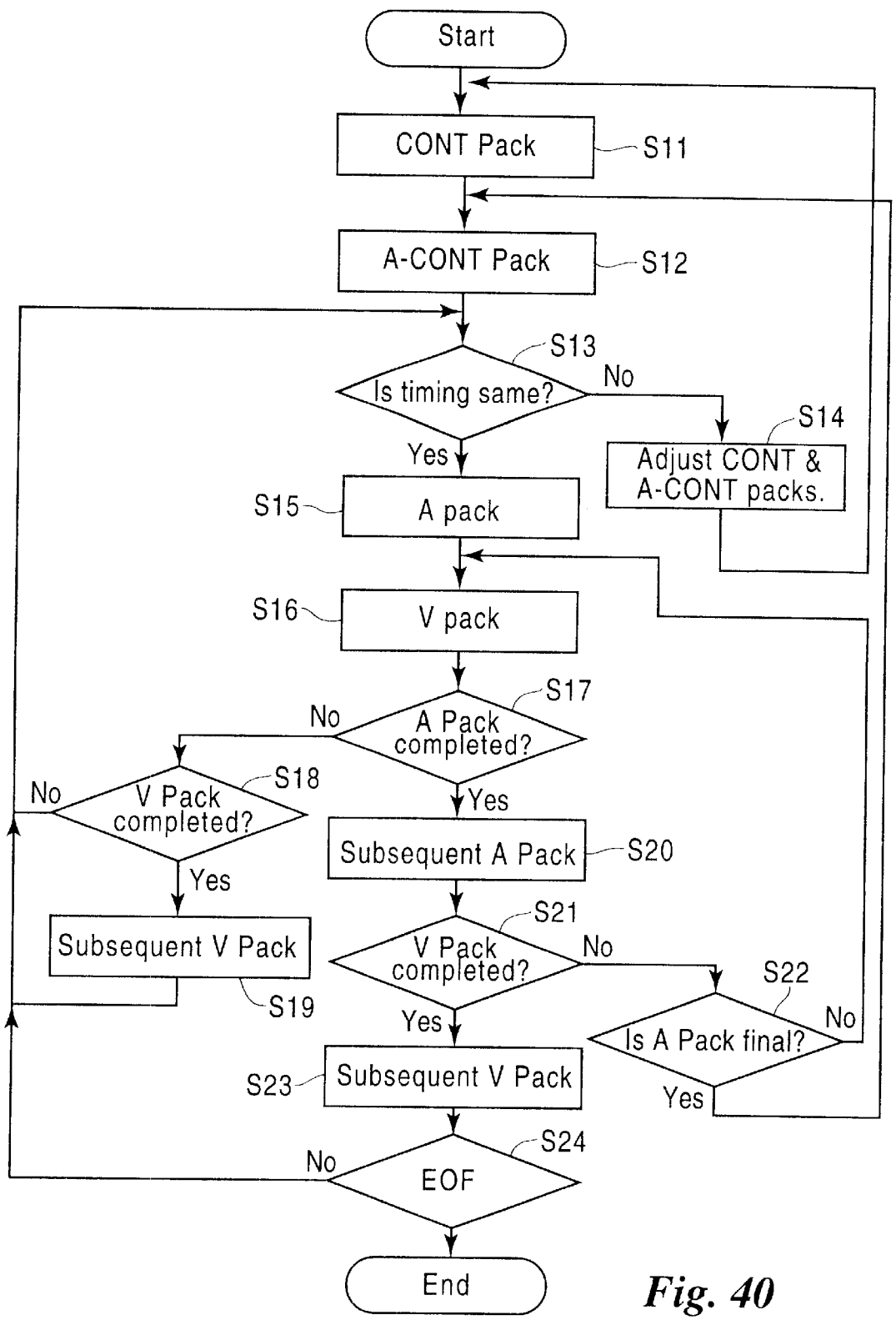
FIG. 40 shows a flow chart of simultaneous reproduction process of audio and video packs, the flow chart is continued from FIG. 39.

FIG. 39 is a flow chart of simultaneous reproduction process of audio and video packs, and the chart is continued to FIG. 40.

FIG. 40 is a flow chart of simultaneous reproduction process of audio and video packs, the chart is continued from FIG. 39.

In FIG. 5(b), an area of TOC (Table Of Contents) information which is detailed in FIG. 19 is added as a part of the AMGI data format of the first embodiment shown in FIG. 5(a). A reproduction apparatus gains access to the TOC information and gives a cue to a beginning of a program or music. FIG. 19 is a typical TOC information format which is recorded in a lead-in area of a CD. The same information is repeatedly recorded three times. In case of the DVD-Audio disc of the present invention, such repetition of TOC information recording may or may not be adopted.

In the TOC information of a CD, an absolute starting time of each movement of music at a point of 00 through 99 is represented in a minute (PMIN), a second (PSEC), and a frame (PFRAME), wherein a point number 00 through 99 stands for each movement of music. When a point is A0, the PMIN stands for a first movement of music, and both the PSEC and the PFRAME become 0 (zero). When a point is A1, the PMIN stands for a last movement of music, and both the PSEC and the PFRAME become 0. When a point is A2, an absolute starting time of lead-out area is represented in a minute (PMIN), a second (PSEC), and a frame (PFRAME). A TOC information shown in FIG. 19 represents that 6 programs or 6 movements of music are recorded in a DVD-Audio disc, wherein points are 01 through 06, and one unit of TOC information shown in FIG. 19 comprises 27 frames or 27 points of 01 through A2. In addition thereto, as another aspect of the present invention, TOC information can be recorded in a vacant area of the ATSI (Audio Title Set Information) as shown in FIG. 8(*b*) instead of the AMGI (Audio Manager Information) or can be recorded in the 360 byte reserved area of the ACD packet in a A-CONT Pack shown in FIG. 15.

In functionwise and operationwise, FIGS. 36 and 37 are basically the same as FIGS. 34 and 35 respectively. Therefore, detailed explanation is limited to different sections and areas from the first embodiment of the present invention. In FIG. 36, a CPU (Central Processing Unit, equivalent to a microprocessor) 1223 controls a driving device 1202 and a TOC information storing memory 1224 in accordance with a demanded operation or function.

Above mentioned TOC information is read out from a DVD-Audio disc 1101 at the beginning of reproduction by the driving device 1202 and is stored in the TOC information storing memory 1224. The CPU 1223 controls the driving device 1202 to make access to the DVD-Audio disc 1101 in referring to the TOC information storing memory 1224, when a cuing reproduction of a program or a movement of music is commanded. In addition thereto, the TOC information is recorded in an AMGI, an ATSI, or an A-CONT Pack. Further, the TOC information can be additionally recorded in a innermost lead-in area (TOC area 110*a*) of a DVD-Audio disc 1101 shown in FIG. 38 and the TOC information can be stored in the TOC information storing memory 1224 after a TOC detecting device 2323 make access independently to the TOC area 1101*a* at a beginning of reproduction. Furthermore, the stored TOC information in the TOC information storing memory 1224 is supplied to both the parameter sections 1208 and 1214 to control video information and audio information respectively in accordance with a reproduction command from the operation section 1218 or the remote control unit 1219 through the CPU 1223.

In FIG. 37, a TOC information storing device 2224 corresponds to the TOC information storing memory 1224 in FIG. 36. A control device 2210 corresponds to the CPU 1223 in FIG. 36. A reproduction signal process and separation device "A" 2203 separates a reproduced data into an A-CONT information, audio signals, a character information, and a TOC information. The A-CONT information is transmitted to the control device 2210. The audio signals are transmitted to a audio signal output device 2104. A TOC information which is recorded in a TOC area 1101*a* of a DVD-Audio disc 1101 is transmitted to the TOC information storing device 2224. The TOC information is managed by the control device 2210.

In FIG. 38, a TOC information is additionally recorded in an innermost lead-in area 1101*a* of a DVD-Audio disc 1101. At the beginning of reproduction, a TOC detecting device 2323 has independently access to a TOC area 1101*a* and contents of TOC information is stored in a TOC information storing device 2324. The other functions and operations are the same as those of FIG. 37 described before.

In FIG. 39, when a cuing reproduction of a program or a movement of a music is commanded, the CPU 1223 refers to TOC information which is corresponding to a specified position (step S1), and then the CPU 1223 calculates locations of a CELL and an INDEX in accordance with the TOC information (step S2). After the step S2, the CPU 1223 searches locations (step S3). Once the locations are confirmed (step S4), the audio and video simultaneous reproduction process which will be detailed in FIG. 40, starts to function (step S5).

In FIG. 40, a CONT Pack is reproduced (step S11) and a A-CONT Pack is reproduced (step S12) in sequence, and then timing information of both the CONT and the A-CONT Packs are checked whether a timing is the same or not (step S13). When the timing is different from each other, both the CONT Pack and the A-CONT Pack are adjusted by ±1 pack (step S14), then both Packs return back to the reproduction process (step S11) and they are reproduced. As another aspect of the step S14, a Pack out of either CONT Pack or A-CONT Pack can be adjusted by ±1 pack and the Pack is reproduced.

In the step S13, when both timing information of the CONT Pack and the A-CONT Pack are the same, an A Pack which is controlled according to the A-CONT Pack is reproduced and an A Pack address (SCR information) is advanced at an increment of one (step S15), and then a V Pack which is controlled according to the CONT Pack is reproduced and a V Pack address is advanced at an increment of one (step S16). After the step 16, it is checked whether reproduction of an A Pack is completed or not (step S17). When the reproduction is not completed, it is forwarded to a step S18. In the case of completion, it is advanced to a step 20.

In the step S18, it is checked whether reproduction of the V Pack is completed or not. When the reproduction is not completed, it returns to the step S13. In the case of completion, it is forwarded to a step S19. In the step S19, a V Pack address is advanced at an increment of one in conjunction with reproducing a subsequent V Pack which is controlled according to the CONT Pack and then it returns to the step S13.

In the step S20, an A Pack address is advanced at an increment of one in conjunction with reproducing a subsequent A Pack which is controlled according to the A-CONT Pack and then it is checked whether reproduction of the V Pack is completed or not (step S21). When the reproduction of the V Pack is not completed, it is forwarded to a step S22. In the case of completion, it advances to a step S23.

In the step S22, it is checked whether an A Pack which is controlled according to the A-CONT Pack is a final pack or not. When the A Pack is not the final pack, it returns to the step S16. In case that the A Pack is the final pack, it returns to the step S12 and a subsequent A-CONT Pack is reproduced.

In a step S23, a V Pack address is incremented by one in conjunction with reproducing a subsequent V Pack which is controlled according to the CONT Pack and then it is checked whether a frame is end: end of frame (EOF) or not (step S24). When it is not the EOF, it returns to the step S13. In the case of the EOF, the audio video simultaneous reproduction process is finished.

Accordingly, audio data A and video data V which are contained in several packs are continuously and simultaneously reproduced in accordance with time management information contained in a CONT Pack and an A-CONT Pack.

Furthermore, a video pack is reproduced in synchronization with an audio pack under a control in real time.

[FOURTH EMBODIMENT]

A DVD-ROM-Van disc (Van-Disc) and a reproduction apparatus for a Van-Disc is provided in this embodiment.

Figure 1A:
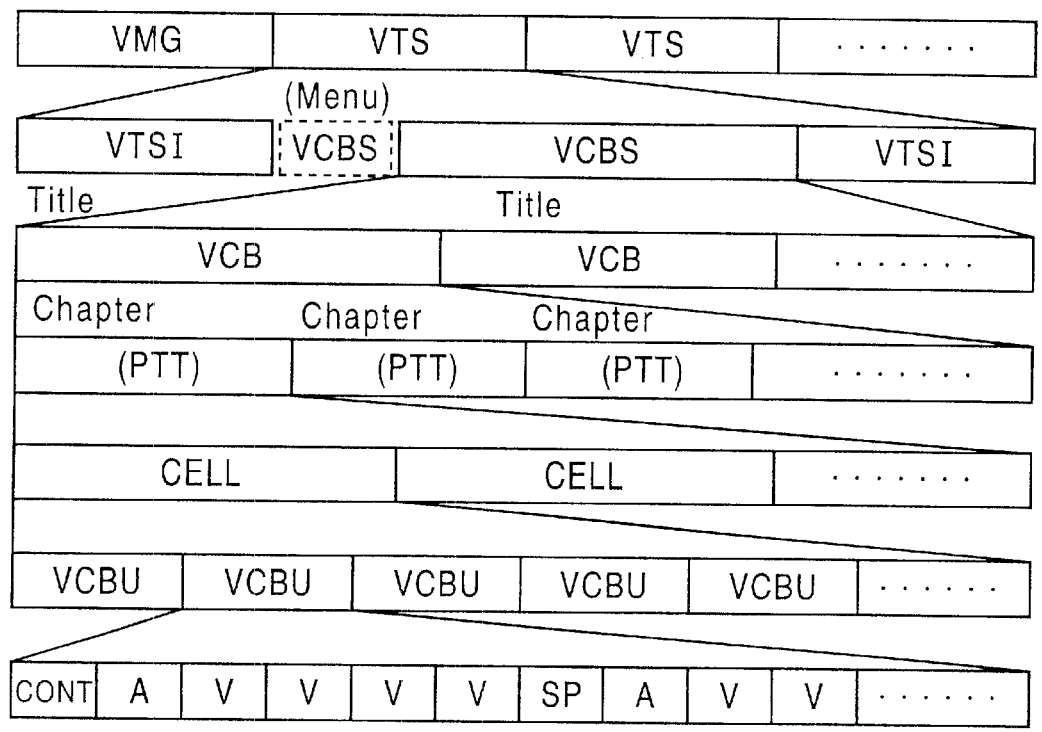
FIG. 1(a) shows a data format of the DVD-Video disc of the prior art.
Figure 1B:
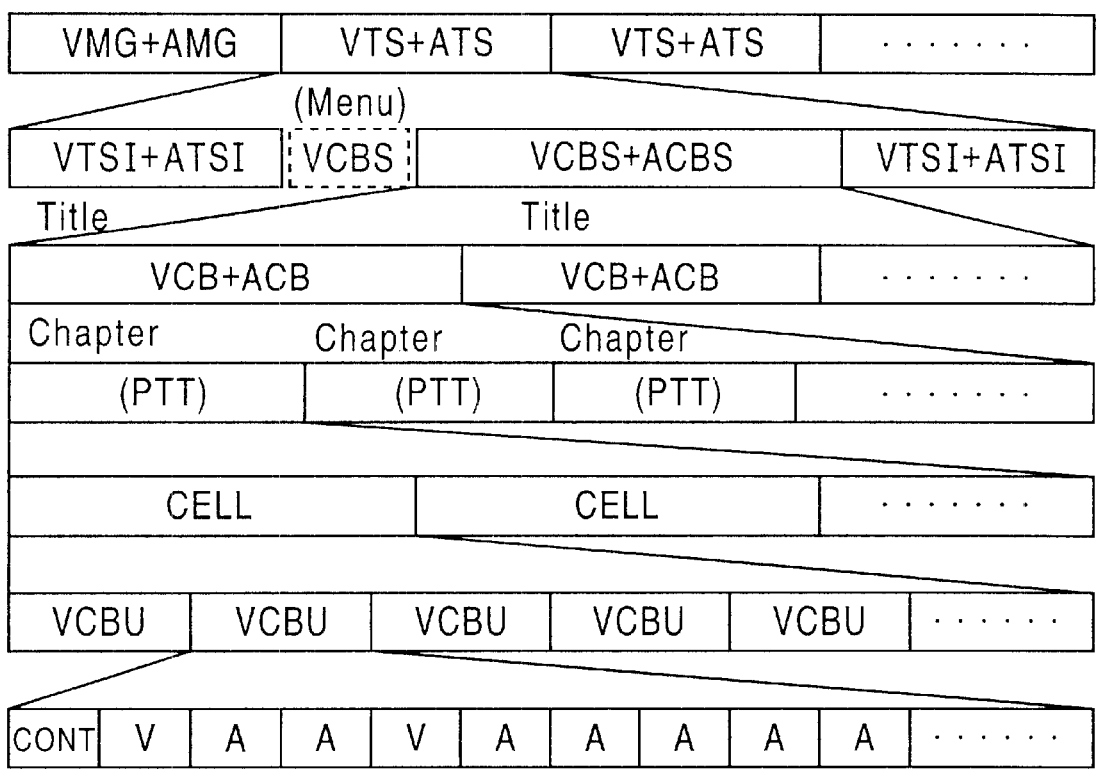
FIG. 1(b) shows a data format of a DVD-ROM-Van disc (Van-Disc) according to a fourth embodiment of the present invention.

FIG. 1(b) is a data format of a Van-Disc according to the fourth embodiment of the present invention.

FIG. 5(c) is a detailed format of an audio manager information (AMGI) according to the fourth embodiment of the present invention.

FIG. 13(c) is a data structure of an audio contents block unit (ACBU) and a video contents block unit (VCBU) shown in FIG. 1(b) according to the fourth embodiment of the present invention.

FIG. 16(b) is a detailed format of an audio character display (ACD) area according to the fourth embodiment of the present invention.

FIG. 18(b) is a detailed format of an audio search data (ASD) area according to the fourth embodiment of the present invention.

Figure 20:
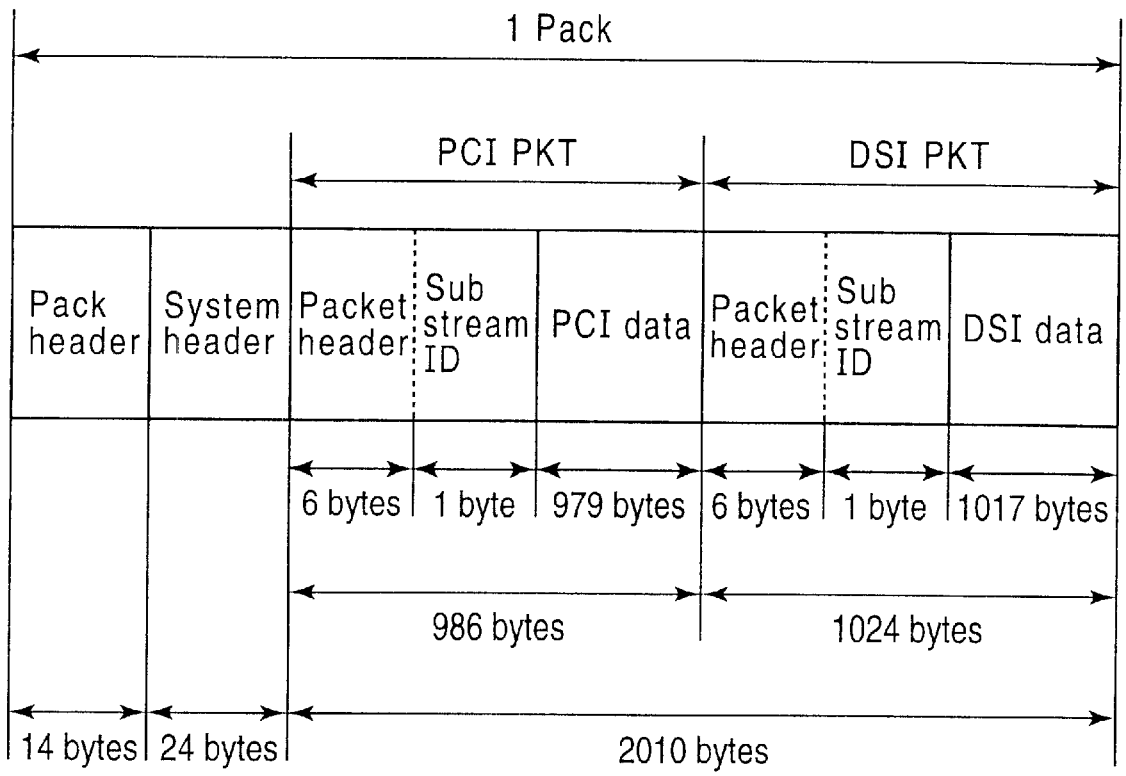
FIG. 20 shows a detailed format of a CONT Pack shown in FIG. 13(c).

FIG. 20 is a detailed format of a CONT Pack (NV Pack) shown in FIG. 13(c).

Figure 21:
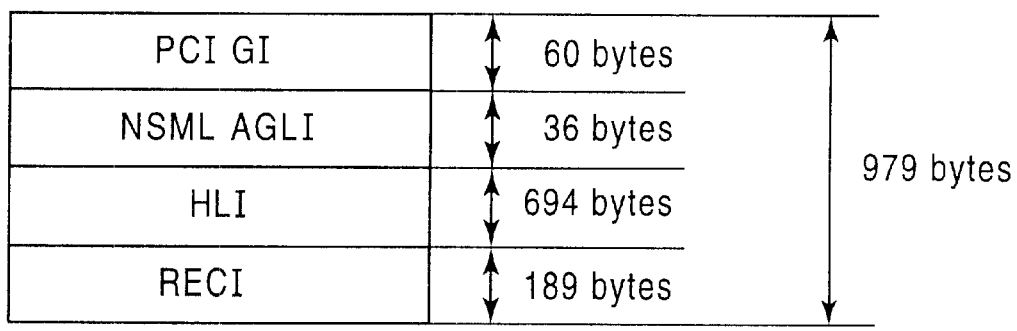
FIG. 21 shows a detail of a presentation control information (PCI) data shown in FIG. 20.

FIG. 21 is a detail of a presentation control information (PCI) data shown in FIG. 20.

FIG. 22 is a detail of a PCI general information (PCI GI) shown in FIG. 21.

FIG. 23 is a detail of a recording information (RECI) shown in FIG. 21.

FIG. 24 is a detail of a data search information (DSI) data shown in FIG. 20.

FIG. 25 is a detail of a DSI general information (DSI GI) shown in FIG. 24.

FIG. 26 is a detail of a seamless playback information (SML PBI) shown in FIG. 24.

Figure 27:
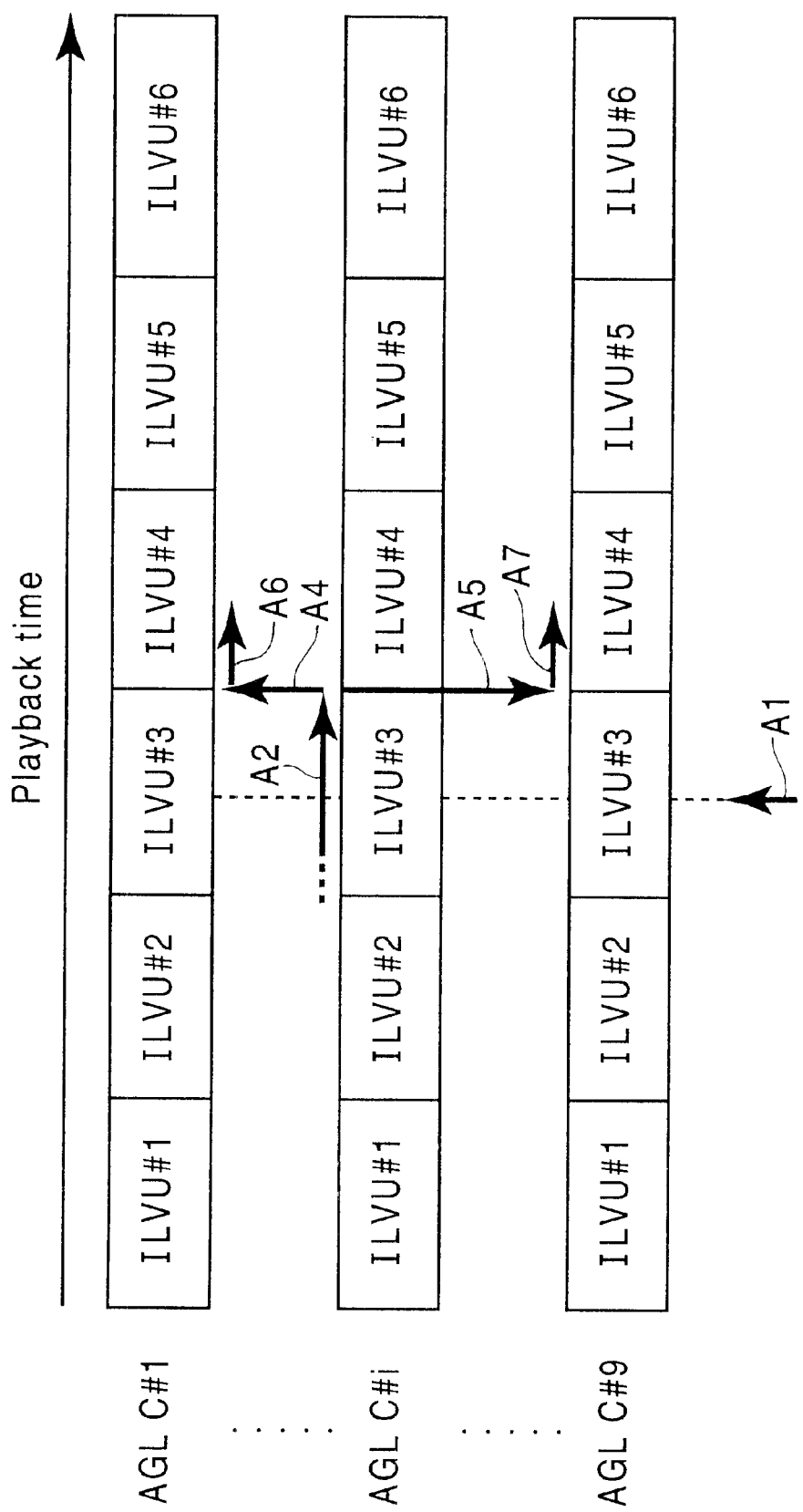
FIG. 27 shows a concept of an alteration of seamless angle by a seamless angle information (SML AGLI) shown in FIG. 24. i,e.

FIG. 27 is a concept of an alteration of seamless angle by a seamless angle information (SML AGLI) shown in FIG. 24.

Figure 28:
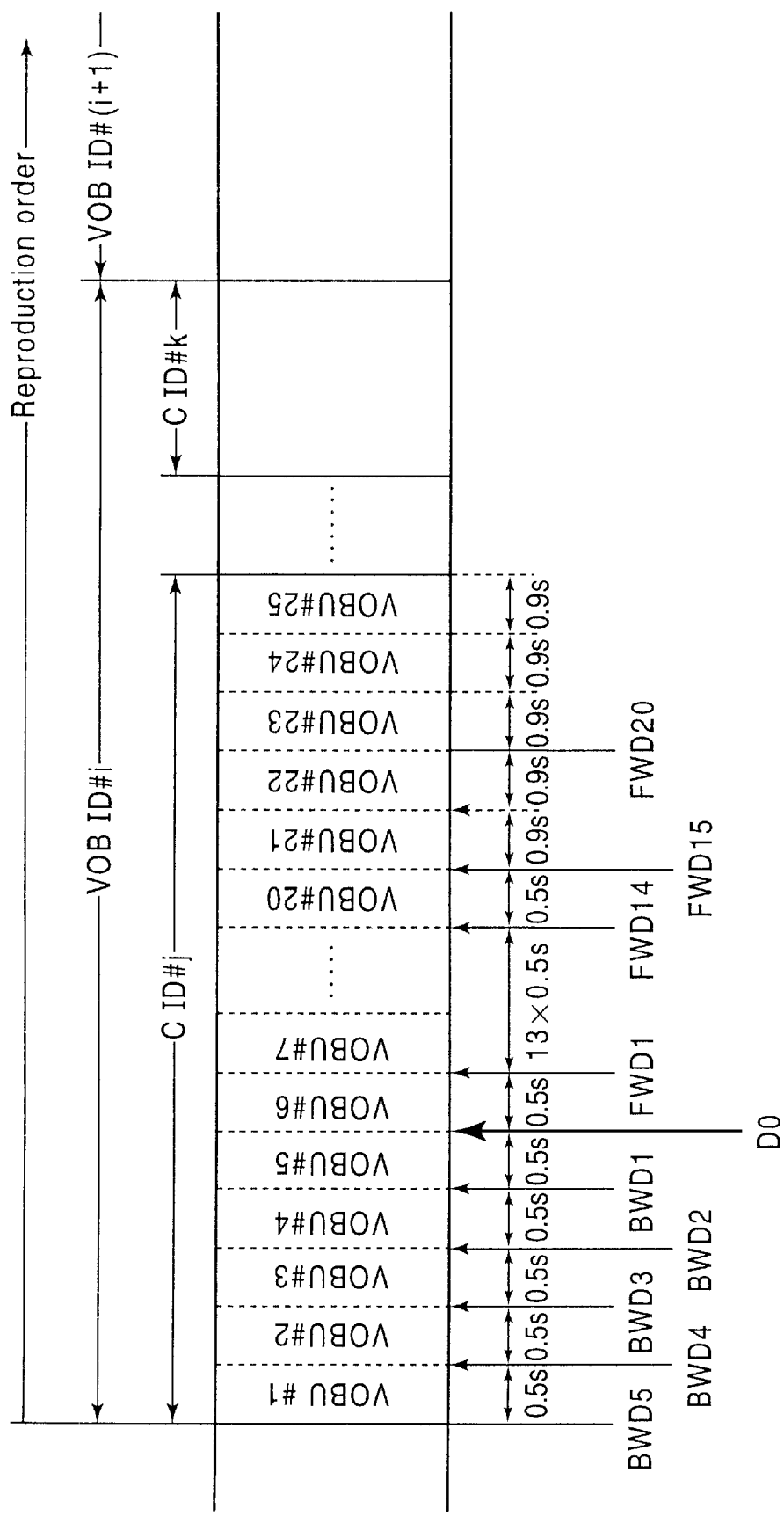
FIG. 28 shows an example of a video object unit search information (VOBU SRI) shown in FIG. 24.

FIG. 28 is an example of a video object unit search information (VOBU SRI) shown in FIG. 24.

FIG. 29 is a detail of the VOBU SRI shown in FIG. 24.

Figure 30:
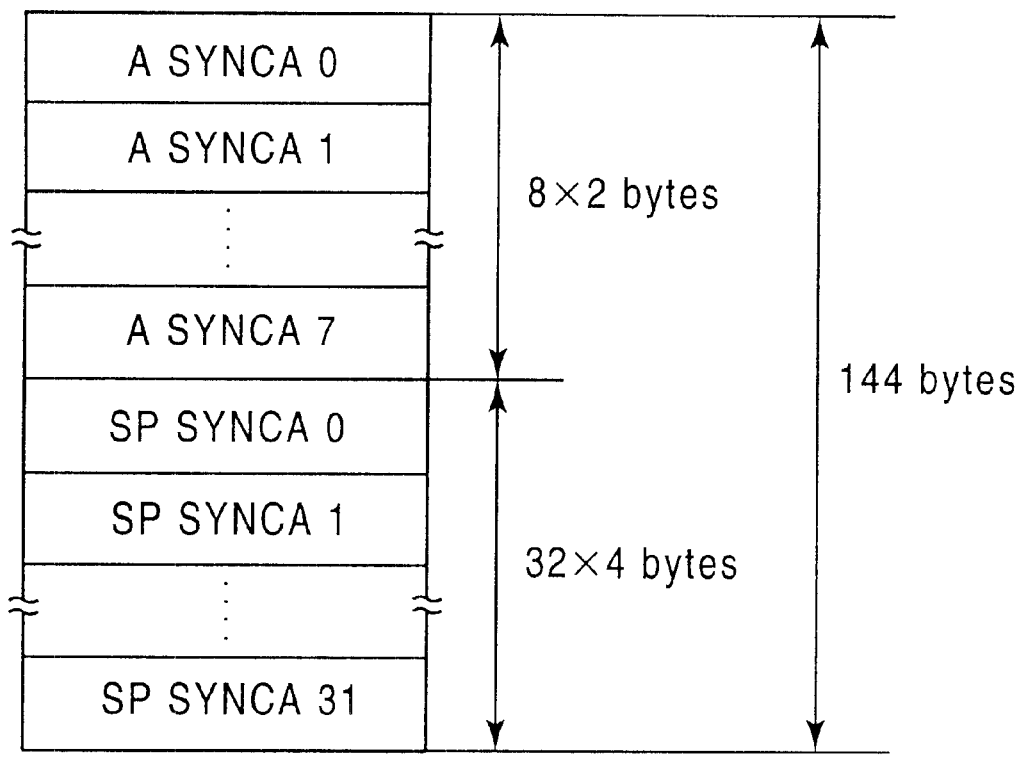
FIG. 30 shows a detail of a synchronous information (SYNCI) shown in FIG. 24.

FIG. 30 is a detail of a synchronous information (SYNCI) shown in FIG. 24.

Figure 41:
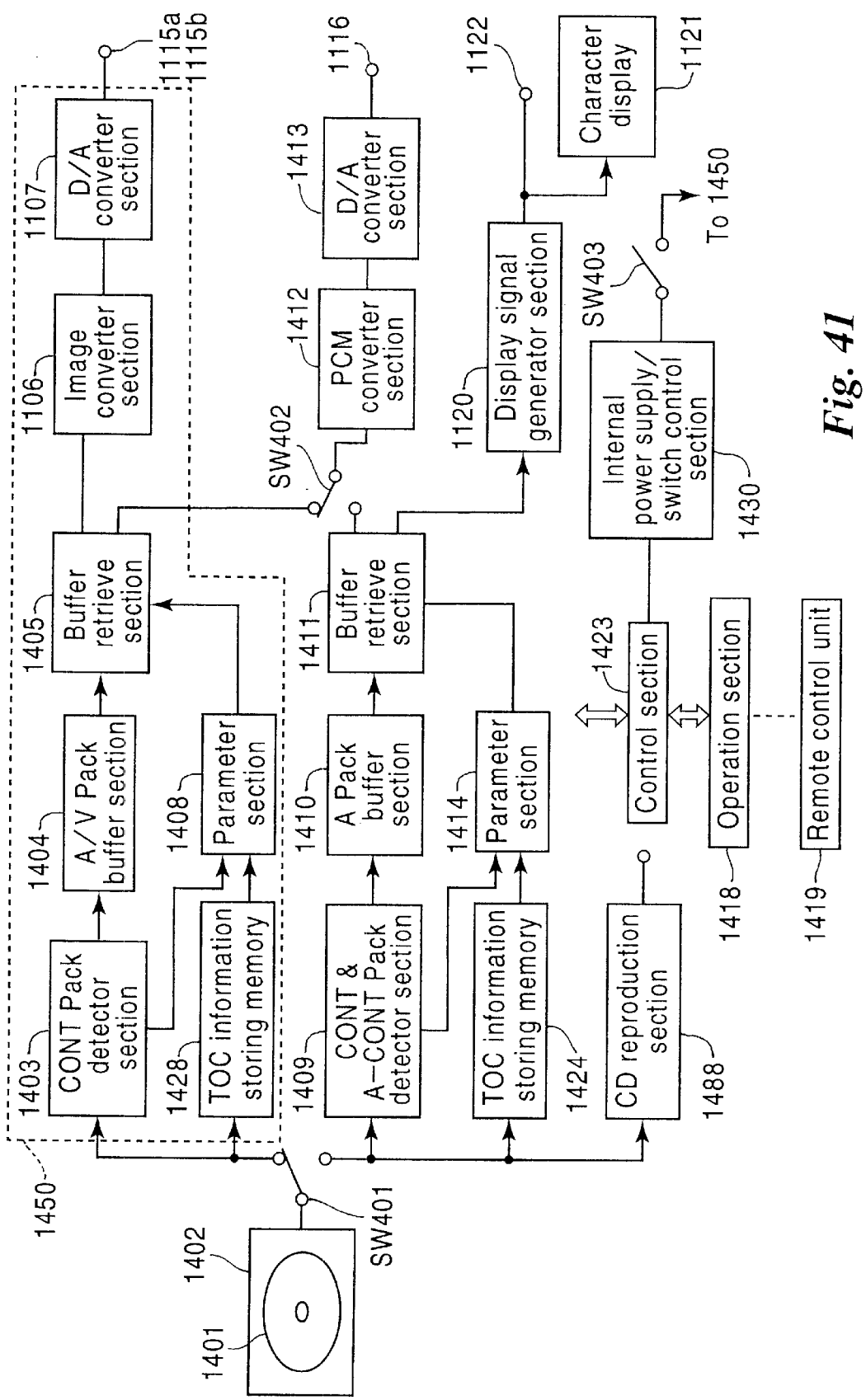
FIG. 41 shows a block diagram of a reproduction apparatus for a Van-Disc according to a fourth embodiment of the present invention.

FIG. 41 is a block diagram of a reproduction apparatus for a Van-Disc according to the fourth embodiment of the present invention.

Figure 42:
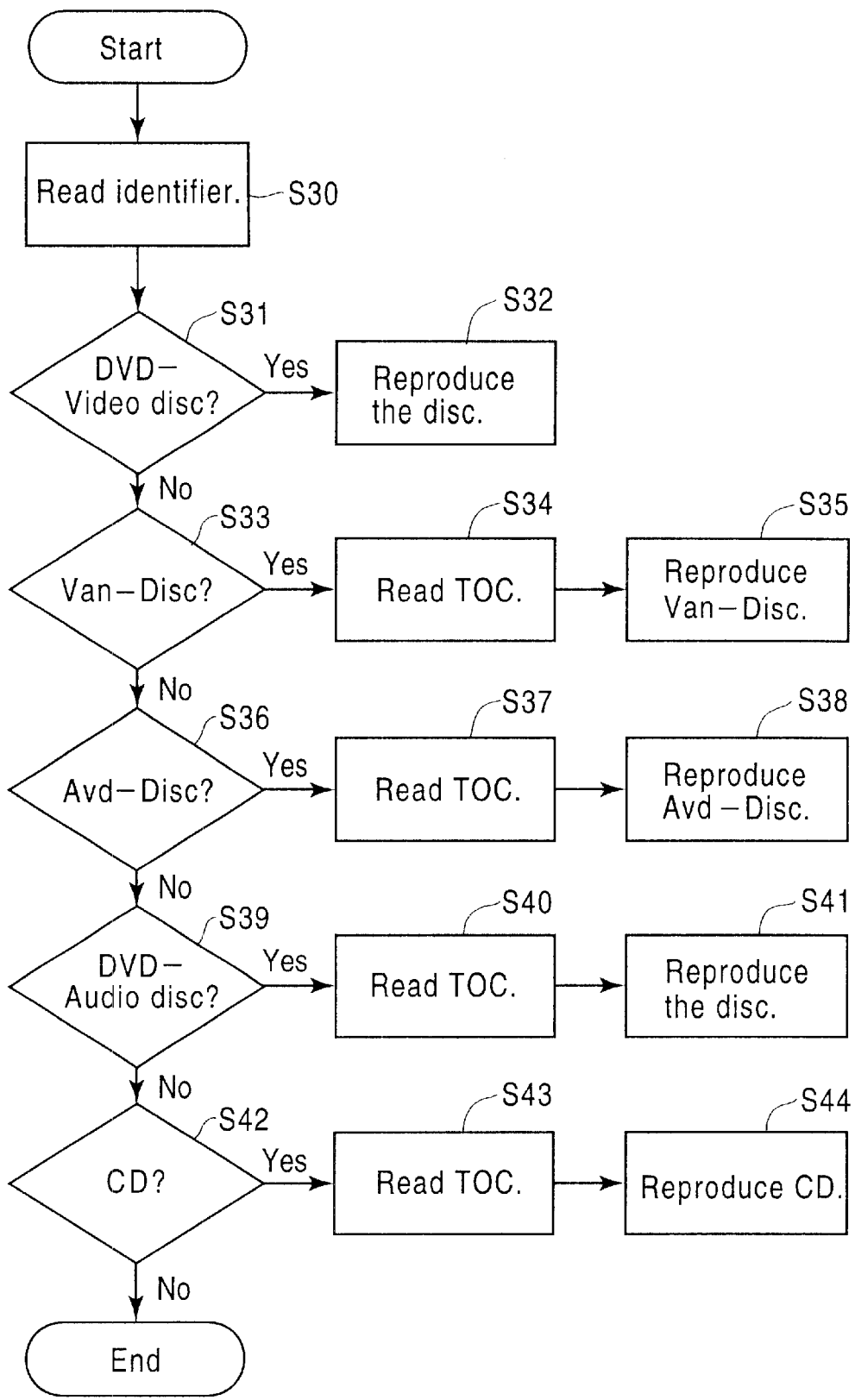
FIG. 42 shows a flow chart of reproduction process of a Van-Disc according to the fourth embodiment of the present invention.

FIG. 42 is a flow chart of reproduction process of Van-Disc according to the fourth embodiment of the present invention.

Figure 43:
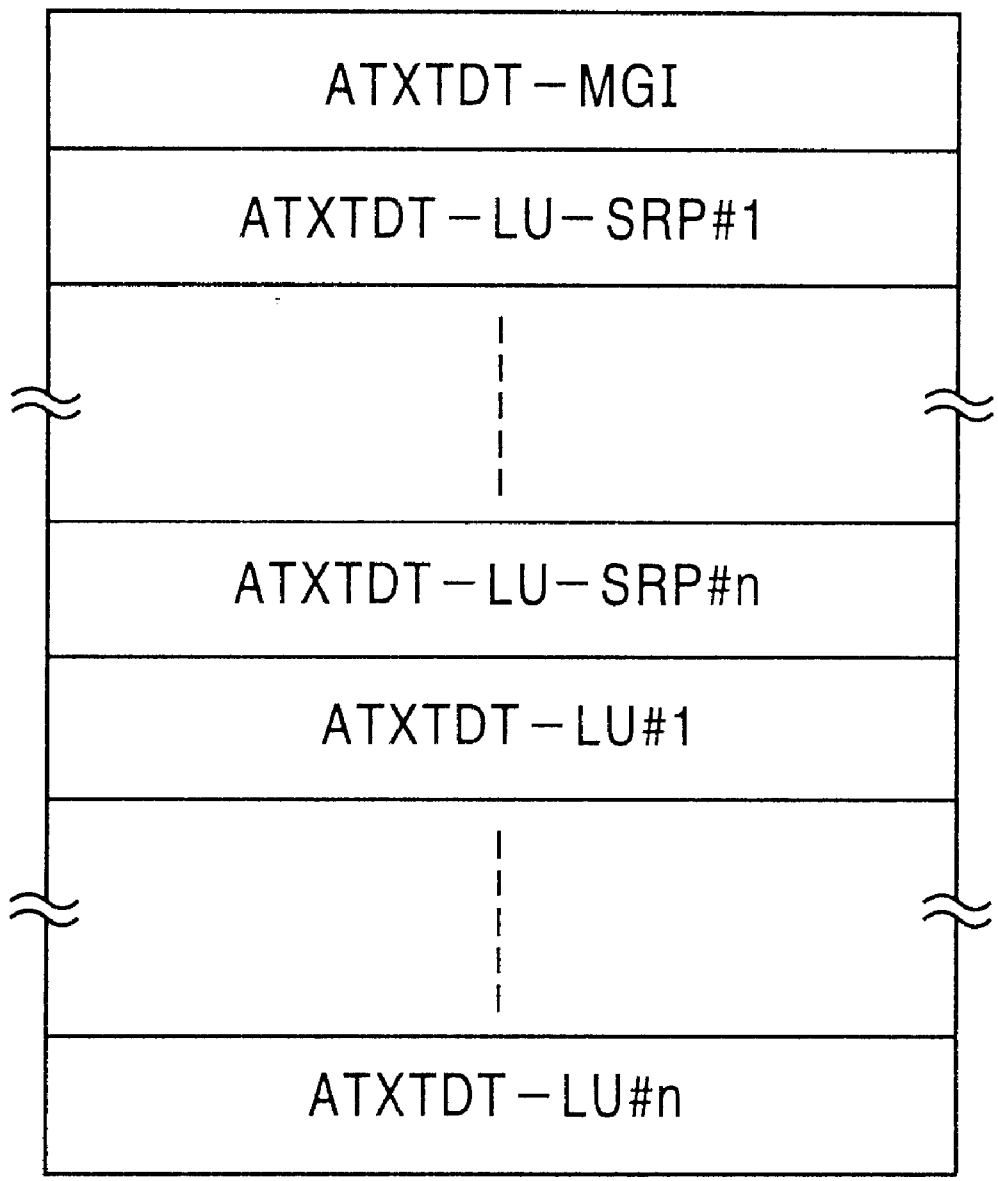
FIG. 43 shows a detailed format of a text data manager (TXTDT-MG) of an AMGI according to the fourth embodiment of the present invention.

FIG. 43 is a detailed format of a text data manager (TXTDT-MG) of an AMGI according to the fourth embodiment of the present invention.

Figure 44:
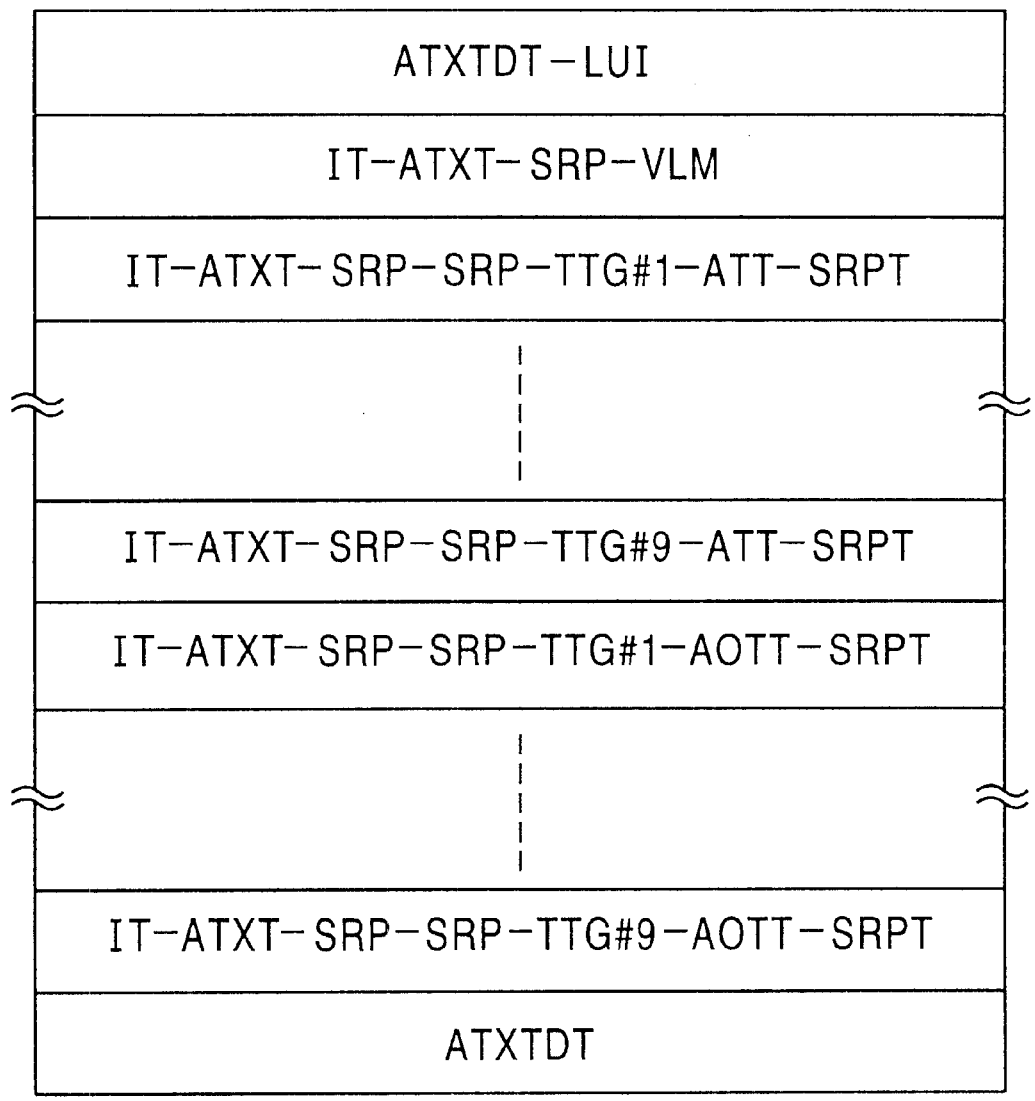
FIG. 44 shows a detailed format of an audio text data language unit (ATXTDT-LU) number 1 (#1) through number n (#n) shown in FIG. 43.

FIG. 44 is a detailed format of an audio text data language unit (ATXTDT-LU) number 1 (#1) through number n (#n) shown in FIG. 43.

Figure 45:
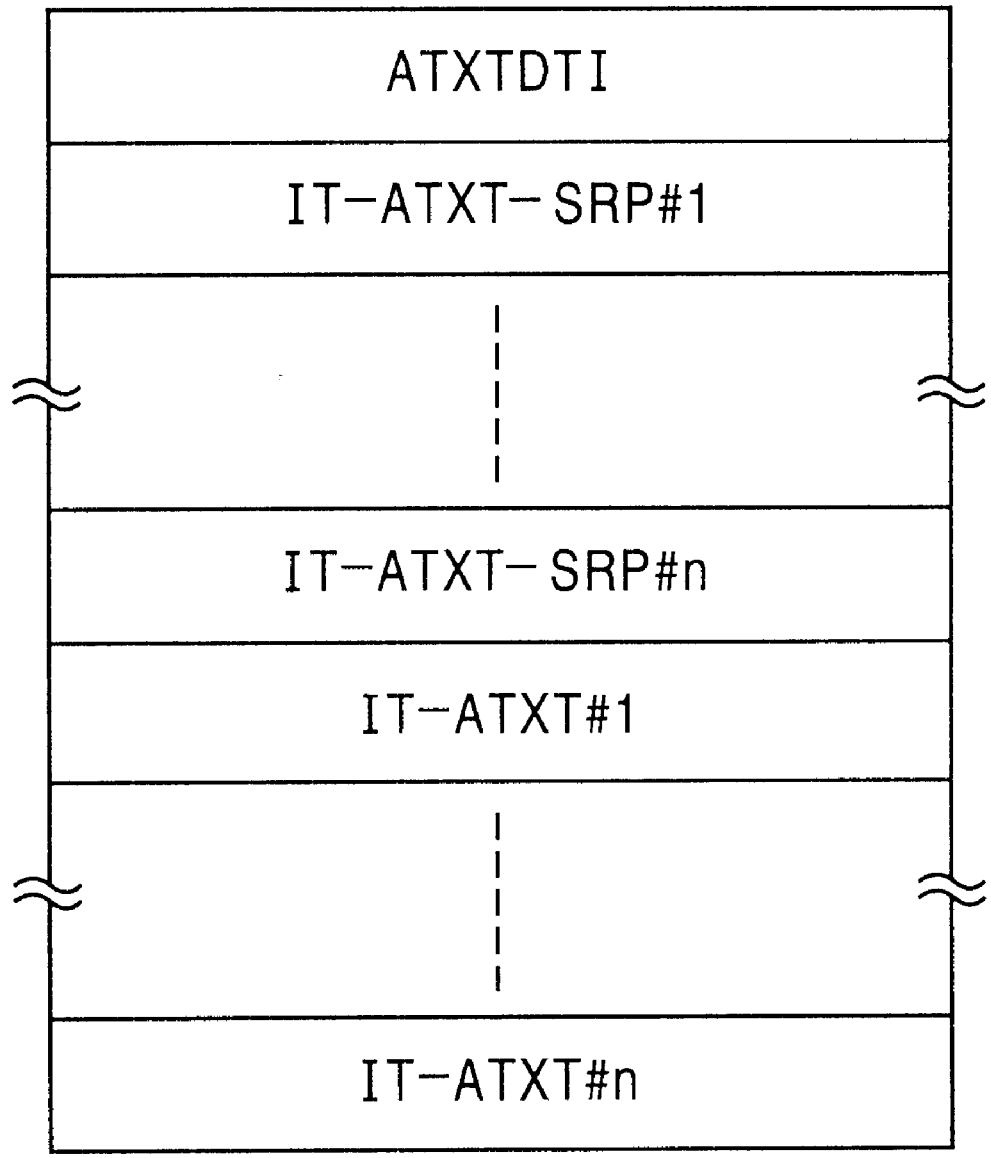
FIG. 45 shows a detailed format of an audio text data (ATXTDT) shown in FIG. 44.

FIG. 45 is a detailed format of an audio text data (ATXTDT) shown in FIG. 44.

Figure 46:
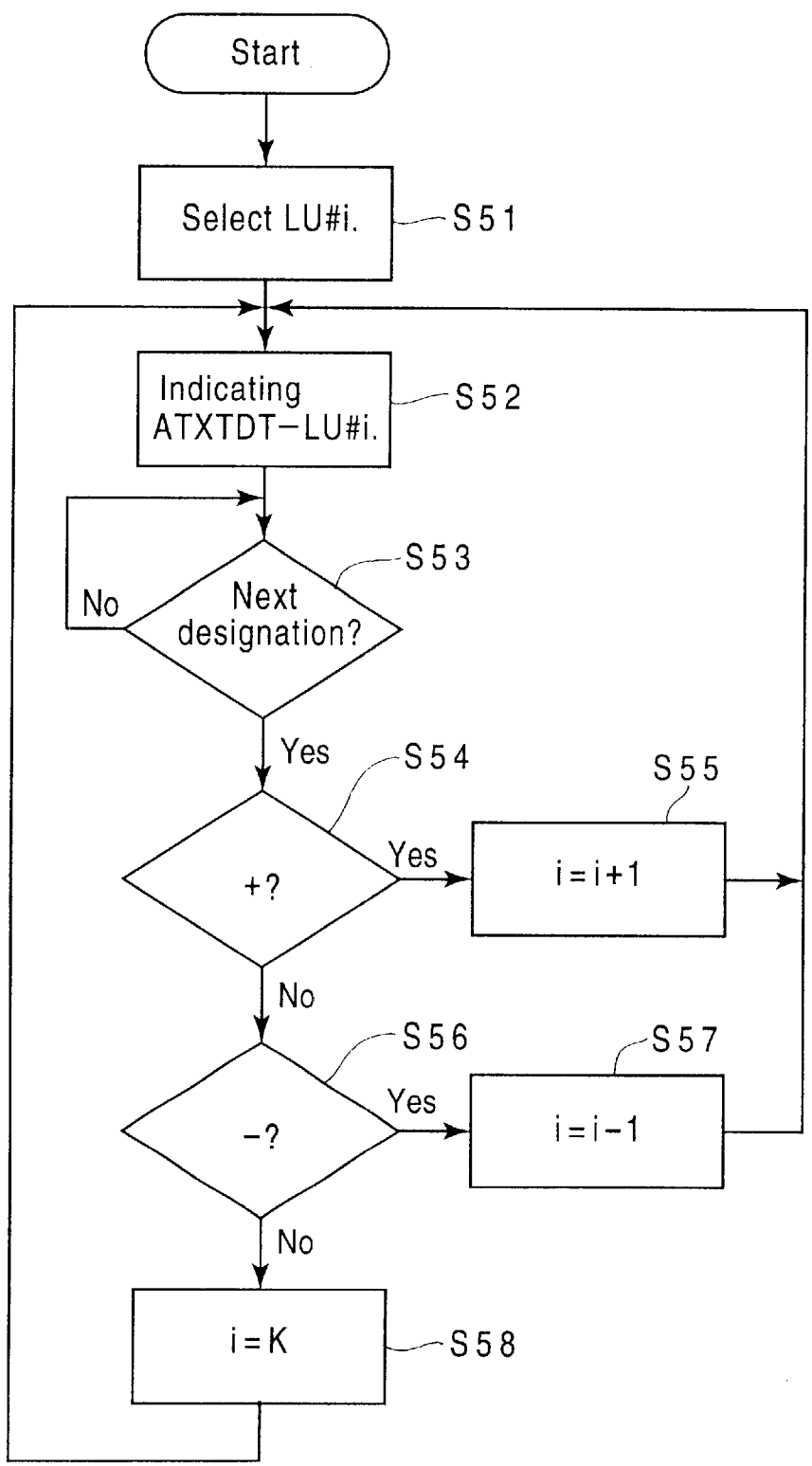
FIG. 46 shows a flow chart of indication process of an audio text data according to the fourth embodiment of the present invention.

FIG. 46 is a flow chart of indication process of an audio text data according to the fourth embodiment of the present invention.

Figure 47:
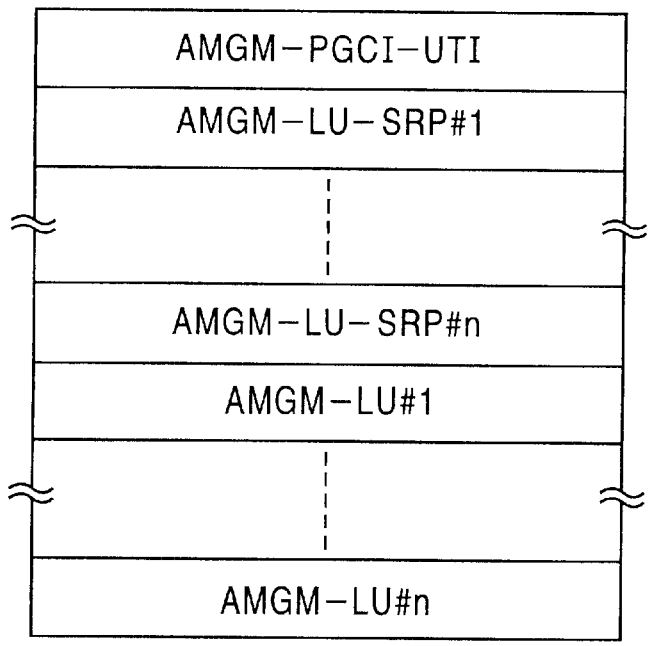
FIG. 47 shows a detailed format of an audio manager menu program chain information unit table (AMGM-PGCI-UT) according to the fourth embodiment of the present information.

FIG. 47 is a detailed format of an audio manager menu program chain information unit table (AMGM-PGCI-UT) according to the fourth embodiment of the present information.

Figure 48:
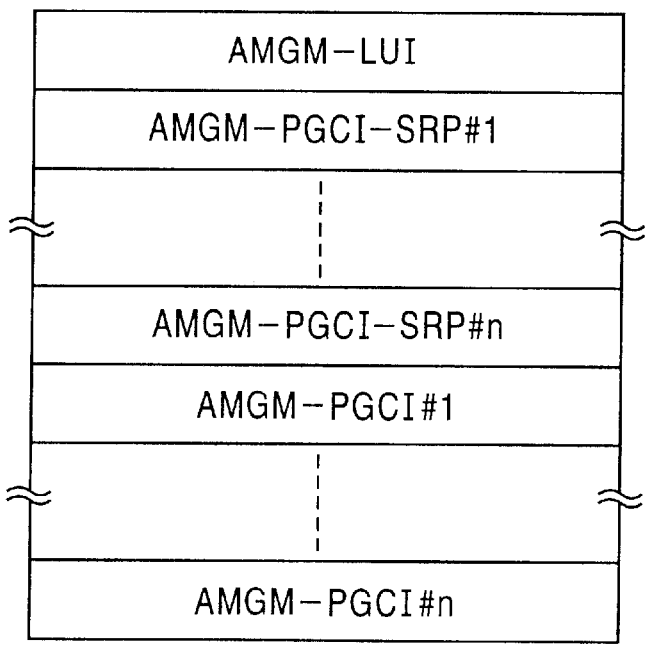
FIG. 48 shows a detailed format of an audio manager menu language unit (AMGM-LU) shown in FIG. 47.

FIG. 48 is a detailed format of an audio manager menu language unit (AMGM-LU) shown in FIG. 47.

Figure 49:
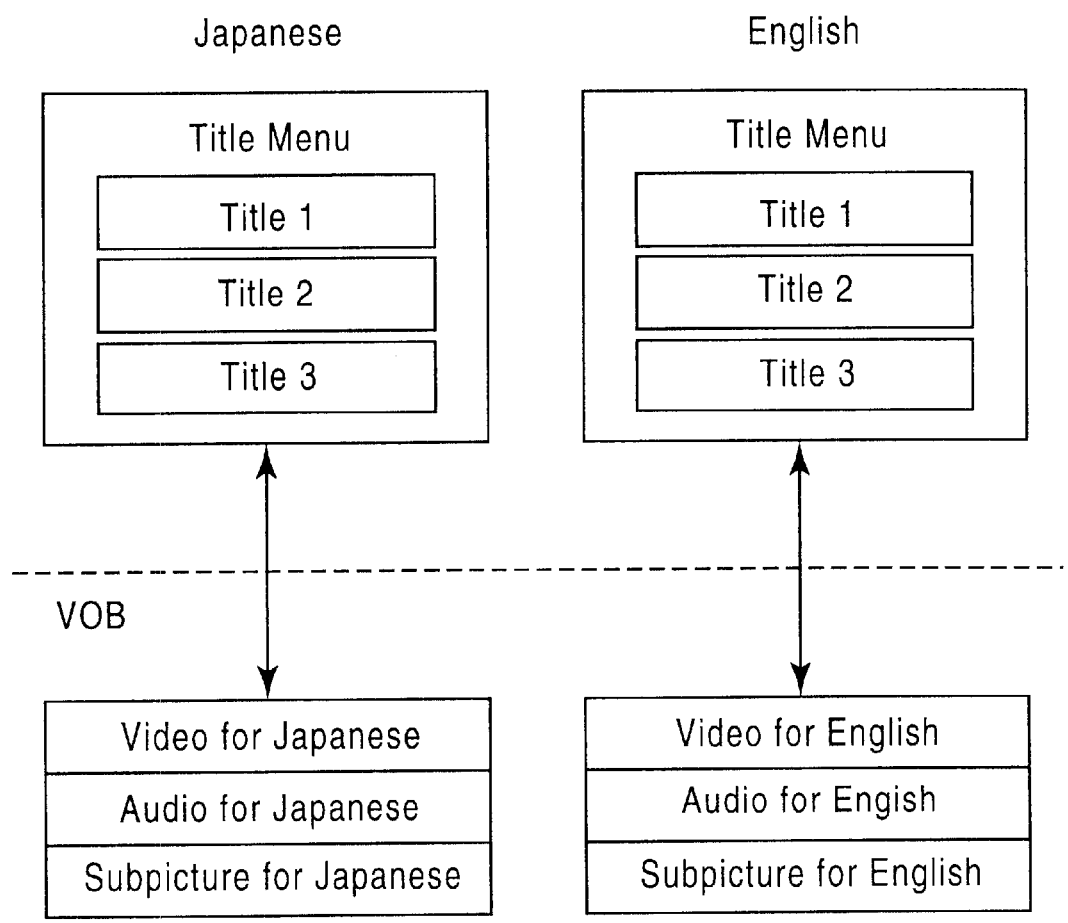
FIG. 49 shows an example of an AMGM-LU shown in FIG. 47.

FIG. 49 is an example of an AMGM-LU shown in FIG. 47.

Figure 50:
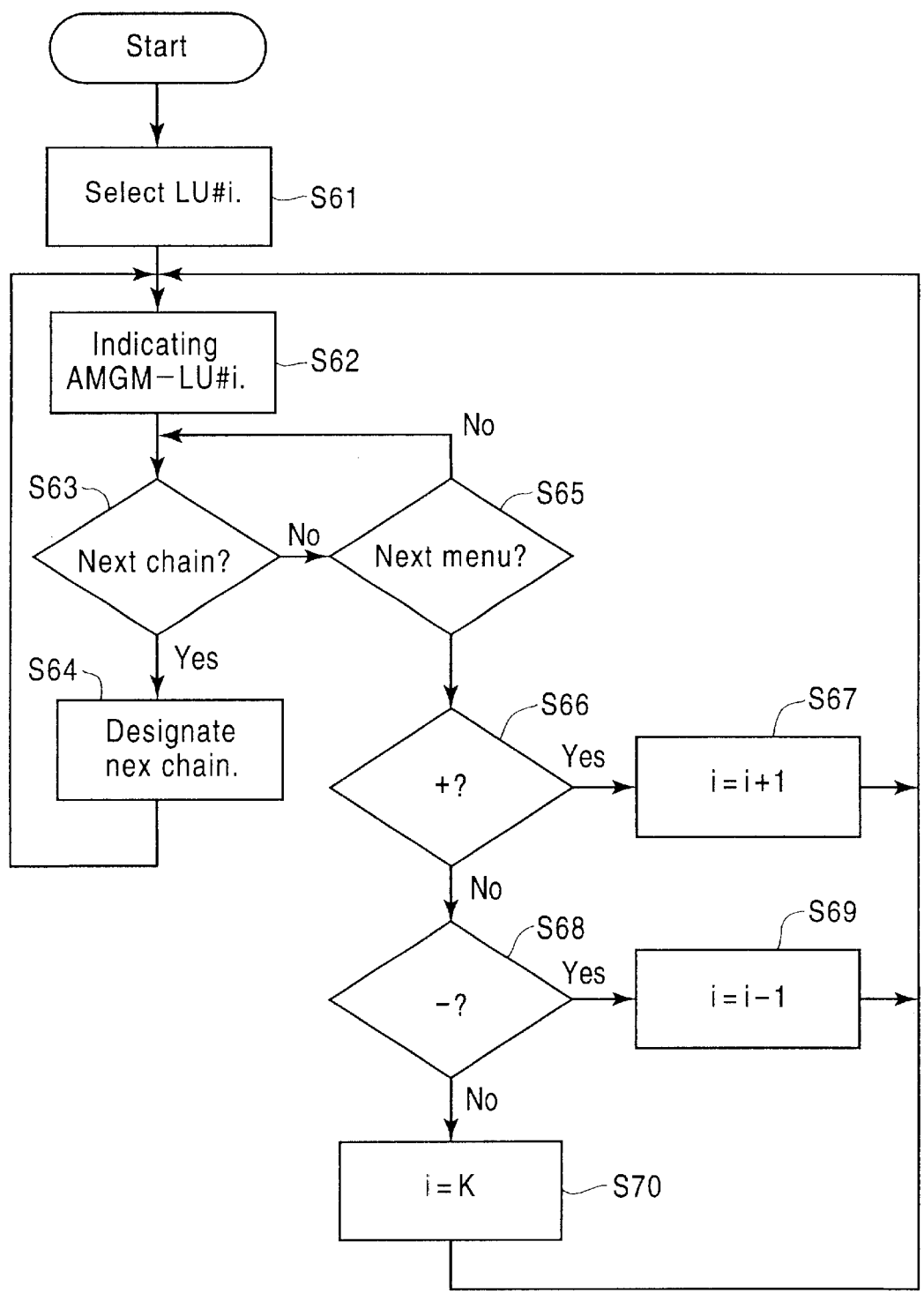
FIG. 50 shows a flow chart of an indication process of an AMGM-LU shown in FIG. 47.

FIG. 50 is a flow chart of an indication process of an AMGM-LU shown in FIG. 47.

In the first embodiment of the present invention, an ASD (Audio Search Data) contained in an A-CONT Pack shown in FIG. 15 is utilized for controlling reproduction of A Packs, wherein the ASD is detailed in FIG. 18(a), and a current number and a current time are utilized for seamless playback. Search information such as title set search, title search, track search, index search, and highlight search are utilized for jump reproduction.

On the other hand, in a Van-Disc according to the fourth embodiment of the present invention, a fundamental data format of a Van-Disc is arranged on the basis of the DVD-Video Specifications which is an international industry standard so as to enable the disc to be reproduced by various DVD players including a DVD-Video player.

In FIG. 1(b), a fundamental data format of a Van-Disc comprises a video manager (VMG) and an audio manager (AMG) area (VMG+AMG area) at a head of the data format and plural video title set (VTS) and audio title set (ATS) areas (VTS+ATS areas) following the VMG+AMG area, that is, the fundamental data format of the Van-Disc comprises a DVD-Video disc shown in FIG. 1(a) and a DVD-Audio disc shown in FIG. 2. The AMG and the ATS have the same functions as those explained in conjunction with FIG. 2.

Each VTS+ATS area comprises a VTS information (VTSI) and an ATS information (ATSI) area (VTSI+ATSI area) at a head of a data array, one or more than one unit of a video contents block set (VCBS) and an audio contents block set (ACBS) area (VCBS+ACBS area) following the VTSI+ATSI area, and a VTSI+ATSI area at an end of the data array. One VCBS contains plural video contents blocks (VCBs), on the other hand, one ACBS contains plural audio contents blocks (ACBs). Each VCB is equivalent to one Title of video, on the other hand, each ACB is equivalent to one Title of audio. Each VCB (one Title) includes plural Chapters and each ACB (one Title) includes plural Tracks. A Chapter includes a part of Title (PTT) and a Track includes a part of Title (PTT).

Each Chapter comprises plural CELLs, on the other hand, each Track comprises plural INDEXes. Each CELL comprises plural VCB units (VCBUs), on the other hand, each INDEX comprises plural ACB units (ACBUs). As shown in FIG. 13(c), one VCBU comprises a CONT Pack at a head of a data array, a relatively larger amount of A Packs, and a relatively less amount of V Packs, wherein an A-CONT Pack is excluded in the VCBU. One ACBU comprises arbitrary quantity of packs which is equal to a period of 0.4 to 1.0 second, wherein the period is almost the same space as that of a VCBU, and an A Pack which is allocated immediately after a V Pack is arranged at a head of an ACBU data array. In addition thereto, a VCBU is called a VOBU (Video OBject Unit) in the DVD-Video Specifications.

According to the first embodiment, ACD and ASD packets are contained in an A-CONT Pack. However, in a Van-Disc, since an A-CONT Pack is not included in an ACBU, they are arranged in one area or both areas out of an AMG (Audio Manager) and an ATS (Audio Title Set) areas as shown in FIG. 1(b).

An ACD packet of the first embodiment is arranged in an A-CONT Pack which is arranged in every ACBU or in every 0.5 to 1.0 second of time period and the ACD packet can contain many picture data. However, in a Van-Disc according to the fourth embodiment, both data such as a VMG and an AMG or a VTS and an ATS of a DVD-Video disc and DVD-Audio disc data formats are contained in one disc, so that containable data quantity is limited. Further, an ACD packet is arranged in a VMG area or a VTS area. Therefore, rather lesser quantity of data such as title name of each program or each movement of music is contained. Furthermore, one audio reproduction control information which will follow can be contained.

Although an ACD information area of an ACD packet is possible to be arranged for data of two language characters [1] and [2] as shown in FIG. 16(a) of the first embodiment, it can be arranged as shown in FIG. 16(b) with eliminating data of character [2] of a second language. The 636-byte ACD information area comprises 48 bytes of general information area, a 294-byte area, and 294 bytes of audio reproduction control information area. The 294-byte area includes 93 bytes of name space area, 93 bytes of free space "1" area, 93 bytes of free space "2" area, and 15 bytes of data pointer area, wherein the 294-byte area is utilized for displaying audio navigation information such as a music title as shown in FIG. 17 of character [1] of one language.

Contents of 294-byte audio reproduction control information area are optional and they can be arranged as, for instance, 25 bytes each of 10 audio reproduction control information areas (250 bytes in total) and 44 bytes of reserved area. 25 bytes each of audio reproduction control area contains 20 bytes of graphic equalizer information, 3 bytes of level balance information, and 2 bytes of adding reverberation information. These information can be selected by a user and utilized for controlling tonal quality of audio signals. These audio reproduction control information are controllable data by a professional recording mixer at his preference, it renders the best performance in the tonal quality when reproducing some music contained in A Packs depending on a music genre; classical, jazz, rock, or BGM (Back Ground Music), state of performance, recording conditions, and atmosphere. The 44 bytes of reserved area is arranged with a mixing coefficient which is utilized for reproducing multichannel audio signals, for example, 6 channel audio signals to be mixed down to 2 channel stereophonic signals.

In FIG. 18(b), the 1000-byte ASD is depicted in detail. It excludes 8 bytes of current number information area and 16 bytes of current time information area in comparison with FIG. 18(a) of the first embodiment of the present invention so that a CONT Pack is utilized for seamless playback of A Packs, wherein these current number and current time information areas (24 bytes in total) are utilized for a reserved area (52+24=76 bytes). Therefore, minute display or elaborate reproduction control which is realized in the first embodiment is not feasible. However, since a Van-Disc can be reproduced by a DVD-Video player, the Van-Disc is anticipated to become an effective audio disc during a transient period until other audio discs which are not able to be reproduced by a DVD-Video player, become available.

In FIG. 20, a CONT Pack is depicted in detail. The CONT Pack is called a navigation pack (NV Pack) in the DVD-Video Specifications and comprises 14 bytes of pack header, 24 bytes of system header, 986 bytes of presentation control information packet (PCI PKT), and 1024 bytes of data search information packet (DSI PKT). The PCI is called reproduction control information and the 986 byte PCI PKT contains 6 bytes of packet header, one byte of sub stream ID, and 979 bytes of PCI data which is detailed in FIG. 21. The 1024-byte DSI PKT contains 6 bytes of packet header, one byte of sub stream ID, and 1017 bytes of DSI data which is detailed in FIG. 24.

In FIG. 21, 979-byte PCI data is depicted in detail. It is navigation data to control reproduction of VOBUs and comprises 4 information; 60 bytes of PCI general information (PCI GI), 36 bytes of nonseamless angle information (NSML AGLI), 694 bytes of highlight information (HLI), and 189 bytes of record information (RECI).

As shown in FIG. 22, one PCI GI comprises;

4 bytes of "LBN (Logical Block Number) of NV Pack or CONT Pack" (NV PCK LBN), 2 bytes of "VOBU (Video OBject Unit) category" (VOBU CAT), 2 bytes of reserved area, 4 bytes of "VOBU user operation control information" (VOBU UOP CTL), 4 bytes of "VOBU start PTM (Presentation Time)" (VOBU S PTM), 4 bytes of "VOBU end PTM" (VOBU E PTM), 4 bytes of "end PTM of VOBU sequence end" (VOBU SE E (PTM), 4 bytes of "in-cell elapsed time" (C ELTM), and 32 bytes of reserved area.

In an NV PCK LBN, an address of the NV Pack in which a PCI data is contained is described in RLBN (Relative Logical Block number) from a head LB (Logical Block) of a video object set (VOBS) which contains the PCI data. In a VOBU CAT, a state of analog protection system (APS) of a VOBU is described.

The nonseamless angle information (NSML AGLI) shown in FIG. 24 is information concerning a destination address when changing an angle. The NSML AGLI is effective when changing angle cell alteration into nonseamless, that is, when a seamlees angle alteration flag is assigned to "nonseamless". The HLI shown in FIG. 21 is information of highlighting one rectangular area in a sub-picture indicating area. Contrast of colors of video and sub-picture in a specific rectangular area can be changed in accordance with the HLI. A reproduction period of sub-picture unit (SPU) of each picture stream has the same period as an effective period of HLI.

FIG. 23, RECI (record information) shown in FIG. 21 is depicted in detail. It comprises;

10 bytes of "ISRC (International Standard Recording Code) of video data in a video stream" (ISRC V), 10 bytes of "ISRC of audio data in a decoding audio stream #0" (ISRC A0), 10 bytes of "ISRC of audio data in a decoding audio stream #1" (ISRC A1), 10 bytes of "ISRC of audio data in a decoding audio stream #2" (ISRC A2), 10 bytes of "ISRC of audio data in a decoding audio stream #3" (ISRC A3), 10 bytes of "ISRC of audio data in a decoding audio stream #4" (ISRC A4), 10 bytes of "ISRC of audio data in a decoding audio stream #5" (ISRC A5), 10 bytes of "ISRC of audio data in a decoding audio stream #" (ISRC A6), 10 bytes of "ISRC of audio data in a decoding audio stream #7" (ISRC A7), 10 bytes of "ISRC of sub-picture (SP) data in a decoding SP stream #0, #8, #16, or #24" (ISRC SP0), 10 bytes of "ISRC of SP data in a decoding SP stream #1, #9, #17, or #25" (ISRC SP1), 10 bytes of "ISRC of SP data in a decoding SP stream #2, #10, #18, or #26" (ISRC SP2), 10 bytes of "ISRC of SP data in a decoding SP stream #3, #11, #19, or #27" (ISRC SP3), 10 bytes of "ISRC of SP data in a decoding SP stream #4, #12, #20, or #28" (ISRC SP4), 10 bytes of "ISRC of SP data in a decoding SP stream #5, #13, #21, or #29" (ISRC SP5), 10 bytes of "ISRC of SP data in a decoding SP stream #6, #14, #22, or #30" (ISRC SP6), 10 bytes of "ISRC of SP data in a decoding SP stream #7, #15, #23, or #31" (ISRC SP7), one byte of "SP stream group selected for ISRC" (ISRC SP SEL) and 18 bytes of reserved area.

In FIG. 24, DSI data shown in FIG. 20 is depicted in detail. It is navigation data to practice seamless reproduction of VOBUs after searching data and comprises;

32 bytes of DSI general information (DSI GI), 148 bytes of seamless playback information (SML PBI), 54 bytes of seamless angle information (SML AGLI), 168 bytes of VOBU search information (VOBU SRI), 144 bytes of synchronous information (SYNCI), and 471 bytes of reserved area.

In FIG. 25, DSI general information (DSI GI) is depicted in detail. It comprises;

4 bytes of "SCR (System Clock Reference) base of NV PCK" (NV PCK SCR), 4 bytes of "LBN of NV PCK" (NV PCK LBN), 4 bytes of "end address of VOBU" (VOBU EA), 4 bytes of "end address of first reference picture of VOBU" (VOBU 1STREF EA), 4 bytes of "end address of second reference picture of VOBU " (VOBU 2NDREF EA), 4 bytes of "end address of third reference picture of VOBU " (VOBU 3RDREF EA), 4 bytes of "VOB (Video OBject) ID number of VOBU" (VOBU VOB IDN), one byte of reserved area, one byte of "cell ID number of VOBU" (VOBU C IDN), and 4 bytes of "cell elapsed time" (C ELTM).

FIG. 26, SML PBI shown in FIG. 24 is depicted in detail. The SML PBI comprises;

2 bytes of "category of seamless VOBU" (VOBU SML CAT), 4 bytes of "end address of interleaved unit" (ILVU EA), 4 bytes of "start address of next interleaved unit" (NXT ILVU SA), 2 bytes of "size of next interleaved unit" (NXT ILVU SZ), 4 bytes of "video start PTM of VOB" (VOB V S PTM), 4 bytes of "video end PTM of VOB" (VOB V E PTM), 8 bytes each of 8 "audio stop PTM of VOB" (VOB A STP PTM), and 8 bytes each of 8 "audio gap length of VOB" (VOB A GAP LEN), In FIG. 27, SML AGLI shown in FIG. 24 is depicted in detail. It is information concerning a destination address for changing an angle. The SML AGLI is effective when the angle change is carried out in seamless, that is, when a seamless angle alteration flag is assigned to "seamless".

When a user demands to change an angle as indicated by an arrow Al in FIG. 27, while an interleaved unit number 3 (ILVU#3) of an angle cell number i (AGL C#i) as indicated by an arrow A2 is reproduced, the angle is changed to an angle cell number 1 (AGL C#1) as indicated by an arrow A4 at an end of the ILVU#3 and then an ILVU#4 of the AGL C#1 is reproduced as indicated by an arrow AB. Or the angle is changed to a angle cell number 9 (AGL C#9) as indicated by an arrow A5 at the end of the ILVU#3 and an ILVU#4 of the AGL C#9 is reproduced as indicated by an arrow A7 in accordance with a designation of the user.

As shown in FIG. 28, a head address of a VOBU is described in a VOBU SRI cell, wherein the VOBU is reproduced Mevery 0.5 second (n×0.5 seconds) before and after a reproduction start timing of a VOBU which contains DSI. The VOBU SRI is effective in one cell.

In FIG. 28, when a VOBU#6 is reproduced, a head address D0 (DSI D0) is included in a VOBU #6 which is contained in a CELL of ID number j (C ID #j) of a VOBU of ID number i (VOBU ID #i). A head address (BWD1) and a video present flag of a VOBU (VOBU#5) which is allocated by 0.5 second prior to the VOBU#6 are described in a "head address of −1 VOBU and video present flag" (BWDI 1) which is depicted in FIG. 29. A head address (BWD2) and a video present flag of a −2 VOBU (VOBU#4) which is allocated by 1 second prior to the VOBU#6 are described in a BWDI 2, in the same manner as VOBU#4, head addresses; BWD3 through BWD5 and FWD1 through FWD20 and video flags of VOBU#3 through VOBU#1 and VOBU#7 through VOBU#23 are described in BWDI 3 through BWDI 5 and FWDI 1 through FWDI 20 respectively. In addition thereto, addresses; FWD60, FWD120, FWD240, BWD6 through BWD15, BWD20, BWD60, and BWD240 are not present in the C ID#j. Further, a FWDI Next (head address of next VOBU and video present flag) and a BWDI Prev (head address of previous VOBU and video present flag) are equivalent to the FWDI 1 and the BWDI 1 respectively. In case that the BWD1 (BWDI 1) is designated while the VOBU#6 is reproduced, reproduction starts from the VOBU#5 which is allocated by 0.5 second prior to the VOB#6.

In FIG. 29, VOBU SRI is depicted in detail. It comprises;

4 bytes of "head address of next VOBU contained in video data" (FWDI Video), 4 bytes of "head address of +240 VOBU and video present flag" (FWDI 240), 4 bytes of "head address of +120 VOBU and video present flag" (FWDI 120), 4 bytes of "head address of +60 VOBU and video present flag" (FWDI 60), 4 bytes of "head address of +20 VOBU and video present flag" (FWDI 20), 4 bytes of "head address of +15 VOBU and video present flag" (FWDI 15), 4 bytes of "head address of +14 VOBU and video present flag" (FWDI 14), 4 bytes of "head address of +13 VOBU and video present flag" (FWDI 13), 4 bytes of "head address of +12 VOBU and video present flag" (FWDI 12), 4 bytes of "head address of +11 VOBU and video present flag" (FWDI 11), 4 bytes of "head address of +10 VOBU and video present flag" (FWDI 10), 4 bytes of "head address of +9 VOBU and video present flag" (FWDI 9), 4 bytes of "head address of +8 VOBU and video present flag" (FWDI 8), 4 bytes of "head address of +7 VOBU and video present flag" (FWDI 7), 4 bytes of "head address of +6 VOBU and video present flag" (FWDI 6), 4 bytes of "head address of +5 VOBU and video present flag" (FWDI 5), 4 bytes of "head address of +4 VOBU and video present flag" (FWDI 4), 4 bytes of "head address of +3 VOBU and video present flag" (FWDI 3), 4 bytes of "head address of +2 VOBU and video present flag" (FWDI 2), 4 bytes of "head address of +1 VOBU and video present flag" (FWDI 1), 4 bytes of "head address of next VOBU and video present flag" (FWDI Next), 4 bytes of "head address of previous VOBU and video present flag" (BWDI Prev)

4 bytes of "head address of −1 VOBU and video present flag" (BWDI 1), 4 bytes of "head address of −2 VOBU and video present flag" (BWDI 2), 4 bytes of "head address of −3 VOBU and video present flag" (BWDI 3), 4 bytes of "head address of −4 VOBU and video present flag" (BWDI 4), 4 bytes of "head address of −5 VOBU and video present flag" (BWDI 5), 4 bytes of "head address of −6 VOBU and video present flag" (BWDI 6), 4 bytes of "head address of −7 VOBU and video present flag" (BWDI 7), 4 bytes of "head address of −8 VOBU and video present flag" (BWDI 8), 4 bytes of "head address of −9 VOBU and video present flag" (BWDI 9), 4 bytes of "head address of −10 VOBU and video present flag" (BWDI 10), 4 bytes of "head address of −11 VOBU and video present flag" (BWDI 11), 4 bytes of "head address of −12 VOBU and video present flag" (BWDI 12), 4 bytes of "head address of −13 VOBU and video present flag" (BWDI 13), 4 bytes of "head address of −14 VOBU and video present flag" (BWDI 14), 4 bytes of "head address of −15 VOBU and video present flag" (BWDI 15), 4 bytes of "head address of −20 VOBU and video present flag" (BWDI 20), 4 bytes of "head address of −60 VOBU and video present flag" (BWDI 60), 4 bytes of "head address of −120 VOBU and video present flag" (BWDI 120), 4 bytes of "head address of −240 VOBU and video present flag" (BWDI 240), and 4 bytes of "head address of previous VOBU contained in video data" (BWDI Video), In FIG. 30, SYNCI shown in FIG. 24 is depicted in detail. The SYNCI is address information of audio data and sub-picture data which are reproduced in synchronous with video data of a VOBU containing DSI and comprises;

2 bytes each of 8 "address of objective audio pack (A PCK)" (A SYNCA 0 through A SYNCA 7), and 4 bytes each of 32 "VOBU head address of objective sub-picture pack (SP PCK)" (SP SYNCA 0 through SP SYNCA 31).

In FIG. 41, a schematic diagram of a reproduction apparatus is shown. A driving device 1402 can reproduce a disc 1401 such as a DVD disc and a CD, wherein a DVD disc is different from a CD in thickness. In case of a DVD-Audio disc and a Van-Disc, in accordance with aforementioned disc identifier which is detailed in FIG. 33 of referred to the first embodiment, a control section 1423 changes respective positions of switches SW401, SW402, and SW403. The switch SW401 is turned to a side of a CONT Pack detector section 1403 and a TOC information memory device 1428, the switch SW402 is turned to a side of a buffer retrieve section 1405, and the switch SW403 is closed to connect a power supply 1430 to a video processing device 1450. In case of other discs, the switch SW401 is turned to a side of a CONT & ACONT Pack detector section 1409 and a TOC information storing memory 1424 and a CD reproduction section 1488, the switch SW402 is turned to a side of a buffer retrieve section 1411, and the switch SW403 is turned off the power supply to the video processing device 1450 by the control section 1423.

In FIG. 42, a disc identifier is read out from a disc 1401 (step S30), then the disc 1401 is discriminated whether it is a DVD-Video disc or not (step S31). In case of a DVD-Video disc, it is reproduced in menu reproduction or text data reproduction (step S32). During this reproduction process, as shown in FIG. 41, the reproduced signals are transmitted to the CONT Pack detector section 1403 through the switch SW401. The CONT Pack detector section 1403 detects CONT Packs included in the reproduced data and arranges control parameters in a parameter section 1408, at the same time, the CONT Pack detector section 1403 writes sequentially V Packs, SP Packs, and A Packs which are controlled by the information in CONT Packs in an A/V Pack buffer section 1404.

The V Packs and user data (video signals and sub-picture information) contained in the SP Packs, wherein the V Packs and the user data are written in the A/V Pack buffer section 1404, are retrieved by a buffer retrieve section 1405 in pack sequence in accordance with a SCR (System Clock Reference explained referring to FIG. 14) contained in a V Pack or retrieved in output timing sequence in accordance with a PTS (Presentation Time Stamp) contained in a CONT Pack, and then the V Packs and the user data are outputted as analog video signals through an image converter section 1106, a D/A converter 1107, a video signal output terminal 1115a, and a SP information output terminal 1115b. User data (audio signals) contained in the A Packs which are written in the A/V Pack buffer section 1404 are retrieved by the buffer retrieve section 1405 in pack sequence in accordance with an SCR or retrieved in output timing sequence in accordance with the information in CONT Packs, and then the audio signals are outputted as analog audio signals through the switch SW402, a PCM converter section 1412, a D/A converter section 1413, and an audio signal output terminal 1116.

In case of a Van-Disc, CONT Packs and TOC information contained in the reproduced signals are transmitted to the CONT Pack detector section 1403 and the TOC information storing memory 1428 through the switch SW401. Reproduction process of V Packs and A Packs are the same manner as that of a DVD-Video disc. Cuing of program or movement of music is performed in accordance with TOC information. In FIG. 42, a disc is discriminated as a Van-Disc (step S33), then TOC information are read (step S34) and the Van-Disc is reproduced in audio menu reproduction or audio text data reproduction (step S35).

In case of a DVD-Audio disc and a DVD-Avd disc (Avd-Disc) which is a combination disc of DVD-Audio data and AV data of DVD-Video stream, CONT or A-CONT Packs and TOC information contained in reproduced signals are transmitted to the CONT & A-CONT Pack detector section 1409 and the TOC information storing memory 1424 through the switch SW401 which is turned to a side of the CONT & A-CONT Pack detector section 1409 and the TOC information storing memory 1424. The CONT & A-CONT Pack detector 1409 detects CONT Packs or A-CONT Packs of reproduced data and arranges control parameters in a parameter section 1414 and writes sequently A Packs which are controlled by the information in the CONT Packs or A-CONT Packs in a A Pack buffer section 1410.

User data (audio signals) of A Packs which are written in the A Pack buffer section 1410 are retrieved by a buffer retrieve section 1411 in pack sequence in accordance with a SCR or in output timing sequence in accordance with current time information of an ASD (Audio Search Data explained referring to FIG. 18(*a*)) contained in the A-CONT Packs. The user data are outputted as analog audio signals through the switch SW402 which is set to connect the buffer retrieve section 1411 to the PCM converter section 1412, the PCM converter section 1412, the D/A converter section 1413, and the audio signal output terminal 1116. Display data of A-CONT Pack which is detailed in FIG. 16(*a*) and FIG. 17 as ACD (Audio Character Display) information is transmitted to a display signal generator section 1120 by which display signals are generated. The display signals are outputted through a display signal output terminal 1122 or outputted to a character display device 1121 built in a apparatus.

In case of a Avd-Disc or a DVD-Audio disc including V data (still pictures), wherein either disc does not contain a CONT Pack or an A-CONT Pack, the switch SW401 is turned to the same position as that for a Van-Disc. In this case, TOC information or information of management area are utilized for reproduction. Referring back to FIG. 42, when a disc is discriminated as an Avd-Disc (step S36), TOC information is read (step S37) and the Avd-Disc is reproduced (step S38) in addition thereto, character information can be reproduced.

When a disc is discriminated as a DVD-Audio disc (step S39), TOC information are read (step S40) and the DVD-Audio disc is reproduced (step S41). Character information can be reproduced.

In case of a CD, the switch SW401 is turned to a side of a CD reproduction section 1488, reproduced signals are transmitted to the CD playback section 1488 through the switch SW401 and outputted as analog audio signals. In FIG. 42, a disc is discriminated as a CD (step S42), TOC information is read (step S43) and the CD is reproduced (step S44).

According to the fourth embodiment of the present invention, since quantity of A Packs are more than that of V Packs in one VOBU (Video OBject Unit), still pictures or slower moving pictures can be reproduced when reproducing V Packs by a reproduction apparatus with a display. However, A Packs in one VOBU can be reproduced in accordance with the information in the CONT Packs (NV Packs) based on the DVD-Video Specifications, so that a Van-Disc can be reproduced by a DVD-Video player and also various DVD discs such as DVD-Video can be reproduced by a Van-Disc reproduction apparatus.

In FIG. 43, TXTDT-MG (Text Data Manager) shown in FIGS. 5(*a*) and 5(*b*) is depicted in detail. It comprises audio text data manager information (ATXTDT-MGI), n units of audio text data language unit search pointer number 1 through number n (ATXTDT-LU-SRP#1 through ATXTDT-LU-SRP#n), and n units of audio text data language unit number 1 through number n (ATXTDT-LU#1 through ATXTDT-LU#n) which is detailed in FIG. 44.

In FIG. 44, each ATXTDT-LU is depicted in detail. It comprises audio text data language unit information (ATXTDT-LUI), item audio text search pointer—search pointer for a volume (IT-ATXT-SRP-VLM), 9 units of item audio text search pointer—search pointer for Album number 1 through number 9 based on ATT-SRPT (Audio Title Search Pointer Table) (IT-ATXT-SRP-SRP-TTG#1-ATT-SRPT through IT-ATXT-SRP-SRP-TTG#9-ATT-SRPT), 9 units of item audio text search pointer—search pointer for Album number 1 through number 9 based on AOTT-SRPT (Audio Only Title Search Pointer Table) (IT-ATXT-SRP-SRP-TTG#1-AOTT-SRPT through IT-ATXT-SRP-SRP-TTG#9-AOTT-SRPT), and audio text data (ATXTDT) which is detailed in FIG. 45.

In FIG. 45, the ATXTDT is depicted in detail. It comprises audio text data information (ATXTDTI), n units of item audio text search pointer number 1 through number n (IT-ATXT-SRP#1 through IT-ATXT-SRP#n), and n units of item audio text number 1 through number n (IT-ATXT#l through IT-ATXT#n).

Accordingly, with these data structure utilized, information concerning audio data such as explanation of Album is stored as text data. The text data is stored in an area other than an area for text data of video. FIG. 46 is a flow chart of reproduction process of a disc 1401 by a reproduction apparatus shown in FIG. 41, wherein the disc 1401 is recorded with audio text data and is loaded on a driving device 1402. When an operation button of "Information concerning Album" on an operation section 1418 is pressed, wherein the button is not shown in FIG. 41, audio text data of Album #i under reproduction or Album #i corresponding to the volume before the reproduction are displayed. In this case, the switches SW401 through SW403 are turned to appropriate positions in accordance with a disc type such as a Van-Disc and a DVD-Audio disc. In case of a Van-Disc, video signals of text data are outputted through the video signal output terminal 1115a. In case of a DVD-Audio disc, text data are outputted through the display signal output terminal 1122 or the character display device 1121.

FIG. 46 exemplarily shows a process that a language unit #i (LU#i) being designated by the operation section 1418 is selected and is read (step S51), then an audio text data language unit #i (ATXTDT-LU#i) is indicated (step S52). When next designation is present (step S53), the number "i" is incremented by a "+" key corresponding to the designation (steps S54 and S55) or the number "i" is decrement by a "−" key (steps S56 and S57). When other number "k" is designated, set the number "i" to a number "k" (step S58). In any cases, the process returns back to the step S52, thus an ATXTDT-LU#(i+1), an ATXTDT-LU#(i−1), or ATXTDT-LU#k is indicated.

Above mentioned audio text data can be indicated in different languages. Explanation of an indication process for such will follow.

In FIG. 47, the AMGM-PGCI-UT (Audio Manager Menu Program Chain Information Unit Table) shown in FIGS. 5(*a*) and 5(*b*) is depicted in detail. It comprises AMGM-PGCI-UT information (AMGM-PGCI-UTI), n units of audio manager menu language unit search pointer number one through number n (AMGM-LU-SRP#1 through AMGM-LU-SRP#n), and n units of audio manger menu language unit number 1 through number n (AMGM-LU#1 through AMGM-LU#n) each of which is detailed in FIG. 48.

In FIG. 48, each AMGM-LU is depicted. It comprises AMGM-LU information (AMGM-LUI), n units of AMGM-PGCI search pointer number 1 through AMGM-PGCI search pointer number n (AMGM-PGCI-SRP#1 through AMGM-PGCI-SRP#n), and n units of AMGM-PGCI number 1 through number n (AMGM-PGCI#1 through AMGM-PGCI#n).

As shown in FIG. 49, two title menus of the same Title in different languages such as Japanese and English are recorded in a DVD-Video disc or a Van-Disc in sub-pictures by above mentioned AMGM-LU. A reproduction apparatus processes a disc 1401 for indication as shown in FIG. 50. In this case, the switches SW401 through SW403 are turned to the position for reproducing a DVD-Video disc or a Van-Disc and sub-picture signals of title menu are outputted to the video signal output terminal 1115a.

In FIG. 49, each title menu comprises 3 Titles; Title 1, Title 2, and Title 3. They are recorded in a disc in sub pictures. The title menu is equivalent to a VOB which comprises video, audio, and sub-picture packs for a certain language such as English or Japanese.

FIG. 50 shows a process that a language unit number i (LU#i) being designated by the operation section 1418 is F selected and is read out (step S61), then an audio manager menu language unit #i (AMGM-LU#i) is indicated (step S62). When a next chain is designated so that the menu comprises many chains, the next chain is designated (steps S63 and S64). The process returns back to the step S62 and indicates an AMGM-LU#I of the chain.

When a next chain is not designated (step S63), the process discriminates whether a next menu is designated or not (step S65). When the next menu is not designated, the process returns back to the step S63. When the next menu is designated, the number "i" is incremented by a "+" key corresponding to the designation (steps S66 and S67) or the number "i" is decremented by a "−" key (steps S68 and S69). When other number "k" is designated, the number "i" is set to the number "k" (step S70). In any cases, it returns back to the step S62, thus an AMGM-LU#(i+1), an AMGM-LU#(i−1), or AMGM-LU#k is indicated.

In the case of a Van-Disc according to the fourth embodiment of the present invention, the AMGI (Audio Manager Information) shown in FIG. 5(a) is replaced by another format as shown in FIG. 5(c), an AMGI comprises an audio manager information management table (AMGI-MAT) area, an audio title search pointer table (ATT-SRPT) area, an audio only title search pointer table (AOTT-SRPT) area, an audio manager menu program chain information unit table (AMGM-PGCI-UT) area, and an audio text data manager (ATXTDT-MG) area. Certain areas shown in FIG. 5(a) such as the PTL-MAIT, the AMGM-C-ADT, and the AMGM-ACBU-ADMAP can be eliminated.

According to one aspect of the present invention, a navigation pack (NV Pack) which is defined by the DVD Specifications is provided in packs which contain audio data and the audio packs, and such packs are reproduced according to the information in the NV Pack. Therefore, the reproduction of audio signal is much easier and simpler for a user who intends to record audio signals mainly, and management thereof in real time becomes much easier. Furthermore, according to another aspect of the present invention, a disc comprising a control pack or an management area which manages audio packs can be reproduced, wherein the control pack or management area is provided for packs which include the audio packs. There is provided another disc comprising an NV Pack which is defined by the DVD-Video Specifications can be reproduced, wherein the NV Pack is provided in packs which contain audio data. In addition thereto, according to further aspect of the present invention, a disc comprising an NV Pack which is defined by the DVD-Video Specifications and a DVD-Video disc can be reproduced, wherein the NV Pack is provided in packs which contain audio data.

What is claimed is:

1. An optical audio disc comprising:
    a first pack (A Pack) including audio data;
    a second pack (A-CONT Pack) managing said audio data being contained in said first pack;
    a third pack (V Pack) including other data than said audio data;
    a fourth pack (CONT Pack) containing information which manages the other data included in said third pack; and
    a data array having said second pack placed at a head of said data array and more than one unit of said first, third, and fourth packs placed after said second pack,
    wherein an audio contents block unit (ACBU) is defined in said data array as such that said audio contents block unit is headed by said second pack and is terminated immediately before a subsequent second pack.

2. An optical audio disc in accordance with claim 1, wherein said audio contents block unit is provided at every predetermined time period in said data array.

3. An optical audio disc in accordance with claim 1, wherein said second pack contains time information as a time unit equivalent to one group of audio frames.

4. An optical audio disc in accordance with claim 1, wherein a unit of information which manages the audio data in said first pack, and a unit of timing of said other data in said third pack, are defined as a number of audio frames and a number of video frames respectively.

5. An optical audio disc comprising:
    a first pack (A Pack) including audio data;
    a second pack (A-CONT Pack) managing said audio data being contained in said first pack;
    a third pack (V Pack) including other data than said audio data;
    a fourth pack (CONT Pack) containing information which manages the other data included in said third pack; and
    a data array having said fourth pack placed at a head of said data array and more than one unit of said first, second, and third packs placed after said fourth pack,
    wherein an audio contents block unit (ACBU) is defined in said data array as such that said audio contents block unit is headed by said fourth pack and is terminated immediately before a subsequent fourth pack.

6. An optical audio disc in accordance with claim 5, wherein said audio contents block unit is provided at every predetermined time period in said data array.

7. An optical audio disc in accordance with claim 5, wherein said second pack contains time information as a time unit equivalent to one group of audio frames.

8. An optical audio disc in accordance with claim 5, wherein a unit of information which manages the audio data in said first pack and a unit of timing of said other data in said third pack, are defined as a number of audio frames and a number of video frames respectively.

9. An optical audio disc comprising:
    a first pack (A Pack) including audio data;
    a second pack (V Pack) including a second data other than said audio data;

a navigation pack (CONT Pack) containing reproduction control information which controls reproduction of data included in said first and second packs wherein said navigation pack is defined by the DVD-Video Specifications which is an international industry standard;

a video title set (VTS) information specified by the DVD-Video data format of the DVD-Video Specifications which contains said audio data and said second data;

a video manager (VMG) containing a first information which manages said VTS information;

an audio title set (ATS) information which is added to the DVD-Video data format of the DVD-Video Specifications, and contains said audio data; and an audio manager (AMG) containing a second information which manages said ATS.

10. A reproduction apparatus which reproduces an optical audio disc, wherein said optical audio disc comprises a first pack (A Pack) including audio data and a second pack (A-CONT Pack) which manages said audio data contained in said first pack and comprises a third pack (V Pack) including other data than said audio data and a fourth pack (CONT Pack) containing information which manages the other data included in said third pack and further comprises a data array having said second pack placed at a head of said data array and more than one unit of said first and third and fourth packs placed after said second pack, wherein an audio contents block unit (ACBU) is defined in said data array as such that said audio contents block unit is headed by said second pack and is terminated immediately before a subsequent second pack, said reproduction apparatus comprising:

first reproduction means for reproducing the audio data in said first pack (a pack) in accordance with information contained in said second pack (A-CONT Pack); and second reproduction means for reproducing the other data in said third pack (V pack) in accordance with information contained in said fourth pack (CONT Pack).

11. A reproduction apparatus in accordance with claim 10, wherein each said second and fourth packs contains a time managing information which reproduces the audio data and the other data included in said first and third packs, and wherein said first and second reproduction means reproduce simultaneously the audio data and the other data contained in said first and third packs in accordance with said time managing information.

12. A reproduction apparatus which reproduces an optical audio disc, wherein said optical audio disc comprises a first pack (A Pack) including audio data and a second pack (A-CONT Pack) which manages said audio data contained in said first pack and comprises a third pack (V pack) including other data than said audio data and a fourth pack (CONT Pack) containing information which manages the other data included in said third pack and further comprises a data array having said fourth pack paced at a head of said data array and more than one unit of said first and second and third packs placed after said fourth pack, wherein an audio contents block unit (ACBU) is defined in said data array as such that said audio contents block unit is headed by said second pack and is terminated immediately before a subsequent second pack, said reproduction apparatus comprising:

first reproduction means for reproducing the audio data in said first pack (A Pack) in accordance with information contained in said second pack (A-CONT Pack); and second reproduction means for reproducing the other data in said third pack (V Pack) in accordance with information contained in said fourth pack (CONT Pack).

13. A reproduction apparatus in accordance with claim 12, wherein each said second and fourth packs contains a time managing information which reproduces the audio data and the other data included in said first and third packs, and wherein said first and second reproduction means reproduce simultaneously the audio data and the other data contained in said first and third packs in accordance with said time managing information.

14. A reproduction apparatus which reproduces an optical audio disc, wherein the audio disc comprises a first pack containing audio data and a second pack containing other data than said audio data and a navigation pack which is defined by the DVD-Video Specifications, said navigation pack containing reproduction control information for controlling reproduction of data in said first and second packs and a first management information for managing data which are contained in said first and second packs and a managing area containing a second management information which are defined by the DVD-Video Specifications, said reproduction apparatus comprising:

reproduction means for reproducing the audio data included in said first pack and the data included in said second pack in accordance with the reproduction control information included in said navigation pack which is defined by the DVD-Video Specifications and with a management information contained in said management area.

15. A reproduction apparatus in accordance with claim 14, wherein said first management information further comprises a character information related to said audio data which are contained in said first pack, and wherein said reproduction means further reproduces said character information.

16. A reproduction apparatus in accordance with claim 14, wherein said first management information further comprises a menu information related to said audio data which are contained in said first pack, and wherein said reproduction means further reproduces said menu information.

17. A reproduction apparatus which reproduces one of an audio disc and a DVD-Video disc, wherein the audio disc comprises a first pack containing a first audio data and a second pack containing other data than said first audio data and a first navigation pack which is defined by the DVD-Video Specifications, said first navigation pack contains a first reproduction control information for controlling reproduction of data which are contained in said first and second packs, and said audio disc comprises a first management information for managing data which are contained in said first and second packs and a managing area containing a second management information which are defined by DVD-Video Specifications, said managing area manages data which are included in said first and second packs, wherein the DVD-Video disc comprises a third pack containing a second audio data and a fourth pack containing video data and a second navigation pack which is defined by the DVD-Video Specifications, said managing area manages data which are included in said first and second packs, said second navigation pack containing a second reproduction control information for controlling reproduction of data which are contained in said third and fourth packs, said reproduction apparatus comprising:

reproduction means for reproducing the audio data included in said first pack and the data included in said second pack of said audio disc in accordance with the first management information;

said reproduction means farther reproducing the audio data included in said third pack and the data included in said fourth pack of said DVD-Video disc in accordance with the second management information.

18. A reproduction apparatus in accordance with claim 17, wherein said audio disc is firer recorded with an audio menu related to said first audio data which are contained in said first pack, and wherein said reproduction means further reproduces said audio menu.

19. A reproduction apparatus in accordance with claim 17, wherein said audio disc is further recorded with audio text data related to said first audio data which are contained in said first pack, and wherein said reproduction means further reproduces said audio text data.

20. A reproduction apparatus in accordance with claim 17, wherein said reproduction means functions as an audio signal reproduction circuit.

21. A reproduction apparatus in accordance with claim 17, wherein said managing area of said audio disc is recorded with a TOC information which cues said first audio data contained in said first pack, and said audio disc is defined as a DVD-Audio disc, and wherein said first reproduction means further cues said first audio data contained in said first pack by means of said TOC information.

* * * * *